United States Patent [19]
Maekawara et al.

[11] Patent Number: 6,121,993
[45] Date of Patent: Sep. 19, 2000

[54] APPARATUS FOR FORMING AN IMAGE BY A PLURALITY OF LIGHT EMITTING ELEMENTS

[75] Inventors: Minoru Maekawara; Masayuki Inai, both of Hachioji, Japan

[73] Assignee: Konica Corporation, Tokyo, Japan

[21] Appl. No.: 09/133,437

[22] Filed: Aug. 13, 1998

[30] Foreign Application Priority Data

Aug. 28, 1997 [JP] Japan ................................ 9-232008
Feb. 9, 1998 [JP] Japan ................................ 10-026857

[51] Int. Cl.$^7$ ................................................. B41J 2/435
[52] U.S. Cl. ..................... 347/236; 347/234; 347/248; 250/205; 355/83; 355/84
[58] Field of Search ................................ 347/116, 236, 347/237, 238, 246, 247, 249, 253, 239, 240, 234, 248, 233; 250/204, 205; 355/400, 83, 84

[56] References Cited

U.S. PATENT DOCUMENTS

| | | | |
|---|---|---|---|
| 4,907,034 | 3/1990 | Doi et al. ........................... | 355/400 |
| 5,640,190 | 6/1997 | Bollansee et al. .................. | 347/240 |
| 5,726,437 | 3/1998 | Ashikaga et al. ................... | 250/205 |
| 5,825,400 | 10/1998 | Florence ............................. | 347/239 |

FOREIGN PATENT DOCUMENTS

| | | |
|---|---|---|
| 63-216770 | 9/1988 | Japan . |
| 63-234236 | 9/1988 | Japan . |
| 1-188370 | 7/1989 | Japan . |

*Primary Examiner*—N. Le
*Assistant Examiner*—Hai C. Pham
*Attorney, Agent, or Firm*—Frishauf, Holtz, Goodman, Langer & Chick, P.C.

[57] ABSTRACT

An apparatus for forming an image comprises a plurality of light emitting elements each emitting light having substantially the same peak wavelength as those of others; a conveyor to convey a recording medium to receive light emitted from the plurality of light emitting elements relative to the plurality of light emitting elements; and a controller to control the plurality of light emitting elements such that a single pixel on the recording medium is formed by light emitted from at least two pieces of light emitting elements.

32 Claims, 44 Drawing Sheets

| WHITE | 0.64 | WHITE | 0.76 | WHITE | 0.90 | WHITE |

LOAD USER CH C SUCH THAT B = C · A

FIG. 17

| MEMORY ID | YES/NO | PAPER CODE |
|---|---|---|
| 0 | 1 | 0 |
| 1 | 1 | 3 |
|   | 1 | 61 |
|   | 0 | — |
| · | · | — |
| · | · | — |
| · | · | — |
| 15 | 0 | — |

| PAPER CODE | TABLE NUMBER OF PCH (1) | INITIAL TABLE NUMBER OF PCH(2) |
|---|---|---|
| 0 | 0 | 0 |
| 1 | 0 | 0 |
| · | · | · |
| · | · | · |
| · | · | · |
| · | · | · |
| · | · | · |
| 63 | 7 | 15 |

APPARATUS FOR FORMING AN IMAGE BY A PLURALITY OF LIGHT EMITTING ELEMENTS

BACKGROUND OF THE INVENTION

This invention relates to an image forming apparatus wherein multiple recording is made on each pixel of an image by a plurality of light emitting elements.

Heretofore, there has been an apparatus for recording an image data on a photosensitive recording medium by the light emission from light emitting elements, for example, the one which makes image recording employing a linear head having a plurality of light emitting elements disposed in a linear array in the direction perpendicular to the transport direction of the recording medium (Japanese laid open patent S63-216770), the one which carries out image recording by moving a serial head in the direction perpendicular to the transport of the recording medium, said head having a plurality of light emitting elements disposed in said direction of transport (Japanese laid open patent S63-234236), the one which executes a high-speed recording by making a plurality of light emitting elements disposed in the direction of sub-scanning emit light simultaneously (Japanese laid open patent H1-188370), and so forth have been reported.

However, according to the above-mentioned first technology, lines of density unevenness extending in the direction of sub-scanning were generated due to the variation of the characteristics of the light emitting elements, and on the other hand, according to the above-mentioned second technology, streak irregularities having a period of the length of the serial head was also generated, both having the problem of deterioration of image quality. Further, in the above third technology, the following problem may raise. Since each pixel is recorded by a single piece of light emitting element, in the case that the light quantity of the single piece of light emitting element is dropped due to deterioration with the lapse of time, streak irreguralities may take place in the primary scanning direction, resulting in the deterioration of image quality.

Moreover, it has also been proposed to apply the aforesaid technology employing the linear head, wherein a plurality of sets of R, G, and B line heads are disposed in the direction of sub-scanning so as to make multiple recording on each pixel by the light emitting elements of said plural sets of linear heads, being capable of reducing the unevenness due to the variation of the characteristics from one head to another. However, in order to get rid of the above-mentioned effect of streak irregularities, it is required to increase the number of the sets of heads sufficiently, resulting in the too large-sized heads to actualize them.

SUMMARY OF THE INVENTION

The first object of this invention is to enhance the quality of the recording image, the second object is to enhance the quality of the image with the small size apparatus, and the third object is to avoid streak irregularities in particular in the image quality.

The above-mentioned object is accomplished by the structures of the image forming apparatus described in the following.

1. An image forming apparatus having a print head made up of a plurality of light emitting elements with approximately the same peak emission wavelength disposed on it, said apparatus forming an image by recording on each pixel through exposing it successively and repeatedly to light emission from said plurality of light emitting elements.

According to the above structure of Item 1, recording is made by exposing each pixel successively and repeatedly to light emission from a plurality of light emitting elements with approximately the same peak emission wavelength, that is, of approximately the same emission color, disposed on the print head.

Thus, the recording can be made with an increased number of multiple times by employing a compact print head, thereby improving image quality by reducing the effect of the streak irregularities due to the dispersion of the light emitting elements in light emitting power, position, dimensions and wavelength.

2. An image forming apparatus having a transport means which transports a print head or a photosensitive recording medium so as to relatively move said photosensitive recording medium against the print head in the direction of main scanning, said print head being transported relatively against said photosensitive recording medium in the direction of sub-scanning, the direction perpendicular to said main scanning, said apparatus forming an image by recording on each pixel through exposing it sequentially and repeatedly to light emission from said plurality of light emitting elements with approximately the same peak emission wavelength, on the photosensitive recording medium being transported relatively against said print head in the direction of main scanning by said transport means.

According to the structure of the above-mentioned Item 2, recording is carried out by exposing each pixel sequentially and repeatedly to light emission from a plurality of light emitting elements with approximately the same peak emission wavelength, that is, of approximately the same emission color, while the photosensitive recording medium being transported relatively against the print head in the direction of main scanning, with said print head transported relatively against said photosensitive recording medium in the direction of sub-scanning, the direction perpendicular to said main scanning direction.

Thus, the recording of an increased number of multiple times can be made employing a compact print head, being capable of improving image quality by reducing the effect of the streak irregularities due to the despersion of the light emitting elements in light emitting power, position, dimensions and wavelength.

3. An image forming apparatus wherein, as for the aforesaid light emitting elements of the print head, a plurality of them are disposed in said direction of sub-scanning, said apparatus forming an image by recording it on each pixel through exposing it sequentially and repeatedly to light emission from said plurality of light emitting elements disposed in said direction of sub-scanning.

According to the structure of the above-mentioned Item 3, in the invention set forth in the above-mentioned Item 2, recording is made by exposing on each pixel sequentially and repeatedly to light emission from a plurality of light emitting elements disposed in the direction of sub-scanning.

4. An image forming apparatus wherein the aforesaid light emitting elements disposed in the direction of sub-scanning have approximately the same peak emission wavelength, said apparatus making a record on each pixel through exposing it sequentially and repeatedly to light emission from said plurality of light emitting elements with approximately the same peak emission wavelength disposed in the direction of sub-scanning.

According to the structure of the above-mentioned Item 4, recording is carried out by exposing each pixel sequentially and repeatedly to light emission from a plurality of light emitting elements disposed in the direction of sub-scanning having approximately the same peak emission wavelength, that is, of approximately the same emission color.

5. An image forming apparatus wherein said light emitting elements are disposed also in the direction of main scanning to make them arranged two-dimensionally, said apparatus making a record on each pixel through exposing it sequentially and repeatedly to light emission from said plurality of light emitting elements disposed two-dimensionally.

According to the structure of the above-mentioned Item 5, because recording can be carried out by exposing each pixel sequentially and repeatedly to light emission from a plurality of light emitting elements disposed also in the main scanning direction to be arranged two-dimensionally, the number of times of multiplicity can be increased with the length of the print head in the sub-scanning direction made to be kept small, hence the deterioration of image quality due to the dispersion of light emitting elements in light emitting power, position, dimensions and wavelength can be prevented.

6. An image forming apparatus wherein the aforesaid light emitting elements disposed also in the direction of main scanning to be arranged two-dimensionally have approximately the same peak emission wavelength, said apparatus making a record on each pixel through exposing it sequentially and repeatedly to light emission from said plurality of light emitting elements disposed two-dimensionally having approximately the same peak emission wavelength.

According to the structure of the above-mentioned Item 6, recording can be executed by exposing each pixel successively and repeatedly to light emission from said plurality of light emitting elements disposed also in the main scanning direction to be arranged two-dimensionally having approximately the same peak emission wavelength, that is, of apparoximately the same emission color.

7. An image forming apparatus wherein the aforesaid plurality of light emitting elements are disposed zigzag.

According to the structure of the above-mentioned Item 7, by disposing the light emitting elements zigzag in the direction of sub scanning, the number of times of multiple recording can be increased sufficiently with compact structure of the print head in comparison with the case where the light emitting elelments of the same total number are disposed in a line, preventing the enlargement of the length of said print head in the direction of sub-scanning, even in the case where the size of light emitting elements are larger than the interval of the disposed elements.

8. An image forming apparatus having means for measuring the light quantity of said light emitting elements, means for adjusting the light quantity, and means for correcting dispersion and/or fluctuation in light quantity from one element to another on the basis of said light quantity measured by said means for measuring the light quantity.

According to the structure of the above-mentioned Item 8, the variation of the light quantity from one light emitting element to another is corrected, and the generation of recording density unevenness on the photosensitive recording medium can be prevented. In particular, if the correction through measuring the light quantity is made on each occasion of using the apparatus, it can cope with the change with the passage of time.

9. An image forming apparatus having aforesaid means for adjusting the light quantity and means for adjusting and correcting the light quantity on the basis of the information concerning the interval error regarding plural light emitting elements.

Although the light quantity error of a light emitting element itself can be prevented by making correction through said measurement of the light quantity, if there is an error regarding the interval between light emitting elements, the average exposure amount in the vicinity of the pixels whereon recording is made become larger in the case that neighboring light emitting elements locate too close to each other or the average exposure amount in the vicinity of the pixels whereon recording is made become smaller in the case that neighboring light emitting elements locate too far from each other.

According to the structure of the above-mentioned Item 9, the image density of an image obtained by a uniform exposure is measured, for example, to make corrections by reducing the light quantity for the light emitting elements at the site of higher density, or by increasing the light quantity for the light emitting elements at the site of lower density. Thus the apparatus can prevent the generation of streak irregularities in spite of the interval errors. Further, it may be appropriate to execute the correction, without measuring the density, by calculating correction coefficients on the basis of the positional data regarding the light emitting elements disposed.

10. An image forming apparatus wherein the aforesaid means for correcting carries out the correction for the error by dividing the aforesaid plural light emitting elements into a plurality of groups to adjust the light quantity for each group.

According to the structure of the above-mentioned Item 10, the number of times of measurement can be reduced in comparison with the case where each light emitting element is measured, besides, the measurement system does not require so much high sensitivity, enabling the measurement to be carried out for low cost. Further, the correction can be made in a simple manner because it may be done collectively for each group composed of the plural light emitting elements.

11. An image forming apparatus wherein the aforesaid means for correcting carries out the correction for the error by adjusting the light quantity for all the groups in such a manner that the sum or average of the light emission amount from the plural light emitting elements of one group is equal to that of another.

According to the structure of the above-mentioned Item 11, the inter-group dispersion of the light quantity can be suppressed by making correction of the error through adjusting the light intensity of each group in such a manner that the sum or average of the intensity of the emitted light from the plural light emitting elements of one group is equal to that of another.

12. An image forming apparatus wherein aforesaid plural light emitting elements are divided into a plurality of groups, said apparatus making a record on each pixel through exposing it sequentially and repeatedly to light emission from a plurality of light emitting elements belonging to the same group, while the image data of the plural pixels being disposed in the direction of sub-scanning are recorded simultaneously by said plural groups.

If multiple recording on a pixel is made using all the light emitting elements, some difficulty in control is accompanied such as too fast transport speed (rotational speed in the drum rotation method) of the photosensitive recording medium in the direction of main scanning for high-speed image recording even if image quality is improved.

Therefore, according to the structure of the above-mentioned Item 12, the plural light emitting elements are divided into a plurality of groups within a range where the unevenness is not visually discerned and conduct multiple recording on pixels shared with the groups respectively, obtaining an image of sufficiently good quality without any difficulty in control. Here, the above range is made so as to lower the size obtained by multiplying the number of groups with the dimensions of recording pixel than the sensitivities of human's eye.

13. An image forming apparatus having means for distributing the light emission time in order to make a part of the plural light emitting elements belonging to the same group emit light for a different time period to the others, said apparatus making said part of the plural light emitting elements belonging to the same group emit light for a different time period by said means for distributing the light emission time.

The number of gradations of the light emitting elements has a limit because the unit time of light emission can not be made shorter than a certain limit, and said limit of the number of gradation is insufficient for the number of gradation of an image. Hence, according to the structure of the above-mentioned Item 13, the light emission is made for the same time period regarding as many light emitting elements in the same group as possible, and only a part of the light emitting elements in the same group are made to emit light for a different time period, which enables the number of gradations of the group to be much more increased than those of a single light emitting element, resulting in securing sufficiently high image quality.

14. An image forming apparatus having stop instruction detecting means for detecting the issue of the stop instruction to stop recording temporarily, said apparatus stopping recording after completion of the multiple recording regarding the image data of all the pixels in the process of recording, when detecting the stop instruction by said stop instruction detecting means.

If recording is immediately stopped upon detecting the issue to stop recording temporarily due to the exhaustion of the image data in the memory, the number of times of multiple recording is different from one pixel to another at this moment of said stopping. Therefore, if the recording is re-started in order to record repeatedly from this state for the rest of multiple recording, it appears a phenomenon such that the record becomes faint in the case where a time interval is given in the process of recording due to the characteristics of the photosensitive recording medium.

According to the structure of the above-mentioned Item 14, recording is not immediately stopped upon the issue of temporary stop instruction, but the multiple recording is continued for the image data in recording at the time of detecting the stop instruction by said stop instruction detecting means, and the recording operation is stopped after completion of said multiple recording.

In this manner, it is prevented the generation of faint lines due to the time interval in the process of recording, and good image quality can be secured.

15. An image forming apparatus wherein the aforesaid print head comprises a first group of light emitting elements composed of a plurality of light emitting elements disposed having a first peak emission wavelength and a second group of light emitting elements composed of a plurality of light emitting elements disposed having a second peak emission wavelength, said apparatus having means for correcting the position of the recording pixel, said means executes a control such that the timing to control said plurality of light emitting elements on the basis of the image data of the same pixel for both said first and second group is changed from said first group to said second group in order that recording by said second group of light emitting elements on the basis of the image data of the same pixel as that recorded by said first group of light emitting elements may be made on the same position as said pixel.

According to the structure of the above-mentioned Item 15, in the case where a color image is formed by recording on the same pixel through a repeated exposures by the first group of light emitting elements having one peak emission wavelength and one emission color and the second group of light emitting elements having another peak emission wavelength and another emission color, the image data of the same pixel can be recorded at the same position by both group of light emitting elements, by controlling the timings to control the light emitting elements in a manner such that the timings are changed for each group of light emitting elements by said means for correcting the position of recording pixel, even if both print heads each comprising a group of light emitting elements are mounted at a little deviated positions to each other.

16. An image forming apparatus having a stop instruction detecting means for detecting that the stop instruction has been issued to stop recording temporarily, when said stop instruction detecting means detects the stop instruction, said apparatus executing stop recording control after recording is completed on the pixel, on which recording has been already made by one of the aforesaid first and second groups of light emitting elements which is advancing in the direction of sub-scanning regarding the exposure timing, by the group of light emitting elements other than said advancing one.

As is mentioned above, even if the positions of mounting the print heads, each of them having a group of light emitting elements, are a little deviated to each other, correction is made regarding the position of recording in such a manner that the image data of the same pixel is recorded at the same position by the aforesaid means for correcting the position of recording pixel. However, because the positions of light emitting elements of a group of light emitting elements are different from another group of light emitting elements when they are stopped, the group of light emitting elements which locates at an advancing side in the direction of moving has already started recording on the newer (at the advancing side in the direction of moving) pixels than the group of light emitting elements which locates at a delaying side in the direction of moving. Hence, the exposure of the other color component has already started on the pixels at the advancing position in said direction of moving of the head by the exposure of mixing color component for each head, and, if no correction is made, a similar phenomenon to that explained in the structure of the Item 12 where record becomes faint is generated, due to the interruption of the exposure of mixing color component.

Therefore, the image data up to the pixel on which the most advancing head among all print heads has already recorded are subjected to multiple recording with regard to every group of light emitting elements, and recording is stopped after the completion of said multiple recording. Thus good image quality is secured without the influence of the phenomenon where record becomes faint.

17. An image forming apparatus wherein the total exposure amount required for the recording on a pixel is defined to a value which is larger than the exposure amount required for the recording on a pixel in the case of single exposure.

Because multiple recording itself is a method of recording with a time interval, the phenomenon where recording becomes faint appears, although the time interval is short. Hence, according to the structure of the above-mentioned Item 17, by making the total amount of exposure larger than the exposure amount required in the case of single exposure where recording is completed with single exposure on a pixel by a light emitting element, insufficiency of exposure amount is corrected and good image quality can be secured.

18. An image forming apparatus having exposure correcting means for correcting exposure amount corresponding to the time interval after a certain light emitting element recorded on a pixel until the next light emitting element records on it in the case where a plurality of light emitting elements make multiple recording on a pixel, in order that the effective total amount of exposure to get the density to be recorded on the recording medium may be kept constant even if said time interval varies.

According to the structure of the above-mentioned Item 18, because the aforesaid phenomenon where record becomes faint appears more remarkable when the time interval in recording becomes longer, the effective total amount of exposure can be kept constant by said exposure correcting means on condition that the amount of correction is made to become larger in accordance with the increase of time interval, and good image quality can be secured.

19. An image forming apparatus wherein said exposure correcting means executes correction by detecting said time interval and correcting an LUT which indicates the relationship between the light quantity of the light emitting elements and the density to be recorded on the recording medium in accordance with said time interval, or by defining a coefficient of correction.

According to the structure of the above-mentioned Item 19, because the degree of being faint of the record varies in accordance with the time interval as is mentioned above, by defining said LUT or said coefficient of correction in accordance with said time interval, correction can be made simply and with good accuracy.

20. An image forming apparatus wherein the number of light emitting elements belonging to the same group N is defined to the value to meet the following inequality, using Pmin, the minimum exposure amount in the case where the exposure amount is reduced to the lowest due to various kinds of fructuations and dispersions in the image forming apparatus, Ps, the exposure amount in case of no fructuation and dispersion, M, the specified value of the steps of modulation for the light emitting elements, and C, the lowest limit of the number of gradations corresponding to the sensitivity of human eyes:

$$N \times M \times Pmin/Ps > C.$$

According to the structure of the above-mentioned Item 20, even in the case where the fluctuations and dispersions in the apparatus become to the maximum and hence the exposure amount becomes to the minimum, by setting the number of the light emitting elements belonging to the same group N to a value by which the number of the gradations of the image obtained exceeds the lowest limit of the number of gradations to be discerned by the human eye C, good image quality can be secured.

21. An image forming apparatus wherein said minimum exposure amount Pmin is obtained by the following equation, using g, the deviation from the optimum value of the developing machine to develop the exposed photosensitive recording medium, f, the dispersion of sensitivity of the photosensitive recording medium, $\epsilon$, the dispersion of light quantity of the light emitting elements, and N, the aforesaid number of the light emitting elements belonging to the same group:

$$Pmin = Ps/(1+g)/(1+f)/\{1+\epsilon/(N)^{1/2}\}.$$

According to the structure of the above-mentioned Item 21, the number of light emitting elements belonging to the same group is concretely defined on the basis of the above-described equation.

22. An image forming apparatus wherein said number of light emitting elements belonging to the same group N is defined in order that it may meet the aforesaid inequality:

$$N \times M \times Pmin/Ps > C$$

for the number of the lowest limit of the number of gradations C specified as not less than 200 or desirably not less than 400.

According to the structure of the above-mentioned Item 22, when the density resolving power of human's eyes is 0.02, the lowest limit of the number of gradations becomes approximately 200 or when the density resolving power of human's eyes is 0.05, the lowest limit of the number of gradations becomes approximately 400. Accordingly, by designing so as to meet the above inequality, the more concrete number of light emitting elements to be provided can be obtained for obtaining image of high quality.

23. An image forming apparatus wherein the aforesaid number of groups is defined in such a manner that the value obtained as said number of groups multiplied by the size of a recording pixel is smaller than the period in the higher frequency side than the frequency at the peak of spatial frequency response of the human vision.

According to the structure of the above-mentioned Item 23, the lines of unevenness having a period of a value obtained as the number of groups multiplied by the size of a recording pixel are generated, and by setting the spatial frequency of this lines of unevenness to a value in a region where the spatial frequency response of the human vision is low, that is, the sensitivity is low, the lines of unevenness are made to be visually insensitive and good image quality can be secured.

24. An image forming apparatus wherein said number of groups is set in such a way that said value obtained as the number of groups multiplied by the size of a recording pixel is made to be a value smaller than 300 $\mu$m.

According to the structure of the above-mentioned Item 24, because it is at the period of about 300 $\mu$m that said frequency response of the human vision pass the peak value to fall down, by setting the value obtained as the number of groups multiplied by the size of a recording pixel to be smaller than 300 $\mu$m, the lines of unevenness are visually insensitive and good image quality can be secured.

25. An image forming apparatus wherein a plurality of light emitting elements belonging to the same group are driven by a plurality of driver IC in which a plurality of driver circuits for driving the light emitting elements are built.

According to the structure of the above-mentioned Item 25, because the dispersion of the driving current among driver IC's is distributed equally to every group, the inter-group variation is suppressed to as low a degree as possible, and good image quality is secured, with the aforesaid lines of unevenness suppressed.

26. An image forming apparatus wherein a standard voltage obtained by a constant voltage circuit and a variable resistor is allotted to the aforesaid plurality of driver circuits for driving the light emitting elements in order that it may be used in common.

According to the structure of the above-mentioned Item 26, each driver IC comprising plural driver circuits is provided with the constant voltage circuit, and also a circuit for compensating temperature drift. Further, the voltage obtained by dividing the output of said constant voltage circuit with said variable resistor is made as a standard voltage, and the driving electric current to the light emitting elements is determined on the basis of said standard voltage. Because drive IC's usually have a dispersion from one to another, the attempt to apply the same electric current to all the light emitting elements requires individual setting of current for each of the IC's. However, in such case as this invention where multiple recording is made, the dispersion among ICs up to some degree will be averaged and absorbed.

Accordingly, as is mentioned above, even if a standard voltage generated by the constant voltage circuit and the variable resistor r of any one of IC's is used in common, sufficiently good image quality can be secured. Further, by employing such a structure as this, the number of variable resistors can be reduced and also the procedures of adjustment operation can be decreased.

27. An image forming apparatus wherein the aforesaid variable resistor forming said standard voltage is provided outside the aforesaid driver IC.

According to the structure of the above-mentioned Item 27, by providing the variable resistor outside the driver IC, the power loss in the driver IC can be reduced.

28. An image forming apparatus wherein a power saving circuit for switching the current for driving the light emitting elements outputted by the driver circuits for driving the light emitting elements in a manner such that the current at non-recording time is reduced to a lower value than that at recording time.

According to the structure of the above-mentioned Item 28, by lowering the driving voltage at non-recording time by the power saving circuit, it is made possible that more driving circuits can be built in due to the reduced heat loss in the driver circuits. Further, the fogging phenomenon due to the leakage current during stopped recording can be prevented.

29. An image forming apparatus further comprising a power-save releasing means for releasing the lowering of driving voltage by the aforesaid power saving circuit in advance of the start of recording.

If the releasing of the lowering the driving voltage by the power saving circuit is carried out at the same time as the start of recording, in some cases, the recording is not conducted normally, because recording signals are inputted before the driving voltage is stabilized through an unstabilized period due to the parts such as amplifiers having a large operational delay. However, according to the structure of the above-mentioned Item 29, by releasing the power saving in advance of the start of recording, recording can be started with the driving voltage raised to a sufficiently stabilized state, hence stable recording can be made from the beginning. In other words, it is made to be possible to employ a power saving circuit with large operational delay.

30. An image forming apparatus wherein, on the occasion of temporary stopping of recording, the position of sub-scanning at the issue of stop instruction is memorized, and after sub-scanning is continued until the multiple recording of the image data in the process of recording at that time is completed, the light emitting elements is returned to a position which is a predetermined amount backward from said position of sub-scanning memorized, further, when re-starting of recording becomes possible, the light emitting elements are relatively moved in the direction of sub-scanning against the aforesaid recording medium until they reach said position of sub-scanning memorized, and recording is re-started.

According to the structure of the above-mentioned Item 30, on the occasion of said temporary stopping, for the reason stated already, sub-scanning is carried out further from the time when the stop instruction is issued in order to make multiple recording of all the image data in the process of recording and recording is stopped temporarily, then when recording is re-started, it is necessary that recording is re-started from the position where the stop instruction was issued. Further, at the time of said re-starting of recording, because it is required that the recording head is running stably, the position where the stop instruction is issued is memorized, and after said temporary stop of recording, the head is moved back to a position earlier than said memorized position. When the re-start of recording becomes possible, the head starts moving in the direction of sub-scanning, and at the time of reaching said memorized position, recording of new image data can be re-started.

31. An image forming apparatus wherein, in the case where color image is recorded by the light emitting elements of R, G, and B, the starting position of recording is determined by counting a first signal from the reference position of start of recording in the main scanning direction up to the position of start of recording of the first color, and regarding the starting position of recording of the second and third color, said first signal is counted immediately before the starting position, and then the second signal, which is a multiplied signal of said first signal and has time intervals shorter than those of said first signal, is counted to determine the position of start of recording.

According to the structure of the above-mentioned Item 31, in the case where color image recording is made using the print heads having the light emitting elements of the three colors R, G, and B disposed on them respectively, regarding the recording of the first color, the position to start recording may be determined by the number of counts of the first signal which has comparatively large time intervals because this first color record becomes the reference, but regarding the second and third colors, it is required that the recording position should be accurately superposed on that of the first color, hence only the first signal can not determine the accurate recording position. If the second signal, which has short time intervals, is used, accurate recording positions can be determined, however, if only the second signal is used, the circuit size of the counter becomes too large and it gives too heavy load of counting. Hence, regarding the recording position of the second and third color, the first signal having large time intervals is used immediately before the starting position, and after that the second signal having short time intervals is used to determine the position, so that the accurate determination of the recording position can be made while the load of counting is made as small as possible.

32. An image forming apparatus wherein for every item of calibration of density fluctuation, the print densities obtained for each fluctuation causing factor by outputting the predetermined image data on the basis of a predetermined conversion characteristics are measured, and a characteristic correcting data for each fluctuation causing factor are calculated from said density information, and they are memorized for each fluctuation causing factor in a memory means, and at the same time, new conversion characteristics data are prepared from those characteristic correcting data to execute correction of output fluctuation.

According to the structure of the above-mentioned Item 32, for every calibration item, the data concerning the characteristics fluctuation of said calibration items are calculated, and a new conversion characteristics data is prepared from said characteristics fluctuation data to execute the correction of the output fluctuation, hence compared to fluctuation correction based on a simple adding calculation of correction coefficients, a close and minute correction of fluctuation can be made, which enables the compatibility of the ease of operation and the processing of output for the color and gradation of high-accuracy utilizing the freedom of digital processing.

33. An image forming apparatus wherein the aforesaid calibration items of density fluctuation are the calibration items due to the difference in development characteristics and photosensitive material.

According to the structure of the above-mentioned Item 33, the calibration for the density fluctuation due to the difference in development characteristics and photosensitive material can be well executed.

34. An image forming apparatus wherein the aforesaid calibration for the density fluctuation depending on the development characteristics is established as correction coefficient values each of which corresponding to each color.

Because the fluctuation of development characteristics can be nearly corrected by controlling the amount of exposure, the calibration is established as correction coefficient values. Further, the correction coefficient values are each the one for each of the three colors R, G, and B. Besides, owing to this, a good independent relationship to the non-linear correction values for the difference in photosensitive material is secured.

35. An image forming apparatus wherein said calibration for the density fluctuation due to the difference in the photosensitive material is carried out by altering the conversion characteristics data in the color conversion look-up tables which are set beforehand for every kind of photosensitive material and those in the one-dimensional look-up tables which are set for each color for correcting the interlot dispersion of gradations of the photosensitive material.

According to the structure of the above-mentioned Item 35, regarding the color conversion characteristics which vary to a large degree depending on the kinds of photosensitive material, a three-dimensional, for example, R, G, and B input—R, G, and B output, look-up table (LUT) is set in advance for each kind of photosensitive materials, and against the interlot dispersion of gradations of the photosensitive material, one dimensional LUT's are set for every color for correcting the gradation conversion, and the calibration for the density fluctuation is carried out by altering these conversion characteristics data. In this way, these correcting functions are separated from each other and suitable correction can be executed.

36. An image forming apparatus wherein the correction of output fluctuation is carried out by preparing new conversion characteristics data on the basis of the information on the fluctuation of characteristics of the aforesaid every calibration item and the information on the dispersion of the exposure light source.

According to the structure of the above-mentioned Item 36, the correction of output fluctuation is carried out by preparing new conversion characteristics data on the basis of the newly added information on the dispersion of the exposure light source, together with the information on the fluctuation of characteristics of the aforesaid every calibration item, hence the density fluctuation due to the light quantity dispersion of the exposure light source can be corrected at the same time.

37. An image forming apparatus wherein the information for altering the conversion characteristics in accordance with the preferrence of the user is kept and the data are utilized on the occasion of preparing the conversion characteristics data.

According to the structure of the above-mentioned Item 37, by preparing new conversion characteristics data utilizing the information for altering the conversion characteristics in accordance with the preferrence of the user, an image in accordance with the preferrence of the user can be obtained.

38. An image forming apparatus wherein image recording is made on a recording medium by rotating a plurality of light emitting elements and said recording medium arranged on a cylinder surface relatively to each other in the main scanning direction, while moving said light emitting elements and said recording medium relatively to each other in the sub-scanning direction, and regarding the arrangement of a plurality of groups of light emitting elements having different recording colors to one another, one of them other than a basic one is disposed at a position shifted in the direction of sub-scanning to the reverse side of the moving from the position of the basic one by S which is expressed by the following equation:

$$S = L \times A/360 + n \times P,$$

where L is the transport length by sub-scanning during one rotation of main scanning, A is the angle of arrangement made by the basic group of light emitting elements and said other group of light emitting elements with regard to the center axis of said cylinder, n is an integer, and P is the interval of the dots formed by said light emitting elements on the image surface.

According to the structure of the above-mentioned Item 38, the shifted positions for the groups of light emitting elements are determined on the basis of the transport length L by sub-scanning during one rotation of main scanning, hence if the velocity of main scanning or sub-scanning is varied, the exposure is made on the same position by every group of light emitting elements.

Further, the rough position adjustment made with a line of scan unit corresponding to n×P is made electrically by selection of the image data, and the deviations within one line of scan in the direction of sub-scanning may be adjusted mechanically on the basis of said L.

As a result of this, when image recording is carried out on a recording medium by rotating a plurality of light emitting elements and said recording medium arranged on a cylinder surface relatively to each other in the main scanning direction, while moving said light emitting elements and said recording medium relatively to each other in the sub-scanning direction, even if either main scanning or sub-scanning velocity is altered, the groups of light emitting elements can be arranged at appropriate positions and the deterioration of image quality due to the deviated registration for colors can be prevented.

39. An image forming apparatus further comprising a memory circuit disposed at the front stage of a spatial filter with m×n pixels for spatial filtering processing of the input image data of N rows×M columns with k bits per pixel, said memory circuit being composed of serial-parallel conversion section to which said input image data are inputted sequentially up to 1 ($\leq M$) pixels, converting them into the data of w=k×1 bits to output, memory section which has a capacity of n (≦N) lines of said input image data and memorizes w bits of data converted by said serial-parallel conversion section, two sets of horizontal-vertical conversion section which outputs, with a unit of n×k bits, the data of 1 pixels×n lines read out with a unit of w bits from said memory, a first data switch for switching the input of the data from said memory section to any one of said two sets of horizontal-vertical conversion section from one to the other of them, a second data switch for switching whether the data output from one of said two sets of horizontal-vertical conversion section or the other is to be inputted to said spatial filter, and a control section which controls said first switch to switch alternately said two sets of horizontal-vertical conversion section to which the data from said memory section is inputted and further controls said second switch to output the output data from said horizontal-vertical conversion section to which data is not being inputted to said spatial filter.

Said serial-parallel conversion section can be composed of a flip-flop to which pixel clock signal is inputted and a flip-flop to which clock signal obtained by demultiplying the frequency of pixel clock signal in accordance with said 1 pixels. Further, because said memory section executes inputting and outputting image data with a unit of w=k×1 bits, it has a smaller number of accesses in comparison with the case where image data are inputted and outputted with a unit of k bits, hence it can employ a low-speed RAM for general use. Moreover, said horizontal-vertical conversion section is provided with a flip-flop memorizing n lines of image data of the same column, and may have such a structure as to switch the input image data to the flip-flop in order to transmit the image data corresponding to the same row between flip-flops.

BRIEF DESCRIPTION OF THE DRAWINGS

FIG. 17 is a drawing showing the memory state of the paper CH (1) and paper CH (2) of the apparatus.

DETAILED DESCRIPTION OF THE PREFERRED EMBODIMENT

In the following, an embodiment of this invention will be explained with preferrence to the drawings.

I. THE STRUCTURE OF THE IMAGE RECORDING APPARATUS

Figure 1:
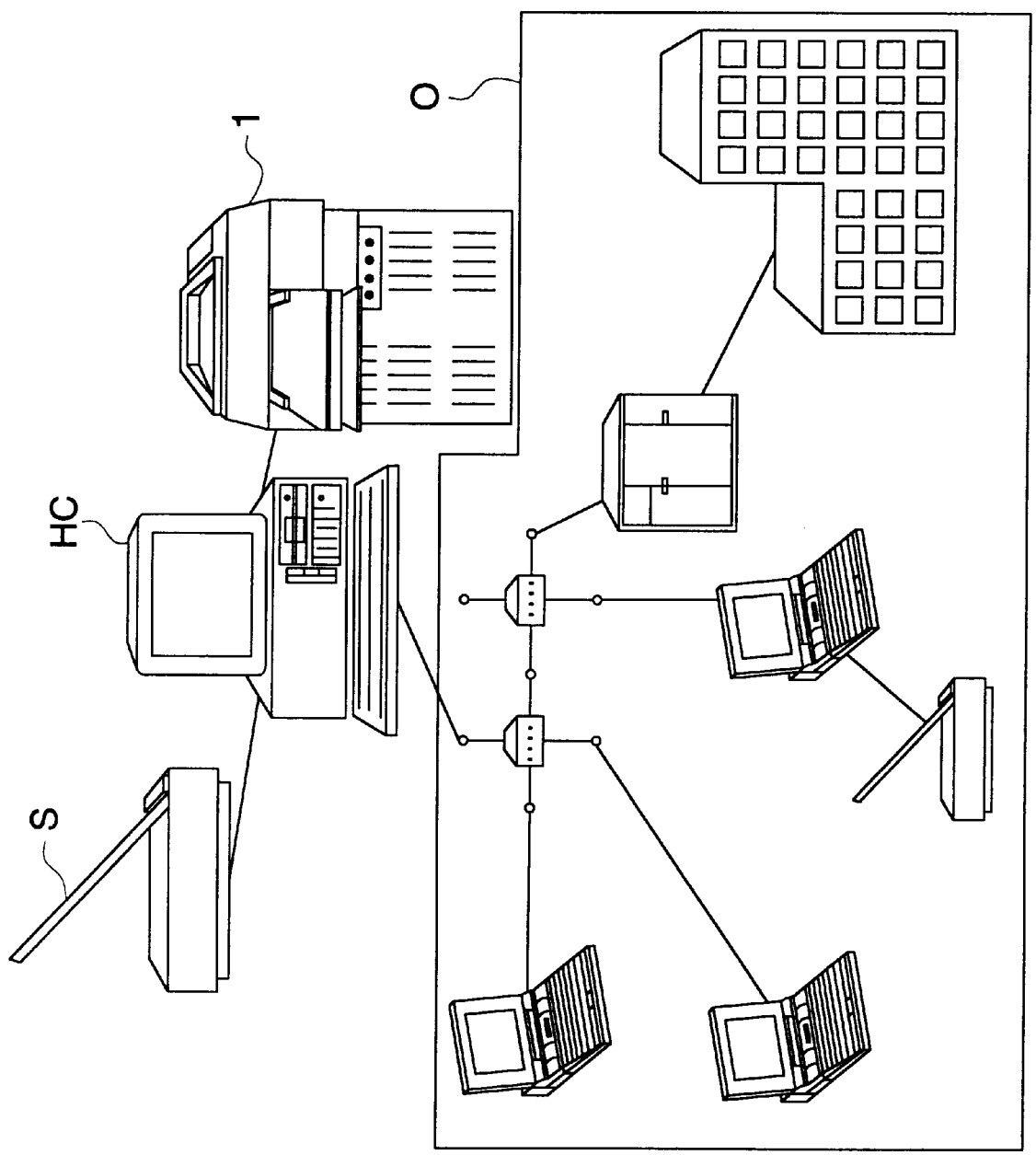
FIG. 1 is a drawing showing the mode of usage of an apparatus relating to this invention.

FIG. 1 shows a mode of usage of the image forming apparatus relating to this invention, that is, the image forming process is made while the image data, which are directly inputted from the scanner S as an input means or are inputted from the outside O through network communication, are processed by the host computor HC, and transmitted to the image forming apparatus 1 relating to this invention.

Figure 2:
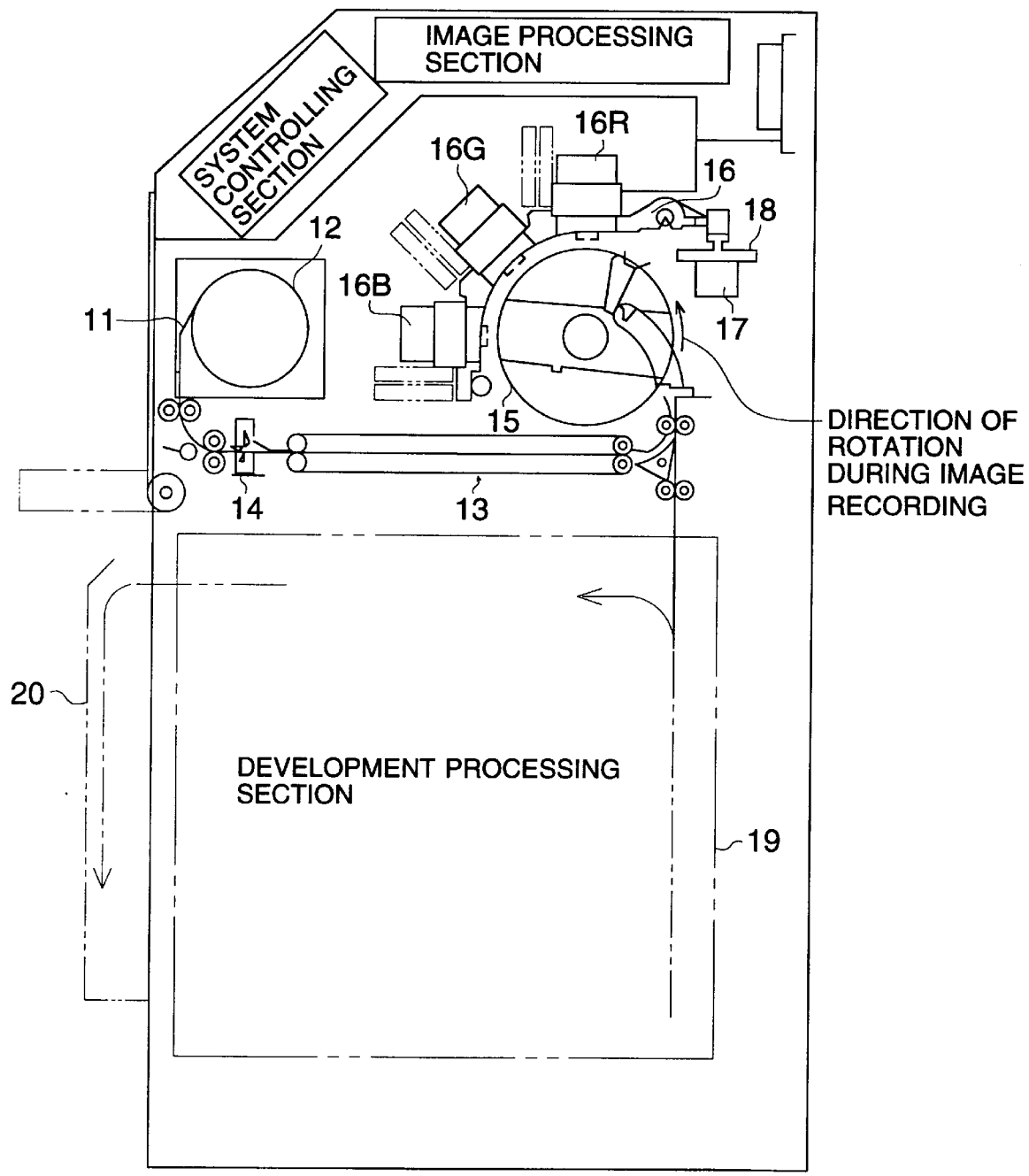
FIG. 2 is a vertical cross-sectional view of an apparatus relating to this invention.
Figure 3:
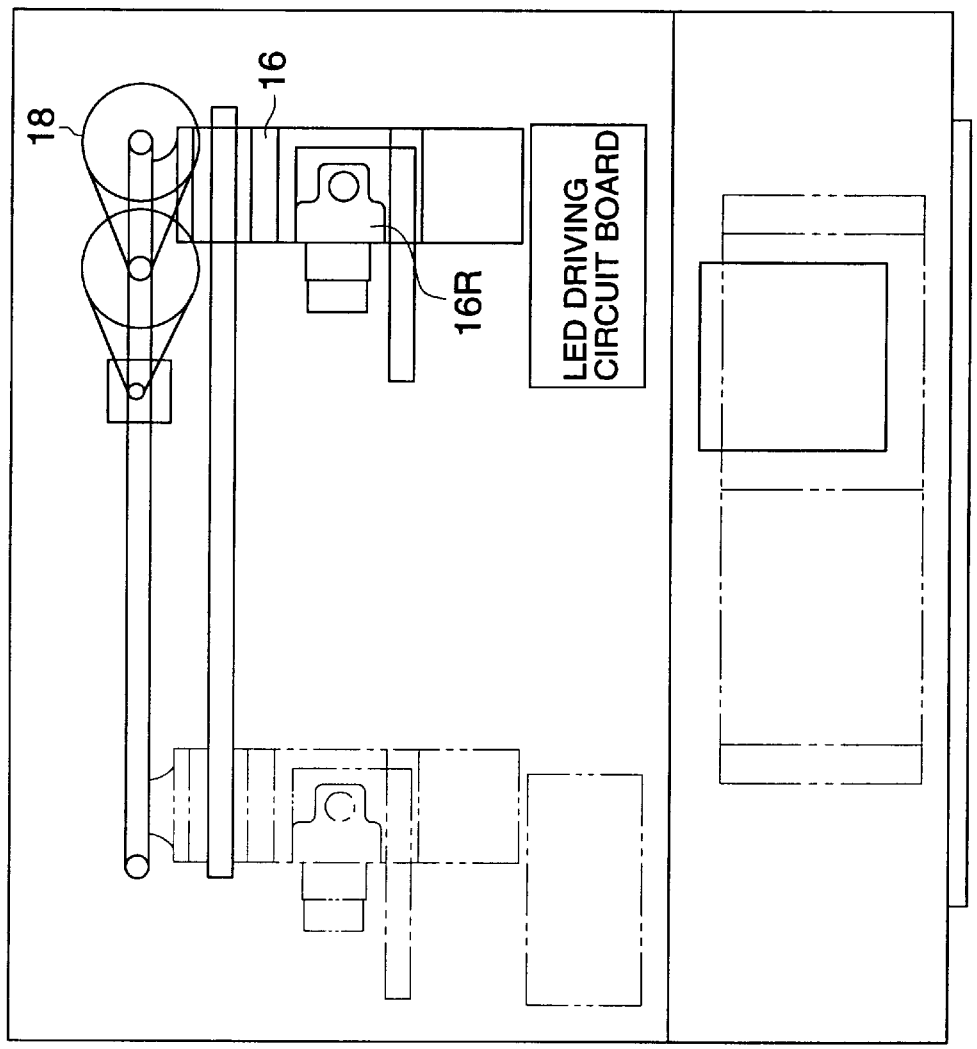
FIG. 3 is a lateral cross-sectional view of the above-mentioned apparatus.
Figure 4:
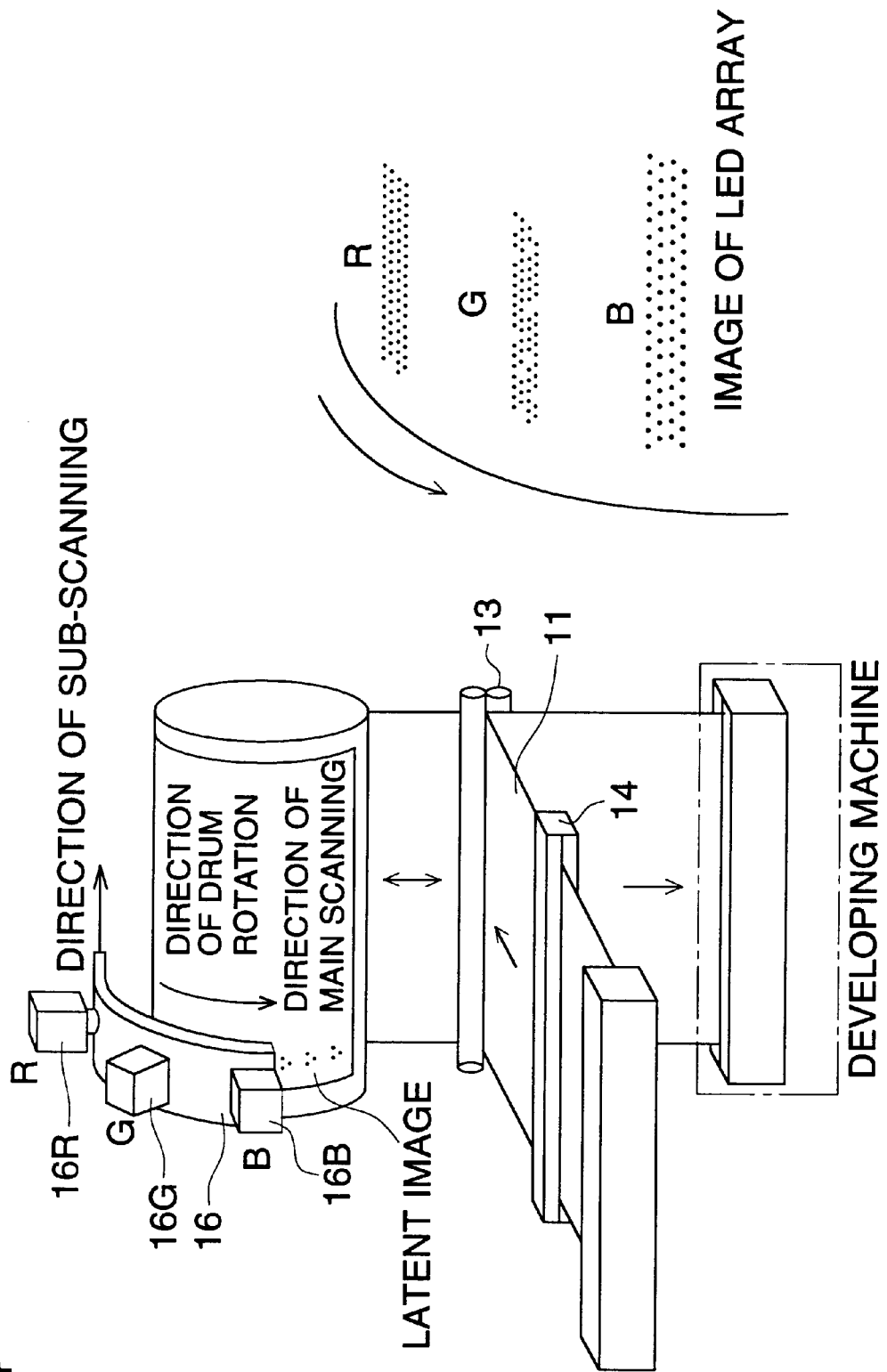
FIG. 4 is a perspective view showing the outline of the above-mentioned apparatus and a drawing showing the image of the LED arrays.

FIG. 2 to FIG. 4 show the outline of the structure of the above-mentioned image forming apparatus.

Referring to the drawings, the outline of the operation will be explained. First, the photographic paper (photosensitive recording medium) 11 is transported from the roll 12 on which it is loaded by the transport mechanism 13 composed of rollers and others, until it is cut by the cutter mechanism 14 when it reaches to the length desired for the image forming. The cut sheet of photographic paper 11 having the desired size is then transported from said transport mechanism 13 to the upward drum 15, where it is loaded on the outer surface of said drum to be rotated.

On the other hand, the head carriage 16, on which the print head 16R for R color, the print head 16G for G color, and the print head 16B for B color, each having a number (96 in this embodiment) of LED's (light emitting elements) disposed on it, are provided integrally along the outer periphery of the drum 15 in the direction of the circumference of it, is moved in the direction of the rotary axis of said drum 15 by the driving of the motor 17 and the two step decelerating pulley 18.

While the aforesaid photographic paper sheet 11 is being moved around the rotary axis of the drum 15 as a main scanning means in the direction of main scanning, the LED's on each of the heads 16R, 16G, and 16B on the aforesaid head carriage 16 as a conveying means are emitting the light of the quantity in accordance with the image data, moving in the direction of sub-scanning to give the photographic paper sheet 11 exposure for recording.

The sheet of photographic paper 11, which has been exposed to have all the image data recorded on it in this way, is then moved in the reverse direction by the reverse rotation of the aforesaid drum 15, transported downward by the aforesaid transport mechanism 13 which has been subjected to the switching operation, and subjected to the developing process in the developing process section 19 installed in the lower part of the apparatus 1. Thus the photographic paper sheet 11 on which image is formed after development is ejected to the discharge section 20, and a series of processings is completed.

Next, the outline of the flow of the image data processing will be explained with reference to FIG. 5 and FIG. 6.

Figure 5:
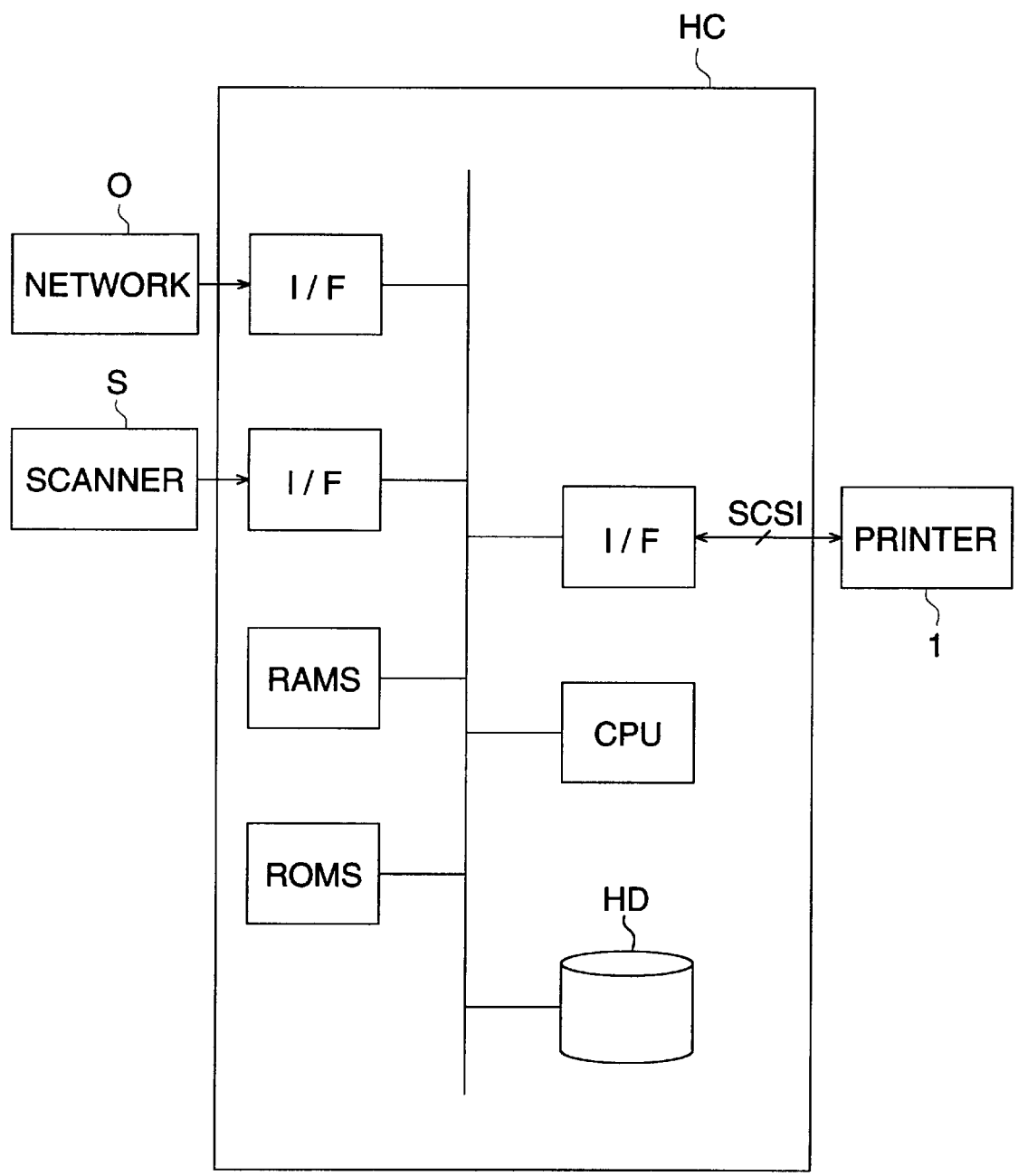
FIG. 5 is an illustration of the outline of the image data flow between the apparatus and an external apparatus.

As is shown in FIG. 5, the image data read by the scanner is inputted in the printer of the apparatus 1, after they are stored in the RAMs of the host computer HC or in the hard disc HD.

Now, it is explained the method of transmitting and receiving the image data between the host computer HC and the printer 1. In the case where a large capacity of image data is to be outputted, it is difficult to maintain the data transmitting speed from the host computer HC to the printer 1 constant. Generally speaking, the host computer HC operates in multi-task mode, and when the number of tasks are increased or processing of a heavy load is given, the operation of the task to be outputted becomes slow.

Further, in the case where the host computer HC is operating in virtual memory mode, the image data itself becomes the object of paging (operation of main memory content to move into a hard disc and to load back the main memory), and if the memory occupation by the other tasks is increased, in some cases the speed of the image data to be outputted to the printer 1 becomes extremely low.

In these cases, if the printer 1 is made up to have a memory capable of memorizing one page of image data, and starts recording after receiving all the image data of one page, a continuous recording can be made in one time operation. However, by doing this, cost of memory is increased and further, the time from the start of transmitting of the image data by the host computer HC to the completion of the recording becomes the sum of the data transmitting time and the recording time, which makes the time too long.

Because of the above-mentioned problems, it is adopted in this embodiment of the invention such method as to wait for the data every time at the occasion, that is, to wait for the transmission of the data from the host computer HC with the recording stopped temporarily in the process.

Figure 6:
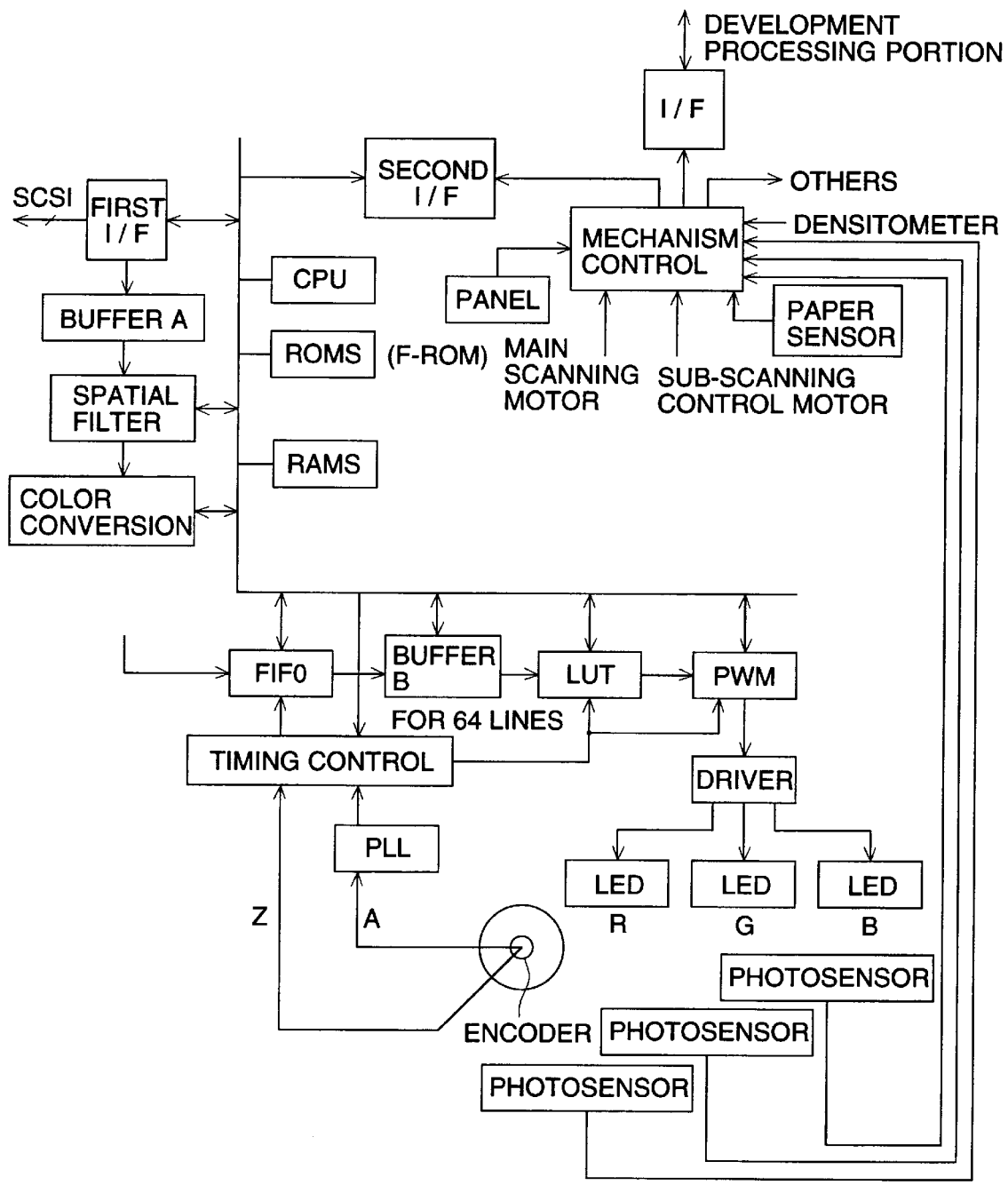
FIG. 6 is likewise an illustration of the outline of the image data flow in the printer of the apparatus.

The processing of the image data inside the printer 1 is explained now with reference to FIG. 6. In the printer 1, first the image data inputted through the first interface (I/F) are inputted into the buffer memory A. Said buffer memory A has a capacity capable of memorizing a good round sum, more than a certain degree of image data in order that the efficiency may be enhanced by reducing the number of times of stopping of recording in the aforesaid method of image data transmitting and receiving.

The spatial filter executes edge emphasizing processing for the image data read out from the aforesaid buffer memory A. The color conversion section makes the color conversion processing to match the image data to the photographic paper recording (silver halide photography), because the image data usually processed in the host computer HC are R, G, and B data which are matched to CRT. Further, said color conversion section is made up such that the input data of 8 bits each for R, G, and B are outputted as 8 bit data of R, G, and B each, and as will be described later, it has three-dimensional LUT's in combination, each having the color conversion characteristics adapted to each kind of photosensitive material, required in the color conversion processing. However, it is not necessary that all the data of 8 bits of R, G, and B are memorized, and for example, it may be made up in such a structure that the data of 5 bits for each are memorized and other points are obtained by interpolating calculation to output the 8 bit data. Further, also for every kind of input equipment and input mode it has a three-dimensional LUT corresponding to each.

The FIFO section outputs the image data transmitted with the instruction speed from the scanner side in accordance with the recording speed of the printer.

The buffer memory B stores the image data of predetermined number of pixels, for example 64 pixels, in the direction of said sub-scanning from the color conversion section, and on the other hand, outputs the image data of 48 pixels at the maximum to each of the aforesaid R, G, and B heads simultaneously. Further, at the same time, in the case where the position of mounting the heads are shifted in the direction of sub-scanning, correction of the recording pixel position in the direction of sub-scanning is made by shifting the timing of outputting the data.

The LUT section converts the image data subjected to the aforesaid color conversion in order that an appropriate density matched to the photographic paper may be obtained. To state it concretely, the LUT section is provided with the one-dimensional LUT's each corresponding to each color, said LUT's converting for gradation the color converted signals of R, G, and B with 8 bits each having passed through said color conversion section into the light quantity signals of LED with 11.5 bits. Further, it executes the control for making some of LED's belonging to the same group emit light for different duration to the others in the same group.

The PWM section converts the PWM data corresponding to the image data from the aforesaid LUT section into the emission time duration signal (pulse width) of each LED and outputs them to the driver section.

The driver section flows the constant current to the corresponding LED in accordance with the emission time duration signal.

Further, for controlling the timing of recording in the direction of main scanning, the encoder mounted to the drum 15 outputs the signal Z which is generated at a rate of one per one rotation of the drum 15 and the signal A which is generated at a rate of 2500 per one rotation likewise.

The PLL (phase locked loop) makes the aforesaid signal A multiplied by a predetermined number (8000×128/2500= 410, for example) to output, in order that a predetermined number, 8000 for example, of pixels may be recorded during a period of the aforesaid signal Z and a predetermined number of the image gradation number, 128 for example, may be given to the recording of each of said pixels.

Further, the timing control circuit controls the position to start recording on the basis of said signal Z through communication between the various circuits, while controlling the timing to record each pixel with the clock signal the pulse number of which is increased by the aforesaid PLL.

Further, each circuit is controlled by the CPU, on the basis of the data in the ROMs or the RAMs. For example, the spatial filter inputs the filter coefficients, the color conversion section inputs data such as conversion coefficients and others, and the FIFO section inputs the operate/stop instruction.

Moreover, said CPU communicates with the mechanism controlling circuit through the second interface. That is, because said CPU executes only image processing, it makes give and take of the commands between the mechanism controlling circuit which controls the rotation of the aforesaid drum 15 and movement of the aforesaid head carriage 16.

In addition to the above-mentioned control, the mechanism controlling circuit controls the heaters fitted to the LED heads and driving of the cooling fan on the basis of the temperature detected by a temperature sensor (not shown in the drawing) for stabilizing the emission of the LED's, calculates the coefficient for correcting the fluctuation of the light quantity on the basis of the light quantity of the LED's detected by each of the photosensors for R, G, and B installed at the side of the drum 15, and further, calculates the correction coefficients for the aforesaid LUT section on the basis of the result of measurement with a densitometer of the density obtained by developing the image of light emission with a specified test pattern. Besides, a paper sensor is provided for detecting the kinds of photographic material as will be described later, in order that correction of density corresponding to each kind of photographic material may be made.

II. PRINT HEAD

Next, detailed structure and operation of the print head section will be explained.

Figure 7:
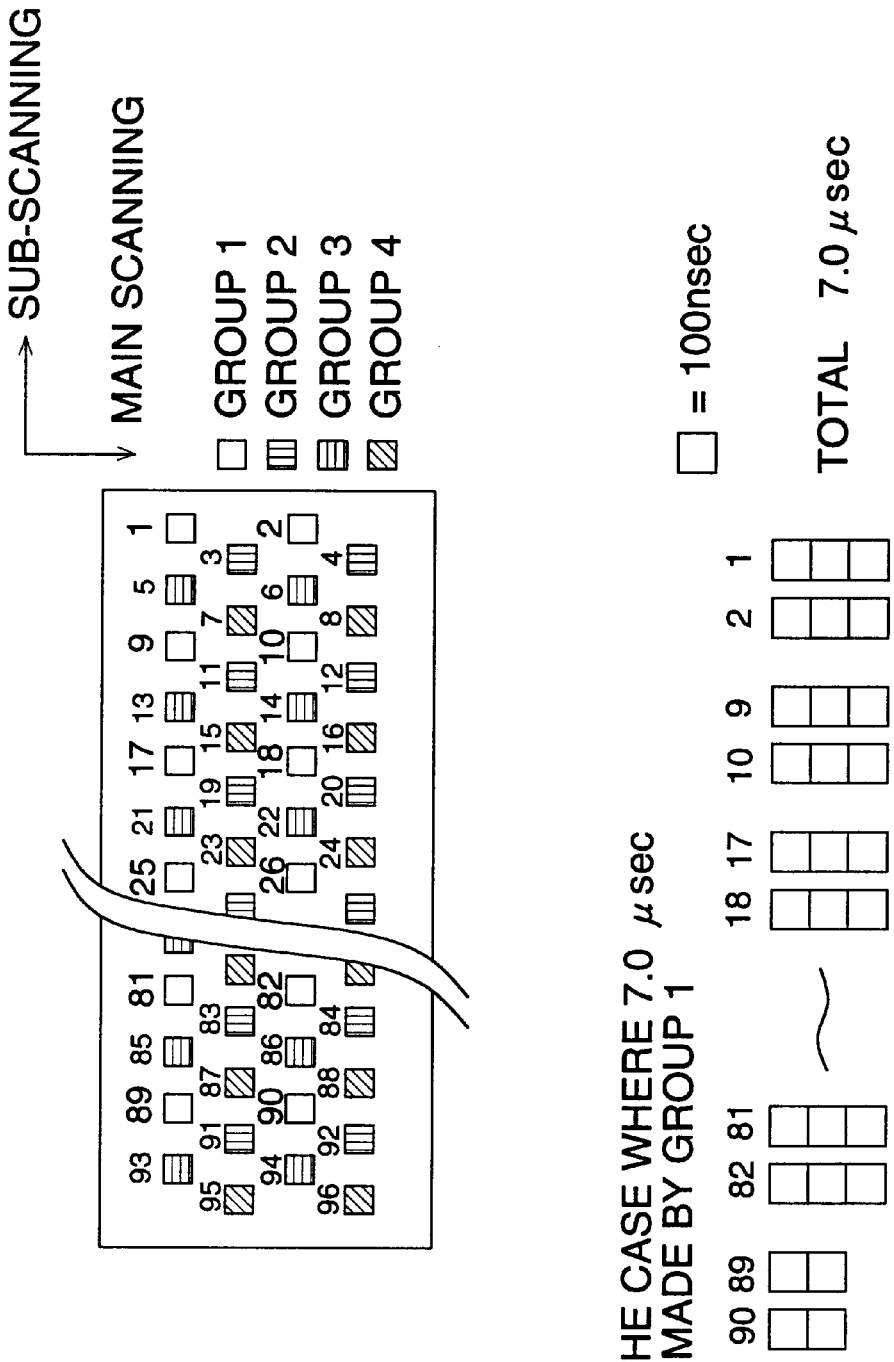
FIG. 7 is an illustration of the arrangement of the light emitting elements in the print head of the apparatus and an illustration of a method of multiple recording.

First, exposure recording system is explained. As is shown in FIG. 7, on each of heads 16R, 16G, and 16B for R, G, and B respectively, 96 LED's having peak emission wavelength corresponding to each of emission colors R, G, and B are provided, and 48 of them are disposed zigzag in the direction of sub-scanning, the direction of rotary axis of the aforesaid drum 15, and two rows of said zigzag arrangement are disposed in the direction of main scanning.

In this way, by disposing the LED's in two-dimensional arrangement, the head carriages are made to be compact even if the number of times of the multiple recording, which is described later, is made large, and in particular, the arrangement in zigzag two rows makes it possible to make the length in the sub-scanning shorter and to reduce also the size of optical system.

These 96 LED's are divided into four groups composed of the first group consisting of #1, #2, #9, #10, . . . #81, #82, #89, and #90 shown by solid lines, the second group consisting of #3, #4, #11, #12, . . . #83, #84, #91, and #92 shown by vertical hatching lines, the third group consisting of #5, #6, #13, #14, . . . #85, #86, #93, and #94 shown by horizontal hatching lines, and the fourth group consisting of #7, #8, #15, #16, . . . #87, #88, #95, #96 shown by oblique hatching lines, and the operation is carried out in such a manner that each LED in each group records the same image data on the same pixel, that is, 24 time corresponding to the number of LED's in each group so as to conduct multiple recording.

Figure 8:
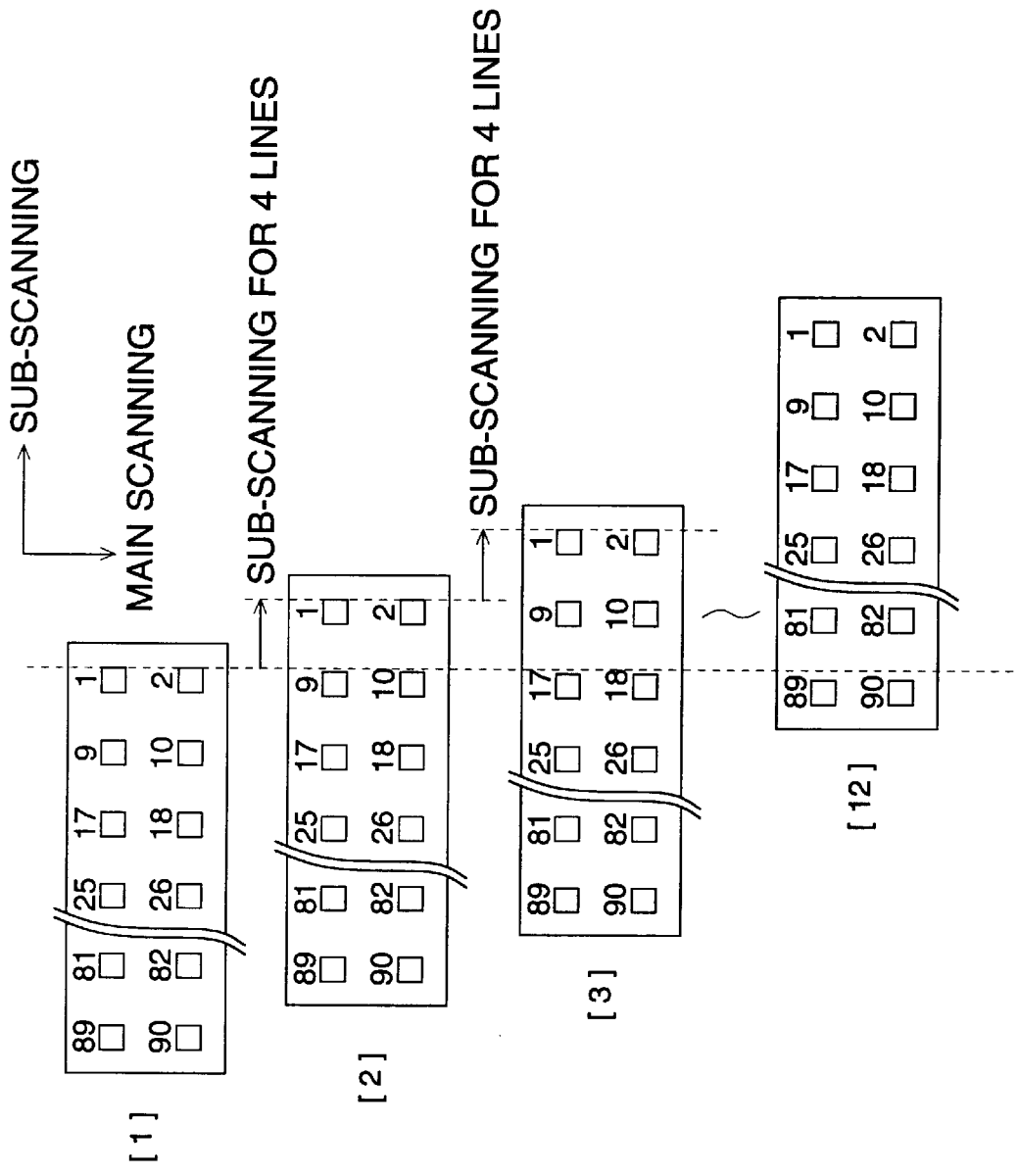
FIG. 8 is an illustration showing how main scanning and sub-scanning proceed.

Explaining the recording operation with reference to FIG. 8, the recording is carried out with the sub-scanning speed such that recording proceeds by the length of four pixels in one rotation of the drum 15, with 48 pixels in the sub-scanning direction subjected to recording simultaneously. In this case, two LED's in each group (for example, #1 and #2) record the same image data on the same pixel twice repeatedly (next #9 and #10, and next #17 and #18, . . . ), and 24 time multiple recording is carried out with the total number of 24 LED's during the drum 15 rotates 12 times.

In this way, by making multiple recording, the more the number of times is made larger, the more uniformly the fluctuation of light quantity of each LED is equalized to improve the image quality. Further, the light emitting time shared by each LED is shortened to the time divided by the number of multiple times, hence the rotation speed of the drum can be made higher by the shortened time, which enables to make the rotation stable, also resulting in improved image quality.

Further, in case of conducting multiple recording, the light emitting time of one LED becomes shorter with the increase of multiple times in order to keep the same recording time, thereby increasing the clock frequency. In the case where PWM (pulse width modulation) is carried out in analogue method, the scale of the circuit becomes large and cost becomes high. Further, in the case where digital method modulation is made, in the method where all LED's are made to emit light for the same time period with the unit emission time determined by the upper limit of the clock frequency, the number of gradations is 128 or 256 at the largest due to the increase of the clock frequency, which is not sufficient to secure good image quality. Therefore, in this embodiment, it is employed a method such that all the LED's in the same group are not made to emit light for the same time duration. That is, as many LED's as possible are made to emit light for the same time duration, but only the balance of them are made to emit light for different time duration, thus the number of gradation of image is made larger than the number of gradation by the emission time of a single LED.

To state it more concretely, as is shown in the example of FIG. 7, in the case where the total emission time of LED's belonging to the first group corresponding to the image data of a particular pixel is 7.0 μsec and the unit emission time of each LED is 100 nsec, the emission time of LED #1–#82 is made to be 300 nsec and that of #89 and #90 is made to be 200 nsec. By making this way, the number of gradation of image can be set to a sufficiently large value to secure good image quality.

Further, although the equalizing processing is made by dividing the LED's into four groups to make multiple recording, the density fluctuation generated by the errors in the intervals of light emitting elements between the groups may not be prevented and since lines of unevenness having a period of four pixel lines in the sub-scanning direction and streak in the main-scanning direction may take place, the correction to suppress this (interval correction) should be carried out. By making this correction, it can be prevented that the pixels belonging to a particular group are recorded to a large size.

III. CORRECTION OF LIGHT EMISSION QUANTITY

Now, the above mentioned interval correction will be explained in a little more detailed way.

The interval correction is conducted by the following steps such that for two groups in which the interval is so narrow to create high density streak, the light quantity of them is adjusted to be small, on the other hand, for two groups in which the interval is so wide to create low density streak, the light quantity of them is adjusted to be large.

(1) In this embodiment, the position of each chip of a LED array is measured by a microscope. The deviation value of the measured position of each chip from the reference position is obtained. Then, from the obtained deviation, for example, an average deviation value of each chip of each group from the reference position is obtained, thereby the deviation amounts Δ1 to Δ4 of the groups from the reference position are obtained.

Figure 9:
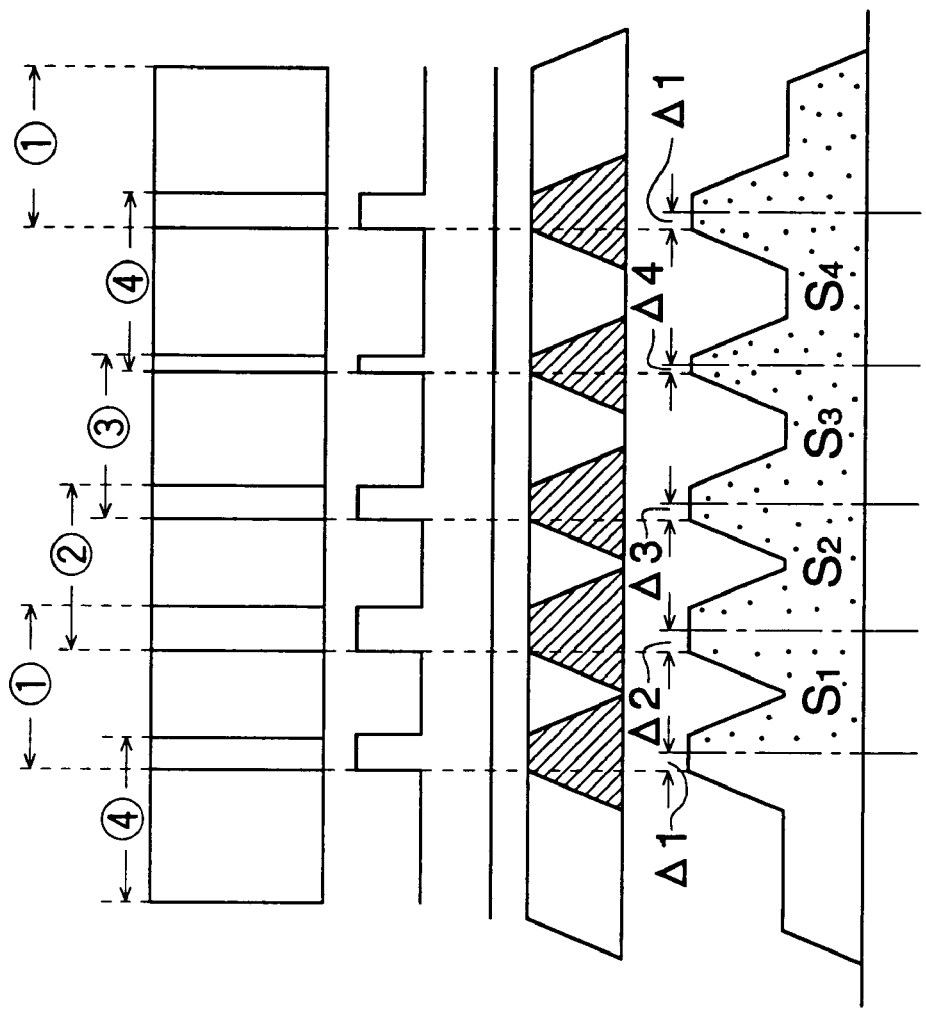
FIGS. 9(a) to 9(d) are illustrations of the interval correction of the light emitting elements in the apparatus.

(2) FIG. 9(*a*) shows an arrangement of model LEDs ① to ④ with which each of four groups of LED arrays is deemed as a single LED. In the arrangement, each of model LEDs ① to ④ is located at a position shifted by the corresponding one of the deviation amounts Δ1 to Δ4 from each reference position. FIG. 9(*b*) shows LED light emission amount distribution in the case that model LEDs ① to ④ are driven by the same driving current for the same period. FIG. 9(*c*) shows model outputs of the model LEDs ① to ④ in the case that the model LEDs ① to ④ emit light on a recording medium. In FIG. 9(*c*), a section marked with slant lines is a overlapped section between two output models. FIG. 9(*d*) shows the sum of model outputs of the model LEDs ① to ④. Incidentally, in FIGS. 9(*a*) to 9(*c*), the left side of each of LEDs ① to ④ is extended with a doted line, the reference line is indicated with a one doted chain line, and each of the deviation amounts Δ1 to Δ4 is indicated as a gap between the doted line and the one doted chain line.

In FIG. 9(*d*), when the sum of model outputs of the model LEDs ① to ④ is divided by the reference lines, regions S1 to S4 are formed between the reference lines. The correction coefficient Kd1=k/S1, Kd2=k/S2, Kd3=k/S3, and Kd4=k/S4 for each group are obtained so as to make the area of each of the regions S1 to S4 equal to each other. Wherein k is a model coefficient to make a model and is determined by the following ways. "k" is changed as a parameter for plural LED arrays selected as samples and image recording is conducted actually by the plural LED arrays. As the image recording, The value of k when image irregularities due to deviations in the interval becomes smallest is used as the model coefficient k.

(3) The interval correction is conducted by multiplying the correction coefficient obtained in (2) with LUT obtained in the light quantity correction method mentioned later.

Incidentally, it may be preferable to conduct the above steps in the following manner from the view of the customer's convenience. That is, steps (1) and (2) are conducted at the time of shipping from the factory. Then, step (3) is conducted after the light quantity correction mentioned later.

The above interval correction can be conducted for each LED by obtaining the deviation value for each LED and by obtaining the correction coefficient for each LED. However, in the case that the measuring system is requested to be high sensitive due to the reason that the light quantity per a single piece of LED is small, the interval correction can be conducted easily by conducting it for each group of LEDs.

On the other hand, the correction for the dispersion of the light quantity on the basis of the aforesaid measurement by the photosensors is carried out every time on the occasion of usage automatically or by a panel operation, however, regarding this correction, it is appropriate to make it by measuring the light quantity for each of the groups for the same reason as the above.

Figure 10:
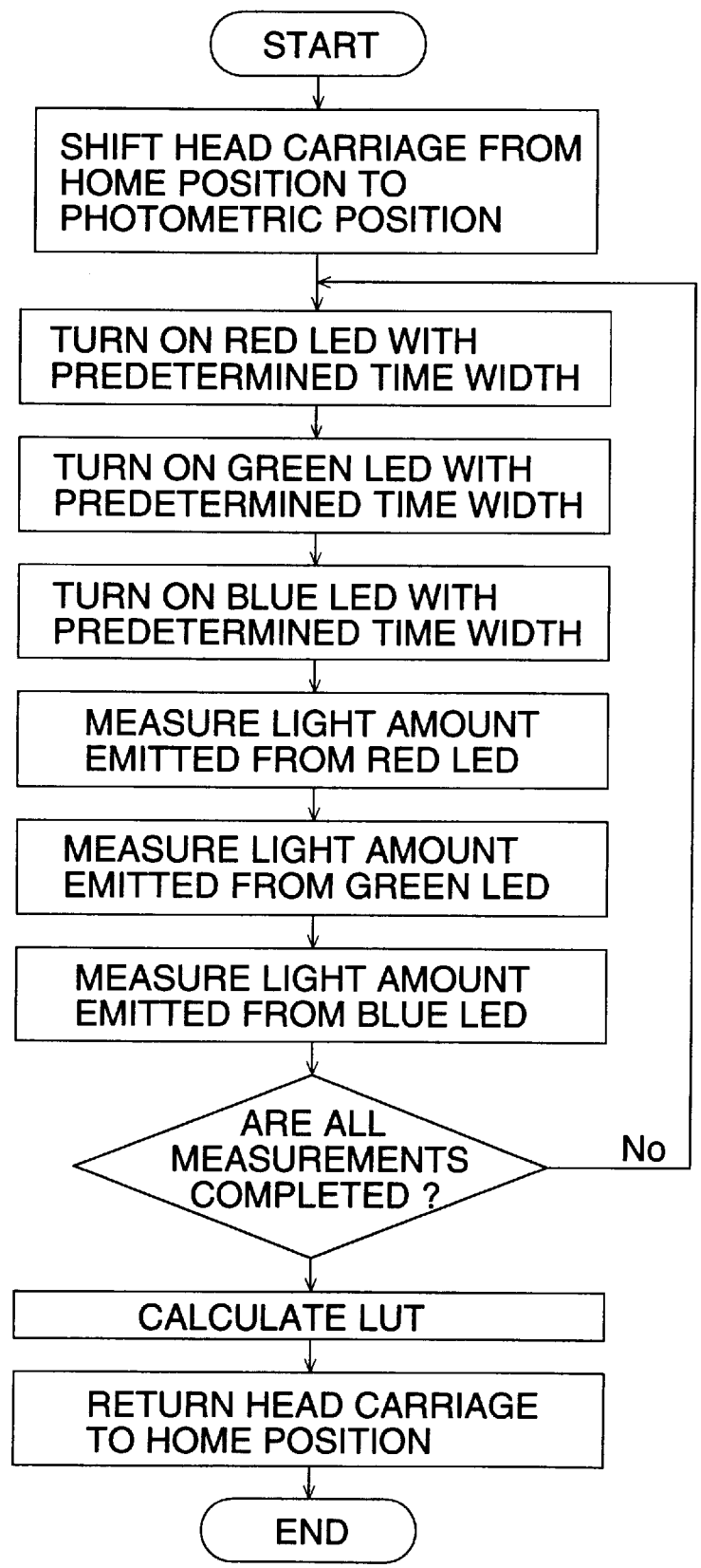
FIG. 10(a) is a flowchart showing steps to conduct the light quantity correction.
FIG. 10(b) is a diagram showing relationship among converting curves.
Figure 10:
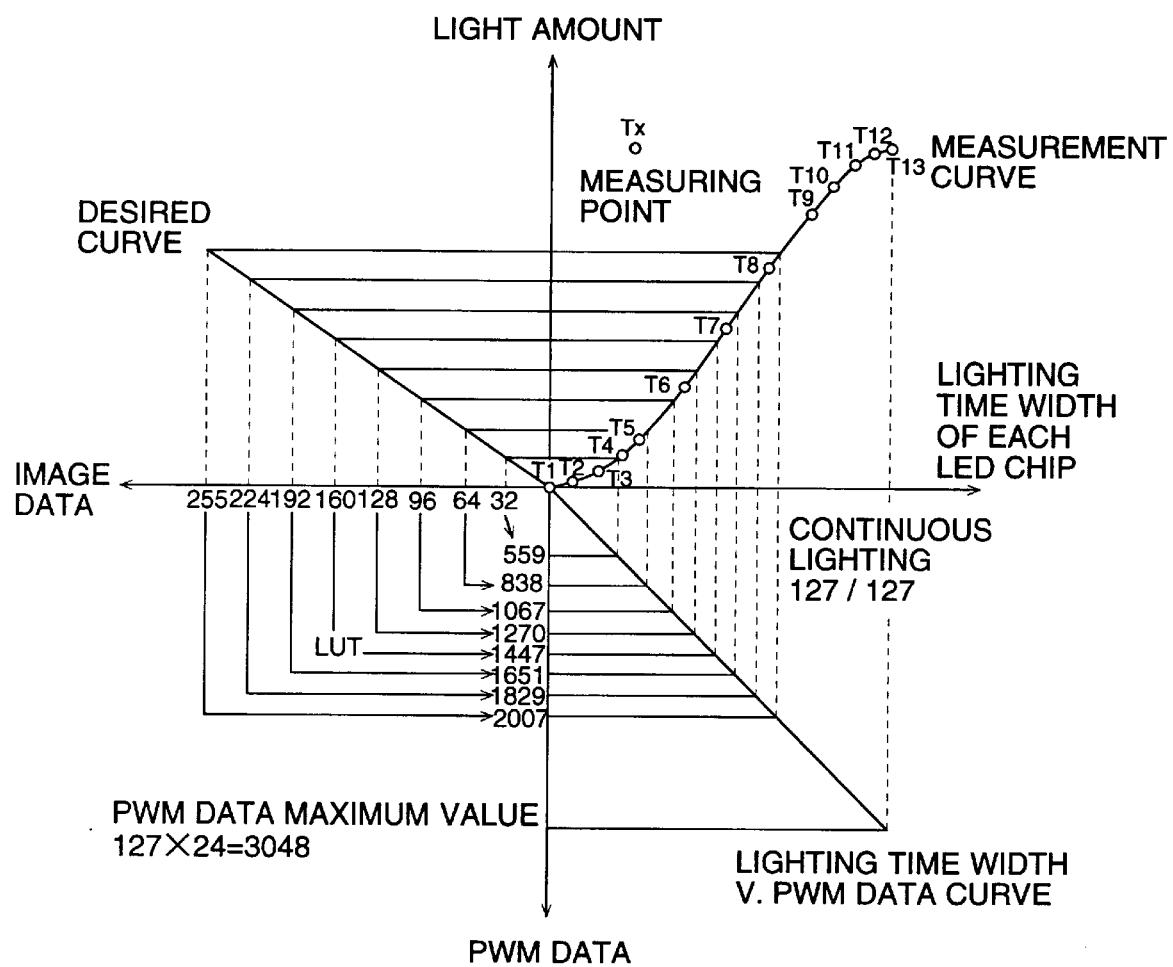

The light quantity correction can be conducted by the following steps as shown in the flowchart in FIG. 10(*a*) such that the exposure time period of the group whose light quantity is small is made longer and the exposure time period of the group whose light quantity is large is made shorter.

(1) The CPU in FIG. 6 sends through the second I/F to the mechanism control section the command to shift the head carriage 16 on which the LED heads are mounted toward the photosensor. Then, the mechanism control section controls the sub-scanning control motor so that the sub-scanning control motor shifts the head carriage and stops it when LED comes right above the photosensor. The photosensor is provided for each head of R. G. B. Accordingly, three sets of the photosensors are provided.

(2) Next, the CPU controls directly the PWM section such that all LEDs of the first group are turned on with the driving current of A1 so as to emit light plural times with a predetermined time interval of t during the time of T1. In other words, when the driving current A1 is applied, all LED of the first group emit light plural times with the predetermined duty ratio in which the LEDs are turned on by time period T1 during the predetermined time period t. Incidentally, the driving current A1 to drive the LEDs may be different slightly from LED to LED due to the dispersion in the performance of the driver.

(3) The light quantity of the light emitted from the all LEDs turned on in step (2) is received and measured by the photosensor. The mechanism control section retains the measurement result temporarily.

(4) As shown in FIG. 10(*b*), the lighting time is changed from T1 to T2, and then steps (2) and (3) are repeated. In such the manner, the lighting time is changed from T2 to T3, from T3 to T4, - - - - from T12 to T13.

(5) After the light quantity measurement for the first group is completed, the light quantity measurement is conducted successively for the second group to the fourth group in the same manner.

Then the steps (1) to (5) are conducted for the red head, the green head and the blue head. Consequently, 156 measurement values are obtained as total. That is, (13 pieces of the light quantity measurement values corresponding to the lighting times T1 to T13)×(four groups of LEDs)×(three colors of R,G,B)=156.

(6) The CPU receives the 156 measurement values from the mechanism control section through the second I/F and prepares LUT to correlate image data with PWM data sent to the PWM section to control the lighting time of each LED. The LUT is prepared for each group of each color such that the relationship between the image data and the light quantity is made to form the predetermined desired curve.

Incidentally, in the present embodiment, the light quantity of LED of each group is corrected so as to become the predetermined light quantity. By correcting the light quantity of LED of each group so as to become the predetermined light quantity, in the case that the light intensity of LED becomes small with the laps of time, the light quantity of LED of each group can be prevented from being corrected to be a small value. However, the light quantity of LED of each group may be corrected so as to become relatively substantially the same quantity.

Further, in the present embodiment, 13 pieces of the light quantity measurement values are obtained for each group of each color by changing the lighting time from T1 to T13. However, in order to correct more precisely, it may be preferable to increase the number of the light quantity measurement values.

Incidentally, even if such light quantity correction and interval correction as the above-mentioned are carried out, it is difficult to get rid of the density unevenness with four line period completely, however, as will be described in detail, the spatial frequency of said four line period can be set in the region where the sensitivity (frequency response) of the human vision is low, hence the bad influence to the image quality as seen by the human eyes can be avoided. Regarding this, detailed description will be given later.

Next, as has been already described, the printer employs the method wherein the image data are recorded with temporary stop period from time to time during operation, and the technology to cope with the problem in this method will be explained.

Figure 11:
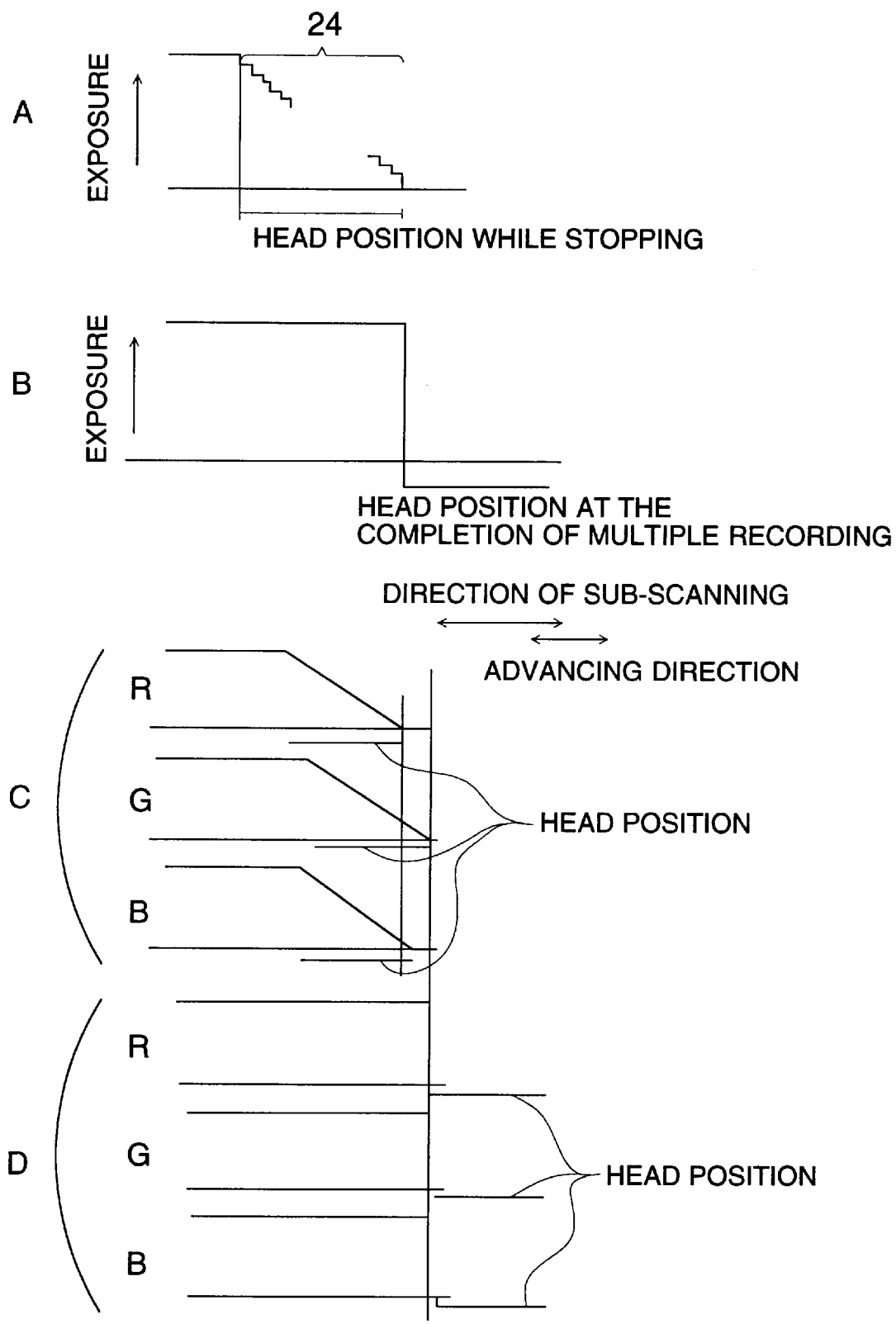
FIG. 11 is a drawing showing the recording operation at the time of temporary stop of the apparatus (B, D), compared with the normal operation (A, B).

When a temporary stop occurs in the process of recording, as shown in A of FIG. 11, 48 (the number of the LED's in zigzag arrangement) lines with different number of times of multiple recording are produced. Therefore, by recording the balance of each multiple recording repeatedly at the time of re-start of recording, the record is made without loss of exposure amount.

However, in this embodiment, as shown in FIG. 11B, such method is employed that, regarding the image data of all the pixels which are under recording at the time of issue of the stop instruction, recording operation is stopped after the multiple recording for each of them is completed. In addition, when the stop instruction is issued, transmitting of following image data is stopped at the same time, hence the LED's which have completed the multiple recording after the stop instruction move in the direction of sub-scanning with emitting no more light.

In comparison with the method wherein simply the balance of the multiple recording is made repeatedly at the time of re-start of recording, the above manner of the present invention can reduce the density lowering due to the sensitivity lowering of the photosensitive material in accordance with the prolonged exposure time interval even with the same exposure amount. Accordingly, the technique of the present invention can reduce the image quality lowering due to the low density streak on the lines of temporary stop section to be recorded for said balance of multiple recording.

Further considering this problem in view of the three colors R, G, and B, even if the fitting positions of the respective heads 16R, 16G, and 16B have dispersion in the direction of sub-scanning, as far as the position of recording is concerned, correction can be made by the control by the electrical system so as to record on the same line of main scanning. However, because the positions of the heads of LED's are different for the three colors R, G, and B, regarding the head of the color positioned in the advancing side in the direction of head moving, recording of the image data for the pixel in the further advancing position in the direction of head moving, compared with the head positioned in the delayed side, has been started (refer to FIG. 11C). In that case, by the exposure of mixing color component by each head, on said pixels in the advancing position in the direction of head moving has started already the exposure of the other color component, and due to the interruption of this exposure of mixing color component, the above-described lowering of density is generated.

Therefore, it is employed the method such that recording is stopped after the image data up to the pixel, on which the most precedent recording has been made by the head positioned at the front (the head of G color in FIG. 11C) in the direction of moving (direction of sub-scanning) among the R, G, and B heads, are completely multiple-recorded on pixels up to said pixel by all of the heads of R, G, and B, namely 16R, 16G, and 16B. The way of recording at re-start of recording will be described later.

In this manner, by stopping the operation after the completion of the multiple recording of the three colors R, G, and B on the latest pixel at the time of issue of the stop instruction, good image quality can be secured without being subjected to the influence of the aforesaid density lowering.

As another embodiment of the invention to solve this problem, it may also be employed a method such that, because the influence of the aforesaid density lowering becomes larger with the prolonged period of said temporary stopping of recording, although recording is stopped at the same time with the stop instruction, the time period from said stop to re-start of recording is measured so that the quantity of emitted light (time duration of light emitting) of the LED's immediately after the re-start may be made to be larger in accordance with said measured time for the correction.

In this way, by compensating the loss of recording light quantity due to the phenomenon of said density lowering during the stop of recording with the increased quantity for correction at re-start of recording, good image quality can be secured.

Further, as for the correction by increasing light emitting time duration, it may be made by carrying out the correction only once or several times of recording immediately after the re-start of recording, and the amount of said correction may be obtained by correcting the characteristics of the aforesaid LUT on the basis of said time period of stop or by setting correction coefficients.

Further, considering the aforesaid density lowering phenomenon, the total amount of light emission in the case of multiple recording (number of times×emission time per one LED) should be set for correction to a value larger than the exposure amount required for the single exposure recording. In this case, the total exposure amount is varied in accordance with the time interval between exposures, more specifically, the total amount of exposure is set in a manner such that the longer the interval is, the larger the increasing correction amount of the total exposure is made, and the shorter the interval is, the smaller the increasing correction amount, the LUT or the correction coefficient is set such that the same effective total exposure amount may be obtained.

In this way, good image quality can be secured even if the number of times of multiple recording is increased.

Next, explanation will be given regarding the number of LED's provided, as it is 96 for each of the color component in this embodiment.

In the case where multiple recording is made on one pixel by a plurality of elements, of course image quality can be improved by increasing the number of LED's, but it is enough if an image quality which is felt as good by the human vision is obtained, and increasing the number of the elements more than required makes only the cost higher and makes the control of them difficult.

Therefore, in this invention, said number of LED's provided is set to a value which enables securing good image quality considering various kinds of fluctuations and dispersions in the apparatus.

In the case where image is recorded on the silver halide photosensitive material, a lot of factors of fluctuations are generated. They are the dispersion of sensitivity due to the difference of lot or kind of the photosensitive material, the daily sensitivity fluctuation of the development machine, and so forth. The dispersion of the light quantity of the LED's is added to the above, the fluctuation as the recording system is made to be larger.

Now, let g be the fluctuation of the developing machine, let f be the fructuation and dispersion of the sensitivity of the photosensitive material, and let ϵ be the fluctuation and dispersion of the LED's, where g, f and ϵ are converted into exposure amount respectively. Further, let N be the number of LED's, and let Ps be the exposure value at the standard (with no fluctuation and dispersion), then the minimum amount of exposure Pmin is given by the following equation:

$$Pmin=Ps/(1+g)/(1+f)/\{1+\epsilon/(N)^{1/2}\} \quad (1),$$

where g is obtained by the following equation, using Δg obtained by developing the standard photosensitive material by the developing machine, and measuring the density to calculate the density difference from the standard density gs:

$$g=\exp(\Delta g/\gamma)/\exp(gs/\gamma),$$

[γ is the γ value (gradient) in the vicinity of the gs].

Further, f is obtained likewise by the following equation, using the density difference Δf obtained from the average density value fa of the photosensitive material of the same kind:

$$f=\exp(\Delta f/\gamma)/\exp(fa/\gamma),$$

[γ is the γ value (gradient) in the vicinity of the fa].

Now, let M be the specified value of the number of steps of modulation, and let C be the lower limit of the number of gradations which is defined as will be described later, then the number of LED's N is specified to meet the following inequality $$N\times M\times Pmin/Ps>C \quad (2)$$

for the value of C not less than 200, or desirably, not less than 400.

Now, regarding the concept of said lower limit of the number of gradations C, explanation will be given. Although said lower limit of the number of gradations varies depending on the γ characteristic of the photosensitive material and whether the material is negative or positive, the basic concept is as follows.

Let n be the value of the image data outputting the exposure amount required for the recording having the density in the neighborhood of the minimum density Dmin to be recorded, let γ be the γ value (gradient) in the neighborhood of this density, let the photosensitive material be negative, and let the exposure amount be directly proportional to said n, then following equation is established:

$$\Delta D=\gamma\times\{\log(n+1)-\log n\}<\delta D \quad (3).$$

where δD is the minimum density resolving power of the human eye, and ΔD is the density difference for one step between the output values n and n+1. Transforming the equation (3), $$\Delta D=\gamma\times\{\log(n+1)/n\}$$

$$=\gamma\times\log(1+1/n)$$

$$\approx\gamma\times1/\ln 10\times 1/n$$

$$=\gamma/2.3/n$$

$$\therefore n\gamma/2.3/\delta D \quad (4).$$

This inequality is required to be correct in the low density region.

On the other hand, setting the maximum density is Dmax, the output value of exposure amount Nmax required for obtaining said maximum density Dmax requires more than n multiplied by $10^*\{(Dmax-Dmin)/\gamma\}$ ($10^*A$ means $10^A$). γ is large in the neighborhood of medium density but small in the neighborhood of low density.

Now, setting Dmax=2.3, Dmin=0.3, γ=2, and the density resolving power of the human eye δD=0.02, the lower limit of number of gradations C, which is required for the modulation of the light emitting elements for securing visually good image quality, is shown by the following condition:

$$C=2/2.3/0.02\times 10^*\{(Dmax-Dmin)/\gamma\}\approx 435 \quad (5).$$

Further, if the density resolving power of the human eye δD has a little lower value of 0.05, $$C=2/2.3/0.05\times 10^*\{(Dmax-Dmin)/\gamma\}\approx 173 \quad (6).$$

In practice, because the γ value is decreased in high density region and low density region, the value obtained by multiplying the value of (5) or (6) with two is desirable. In the above example, the calculation is made for the negative material, and in the case of positive material the way of thinking is also nearly the same.

In addition, the condition where the aforesaid lower limit of number of gradations C can be secured with the value of steps of modulation specified as M, even under the worst condition that the exposure amount becomes minimum due to the aforesaid various kinds of dispersions, is the above-described equation (1), accordingly, the number of light emitting elements to be provided N may be determined so as to meet the equation (1) with the aforesaid lower limit of number of gradations C substituted by 200 or desirably 400 from the condition of the aforesaid equation (5) or (6).

To state the above conditions collectively, when the specified value of the number of steps of modulation is let to be M, the minimum exposure amount with dispersion taken into consideration is let to be Pmin, and the exposure amount in the standard condition without dispersion is let to be Ps, it is appropriate that the number of light emitting elelments N is defined so as to meet the following equation:

$$N \times M \times Pmin/Ps = N \times M/(1+g)/(1+f)/\{1+\epsilon/(N)^{1/2}\} \geq 200\text{--}400 \quad (7).$$

Thus, the number 96 is selected as the number of light emitting elements to be provided N to meet said equation (7).

Next, in this embodiment, the apparatus has a structure such that the multiple recording is made with the period of four pixels in the direction of sub-scanning, the technical ground of this will now be explained. In the case where multiple recording is carried out, image quality can be improved by increasing the number of multiple times with the exposure amount and the total exposure time kept constant, however, increased multiple times requires higher speed of main scanning (the rotary speed of drum 15) corresponding to the increase, and it is limited by the difficulty in circuit structure and mechanical driving, as well as by the difficulty due to the increased acceleration.

Therefore, regarding also the number of multiple times like the aforesaid number of light emitting elements to be provided, the lower limit is to be defined in the range where good image quality can be secured.

According to the result of general analysis, the spatial frequency where the visual sensitivity begins to become low when an image is seen at the standard position with a distance of 20 cm from it is about 31 p/mm (1 p/mm:number of high-low density pairs per 1 mm) and its period is about 300 μm.

Now, let l be the number of pixels per one period in the direction of sub-scanning in the multiple recording, and let S be the size of a pixel, then following inequality relationship is defined:

$$l \times S < 300 \; \mu m \quad (8).$$

Within the range of number of pixels l per one period in the sub-scanning direction in the multiple recording to satisfy the above inequality (8), the number of pixels l, which is capable of avoiding the aforesaid difficulty in circuit structure and mechanical driving, the difficulty due to the increased acceleration, and the problem of pixel size, is selected to give l=4, and S=70 μm (360 dpi).

Next, the method of correcting the density fluctuation of the photographic print will be explained.

Heretofore, in the analogue-type image forming apparatus, a mini-laboratory for example, it has been carried out to correct the density fluctuation for each of items (channel: CH) such as the kind of photosensitive material and the daily development characteristics, but it is simply made in a indiscriminate way by summing up the correction values for the fluctuations obtained as scalar quantities for the respective items to correct the exposure time, and it does not correct the conversion characteristics data, hence it can not practice a minute and close density correction.

On the other hand, there has been a digital-type image forming apparatus such that the correction of gradation conversion data is made by estimating the output characteristics through measuring density produced from the output of a test chart, but the correction is made not for each of the divided factors, but collectively for all the factors inclusively, hence it is required to make comparatively time-consuming corrections on every occasion for any one of the variations of the fluctuation factors such as change of photographic paper and variation of the development characteristics (for example, for the variation of the development characteristics, when using a different kind of photographic paper, a series of correction operations should be done again).

Therefore, in the method shown in the following, by employing the method wherein the correction is made for each of the density fluctuation factors respectively and also the conversion table is varied for correction with the correction data, the good operational performance due to CH structure and the processing for the color and gradation utilizing the advantage of digital method are made to be compatible.

In other words, a test chart in accordance with the fluctuation factor is outputted on the basis of a predetermined conversion characteristics, and the correction information is calculated from the measured density and memorized, further new conversion characteristics data are prepared from the information which are set as the respective conversion characteristics for the aforesaid color conversion section in FIG. 6 and the LUT section provided for respective colors.

In the hardware structure shown in FIG. 6, the color conversion section made up of the 3-dimensional LUT is subjected to the paper CH (1) correction which is a color conversion correction for each of kinds of photosensitive materials, and the LUT (gradation conversion) section made up of the one-dimensional LUT's for the R, G, and B colors respectively is subjected to the master CH correction which is the correction for the factor of fluctuation of the apparatus (mainly correction for the fluctuation of the development section), the paper CH (2) which is the correction for each lot of the photosensitive material, and the correction for the dispersion of the light quantity of the LED's.

First of all, the master CH is explained. The master CH corrects mainly the fluctuation of sensitivity and color balance produced by the automatic developing machine (the development characteristics fluctuation). The fluctuation of the development characteristics, as has been heretofore well known, can be corrected approximately by controlling the exposure amount. For this reason, the master CH values are kept as coefficient values of the respective colors. By doing this, the independence against the paper CH to be described later is well kept. Further, the master CH can be made to have one value for each of the photosensitive materials which can be processed under the same development condition, for example, in the case where other kind of photographic paper is used in the same day, the number of set-up (renewal) operation can be reduced. Because the master CH is the CH for correcting the variation of the development characteristics, such method is employed as to do the set-up once a day, or to make time management on the apparatus side and to urge the user to carry it out periodically.

In the following, the adjustment flow of the master CH will be explained.

(1) Printing of the Test Chart

Figures 12, 13:
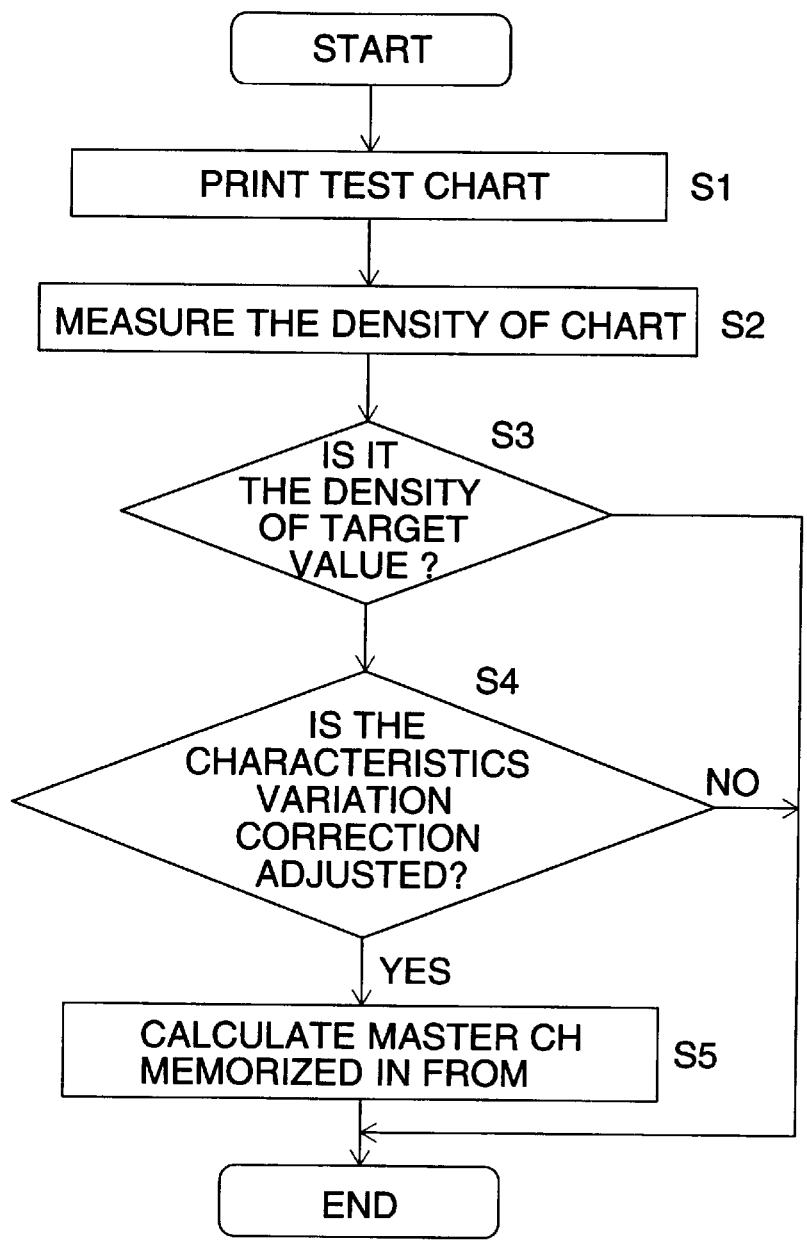
FIG. 12 is a flow chart of the routine to calculate the master CH of the apparatus.
FIG. 13 is a drawing showing an example of a test chart used for calculating the master CH value.

The conversion data prepared on the basis of the characteristics of the master CH, the paper CH, and the correction curve of LED's are set in the LUT section, and the gray step chart is outputted (S1 of FIG. 12). On this occasion, in the paper CH(1), which will be described later, data with linear characteristic (input value=output value) are loaded. This is done for the purpose of making the gradation conversion by inputting the target color data directly into the LUT section without being influenced by the color conversion section.

(2) Measurement of Density

The density of the test chart printed is measured with a densitometer, and the data are read in the CPU (S2 of FIG. 12).

(3) Check of the Density

The CPU checks if the patch at the pertinent position gives the density of target value correctly (S3 of FIG. 12).

Then, in the case where the criterion is met (without deviation), the process is ended, but if the criterion is not met, it is inquired of the user if the correction for the characteristics fluctuation shall be made or not, and if the answer is yes, the procedure goes to the next step (S4 of FIG. 12).

On this occasion, regarding the deviation of density, it may be employed the method such that it is judged if it is due to the fluctuation of the characteristics or to some error (becomes an extreme value), then in case of no error, it is inquired of the user that the correction for the characteristics fluctuation shall be made or not, and if the answer is yes, the procedure goes to the next step.

(4) Calculation of the Master CH and Registering it in the Non-volatile Memory (flash memory=FROM)

The master CH is calculated and the result of calculation is registered in the non-volatile memory as the master CH value (S5 of FIG. 12).

After this, on the occasion of printing, this value is used for the correction of development characteristics fluctuation.

In the case where the correction is made again, the above procedures (1)–(4) are repeated. As a general way of making use of the process, the operation is ended at the point when the result of check of density is accepted finally.

Next, the algorithm of the calculation of master CH will be explained.

For example, it is measured the density of the patch of 3-step gray scale of the test chart shape having the target density values 0.64, 0.76, and 0.90 as shown in FIG. 13, and from the deviation of measured density for the central target density of 0.76, the multiplication factor for correcting the output table values is calculated as the master CH. As for the central target density, it is desirable to select the value around 0.7, but it may be not necessarily this value.

Figure 14:
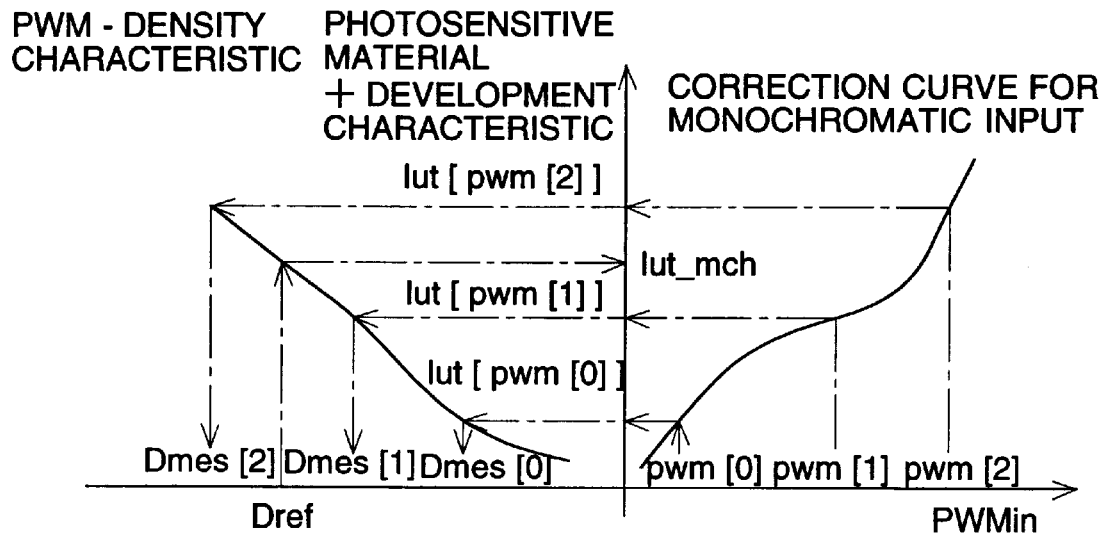
FIG. 14 is a drawing for explaining the calculation algorithm for the master CH.
Figure 15:
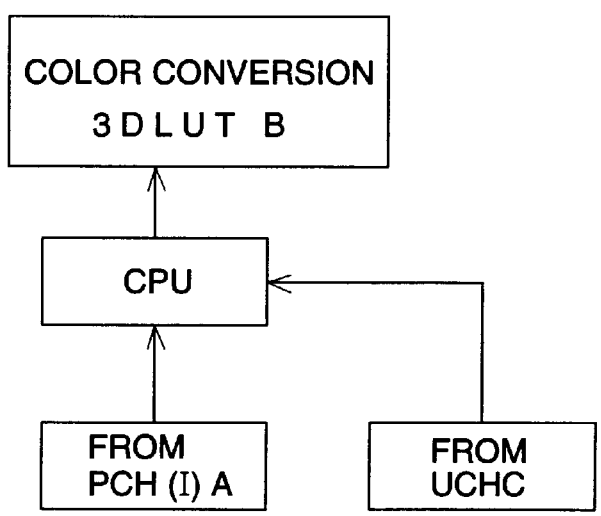
FIG. 15 is a drawing showing the method to apply a color conversion characteristics in accordance with the preference of the user.

Referring to FIG. 14, the calculation of the master CH using the result of the aforesaid density measurement is explained. The master CH is calculated by interpolation from the three density values around the target density. Because the process is the same for each of colors, explanation is done for one color.

The input value to the LUT section for obtaining the three step patch with the target density values 0.64, 0.76, and 0.90 and the actually measured density values to be obtained are set as {pwm[0], pwm[1], pwm[2]}, {Dmes[0], Dmes[1], Dmes[2]} respectively. Further, the table to be obtained as the composite characteristics of the master CH and the paper CH(2) which will be described later is set as lut[1256].

Now, let lut–mch be the value in lut[256] on the correction curve for obtaining the target density, and mchn1 be the correction coefficient of the master CH, then, (1) when Dmes[1]<0.76 (=Dref),
the value of lut–mch is obtained from the following equation by interpolation calculation, $$\text{lut-mch} = (\text{lut}[\text{pwm}[2]] - \text{lut}[\text{pwm}[1]]) \times (\text{Dref} - \text{Dmes}[1])) / (\text{Dmes}[2] - \text{Dmes}[1]) + \text{lut}[\text{pwm}[1]].$$

(2) When Dmes[1]>0.76 (=Dref),
in the same manner as (1), $$\text{lut-mch} = (\text{lut}[\text{pwm}[1]] - \text{lut}[\text{pwm}[0]]) \times (\text{Dref} - \text{Dmes}[0])) / (\text{Dmes}[1] - \text{Dmes}[0]) + \text{lut}[\text{pwm}[0]].$$

Because the target density was obtained with the value of lut[pwm[1]] before the development characteristics varied, the correction coefficient of the master CH is obtained by mchn1=lut–mch/lut[pwm[1]]). Accordingly, let (m0r,m0g,m0b) be the preceding values of the master CH for the colors R, G, and B respectively and (m1r,m1g,m1b) be those of this time, then m1r=m0r×mchn1r, m1g=m0g×mchn1g, and m1b=m0b×mchn1b.

Figure 16:
FIG. 16 is a drawing for explaining the case where the paper CH (1) is used, switched in accordance with the mode.

Next, the explanation about the paper CH will be given. The paper CH is made to be divided into two. In the paper CH(1), the CMS (color matching) data are allotted to the basic kinds of photographic papers. The correction for each of the basic kinds of photographic paper is carried out and the color conversion is made with the consideration for both of the color gamut of the input media and the color gamut of the output media. That is, in the case that the color gamut of the input media is wider that the color gamut of the output media or in the case that the color gamut of the input media is narrower than the color gamut of the output media, the color conversion is carried out to use both of the color gamut of the input media and the color gamut of the output media. Regarding the correspondence of the photographic material to the paper CH(1) applied, it is managed on the table of the non-volatile memory for making the codes of the photographic materials to be provided separately correspond to the CH used. On the occasion of printing, the CH data specified are used for correction. The paper CH(1) is loaded in the color conversion section, and in addition to that the color conversion section is loaded directly with the paper CH(1), it can also be loaded with the data UCHC modulated by the color adjusting parameter specified by the user. Further, as shown in FIG. 16, the data to be loaded may be switched from one to another in accordance with the modes such as photographic mode and CG mode.

In the paper CH(2), the interlot dispersion in the same type of the photosesitive materials after the photosesitive materials are classified for each type is corrected and the CH data are set for the desirable gradation. In the paper CH(2), utilizing the advantage of digital processing, the conversion characteristics such that the relationship between input and output density presents a predetermined gradation are kept as the CH in a table format. The CH data are memorized in such a manner as to be in correspondence to a part or all of the paper codes. The paper CH(2) is renewed by being subjected to set-up when the paper is used for the first time, or when the paper lot in use is changed. In the case where no set-up has been made for the pertinent paper, the calibration begins with the initial table which is memorized as the initial values. On this occasion, a plurality of the correction curves may be kept as the initial values for the paper CH(2), and regarding which table should be selected, selection may be made in such a manner that the code corresponding to the paper is read, and the initial table corresponding to the code is read out from the non-volatile memory.

Besides, in the set-up of the paper CH(2) for the second time or after, if the CH data are memorized for all of the paper codes, too much memory area will be occupied, hence the memory area is limited, as shown in FIG. 17, in such a manner that for example, for the 64 paper codes the initial values are set for all of them but renewed values are limited up to 16. Further, as shown in FIG. 17, it is noted for each of said limited memory area if the renewed values are memorized or not, and in the case where the renewed values are memorized its paper code is memorized and presented to the user. Moreover, at the time of set-up of paper CH(2), it is judged if the renewed values are memorized in the memory area or not, and in case of not being memorized, the calibration is begin with said initial values, and if the renewed values are memorized, the calibration starts with said renewed values made as initial values. Further, when the renewed values of the paper CH(2) of the new paper codes are memorized, if the memory has free area, they may be memorized in the free area, but if the memory has no free area, the user may be made to select the area where the renewed values of the paper code of less frequency of use are memorized to rewrite on it.

In the following, the adjustment flow of the paper CH(2) is shown.

(1) Printing of the Test Chart

Figure 18:
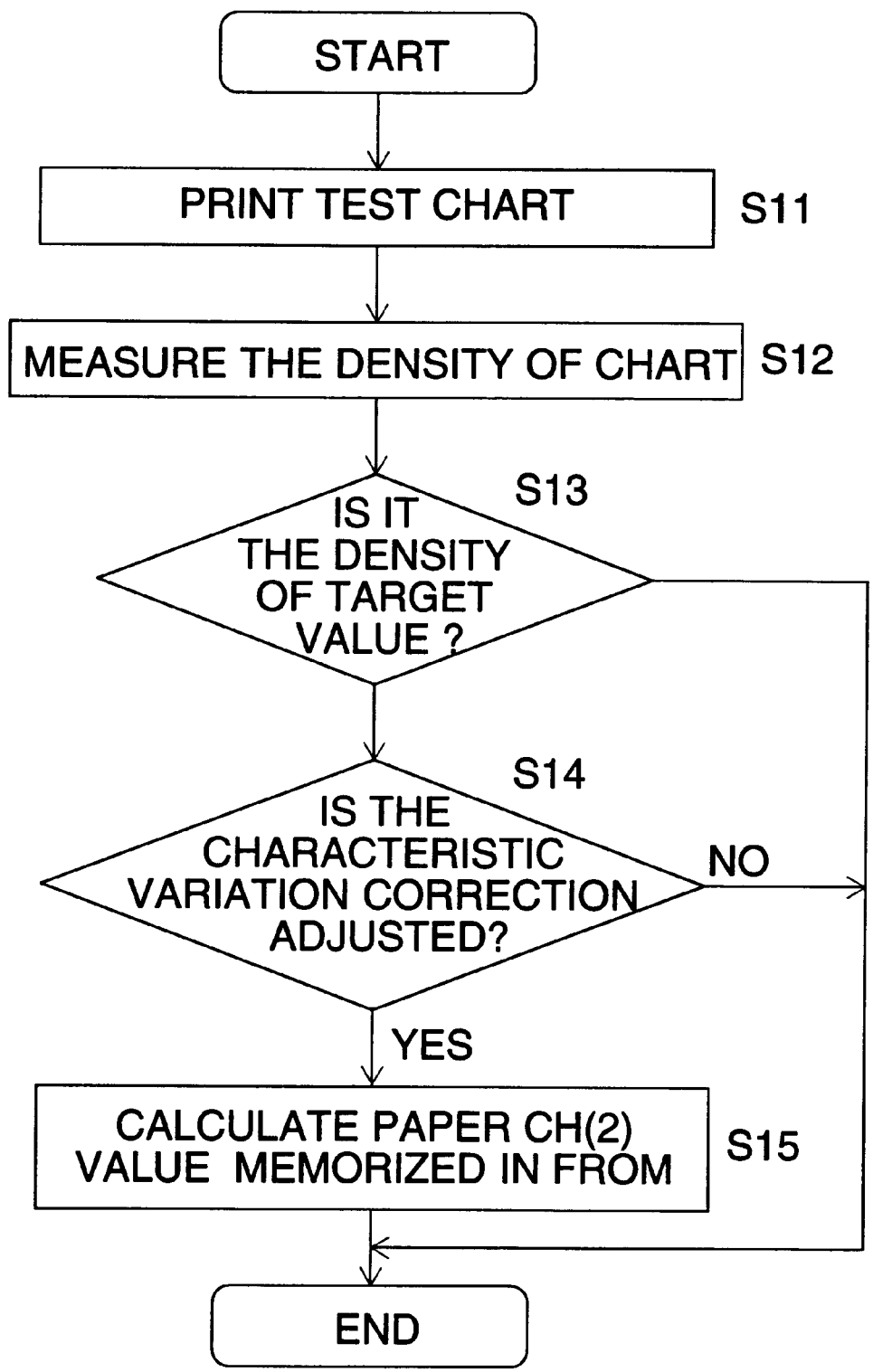
FIG. 18 is a flow chart of the routine for calculating the paper CH (2) of the apparatus.

The conversion data prepared on the basis of the characteristics of the present paper CH correction curve, the aforesaid master CH values, and the correction curve of LED's are set in the LUT section, and the gray step chart (18 steps or so) is outputted (S1 of FIG. 18). On this occasion, the paper CH(1) is made to have a linear characteristic (input value=output value). This is done for the purpose of making the gradation conversion by inputting the target color data directly into the LUT section without being influenced by the color conversion section.

(2) Measurement of Density

The density of the test chart printed is measured with a densitometer, and the data are read in the CPU (S12 of FIG. 18).

(3) Check of the Density

The CPU checks if the patch at the pertinent position gives the density of target value correctly. Then, in the case where the criterion is met (without deviation), the flow is ended (S13 of FIG. 18). If the criterion is not met, it is inquired of the user if the correction for the characteristics fluctuation shall be made or not, and if the answer is yes, the procedure goes to the next step. In the case where no adjustment is done, flow is ended (S14 of FIG. 18).

On this occasion, regarding the deviation of density, it is employed the method such that it is judged if it is due to the fluctuation of the characteristics among the different lots of the papers or to some errors by the malfunction of the densitometer or by the improper chart, then in case of no error, it is inquired of the user that the correction for the characteristics fluctuation shall be made or not, and if the answer is yes, the procedure goes to the next step.

(4) Calculation of the Paper CH(2) and Registering it in the Non-volatile Memory (flash memory)

The paper CH(2) table is calculated and the result is registered in the non-volatile memory as the paper CH(2) value table (S15 of FIG. 18).

After this, on the occasion of printing, in the case where the paper can be judged as the one of the same kind from the paper code, these value table is used as the characteristics of the lot In the case where the correction is made again, the above procedures (1)–(4) are repeated. As a general way of making use of the process, the operation is ended at the point when the result of check of density is accepted finally. It is necessary to provide the initial value table (gradation conversion table) of the paper CH(2) for the paper codes of all the photosensitive materials, and the plural tables of renewed values are provided but if they are provided generally for all of the paper codes, a lot of areas in the non-volatile memory are used. For this reason, it may be appropriate to have them not for all the photosensitive material codes but to have I/F means in order that the user may select to rewrite on the memory area of correction CH for the photosensitive materials not to be used at the user's discretion.

Next, the algorithm of calculating the paper CH(2) will be explained.

Figure 19:
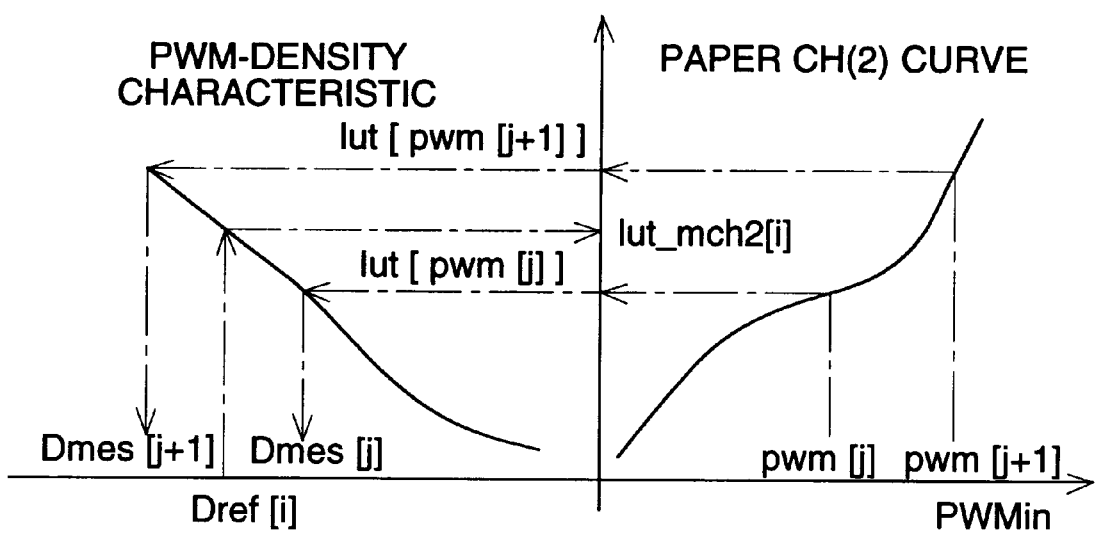
FIG. 19 is a drawing for explaining the algorithm to calculate the paper CH (2).

Now, let pwm[i], Dref[i], Dmes[i] be the input value to the LUT section for outputting the i-th target density of the test chart, the target density value, and the measured density value respectively, and lut[256] be the paper CH(2) table used on this occasion. Only one color is taken into consideration for simplicity. Then the value of the LUT for obtaining i-th target density is set as lut–pch2[i], and on condition that Dref[i] is between Dmes[j] and Dmes[j+1], from the relationship of FIG. 19, $$\text{lut–pch2}[i] = (\text{lut}[\text{pwm}[j+1]] - \text{lut}[\text{pwm}[j]])/(\text{Dmes}[j+1] - \text{Dmes}[j]) \times (\text{Dref}[i] - \text{Dmes}[j]) + \text{lut}[\text{pwm}[j]].$$

BY repeating this, the sets of (i,lut–pch2[i]) are obtained. From these sets of data, the relationship between the input values to the LUT section and the corrected output values are discretely obtained, and by interpolating the gap, the paper CH(2) can be calculated. The paper CH(2) are memorized in the predetermined area specified for the paper codes. Further, in the above-mentioned algorithm, the intervals of the target density values Dref[i] may be not uniform, hence the intervals at high-light section are made to be finer to make the color balance in the high-light section more stable.

Next, the method for obtaining the correction data from the master CH, the paper CH(1), and the paper CH(2) obtained in the above will be explained.

As for the paper CH(1), the data of the CH specified by the paper code are loaded as they are or modulated by the color adjusting parameter of the user in the color conversion section.

The master CH, the paper CH(2), and the LED correction data are loaded as composed together in the LUT section of the respective colors.

The master CH and the paper CH(2) are each read out from the respective predetermined CH memory areas on the basis of the paper code.

The paper CH(2) is a table with 8 bit input and 11.5 bit (3048=24×127) output and the master CH is a 16 bit rational number with fixed decimal point without sign.

The output values of the paper CH(2) is multiplied by the present master CH as the correction of the development characteristics, and the result of the multiplication is rounded to 11.5 bits. Thus, the LUT for correcting the characteristics of the photosensitive material is produced.

Further, the above-mentioned correction output becomes the input values to the table for correcting the light quantity dispersion of the LED's.

The table for correcting the light quantity dispersion of LED's is a table of 11.5 bit input and 11.5 bit output for each of colors produced on the basis of the dispersions of the aforesaid measured values by the photosensor and the intervals. The synthesized table thus obtained is loaded in the LUT section as the table for correcting the development characteristics, the photosensitive material characteristics, and the LED characteristics.

By carrying out the above-mentioned operation in advance of printing, the CH correction data and the correction data for the inter-element dispersion of the LED's are composed and set in the color conversion section and LUT section.

Figure 20:
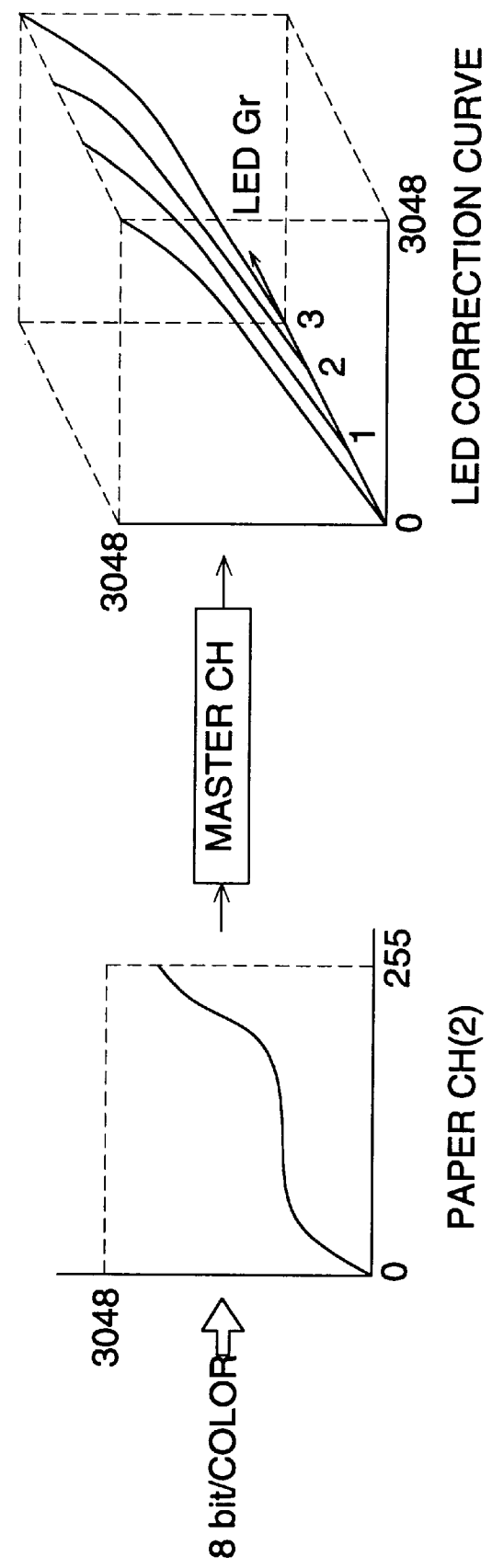
FIG. 20 is a drawing showing the order of preparing LUT in the LUT section.

Further, in this method, the order of preparing the LUT's in the LUT section, as shown in FIG. 20, is as follows: first, the data obtained from the paper CH(2) are multiplied by the master CH, and on the basis of this value, the data are obtained from the table for correcting the LED characteristics, to produce the one-dimensional LUT's for the gradation conversion characteristics of the light quantity of LED's against the original color conversion data of 8 bits.

IV. DRIVING CONTROL OF LED

In the following, various kinds of inventions concerning the drive IC for driving the LED's will be explained. First, as a method for suppressing the inter-group dispersion of the aforesaid four groups of light emitting elements carrying out the multiple recording, following structure has been made in order that the influence of the dispersion of the drive IC's can be avoided as completely as possible.

Figure 21:
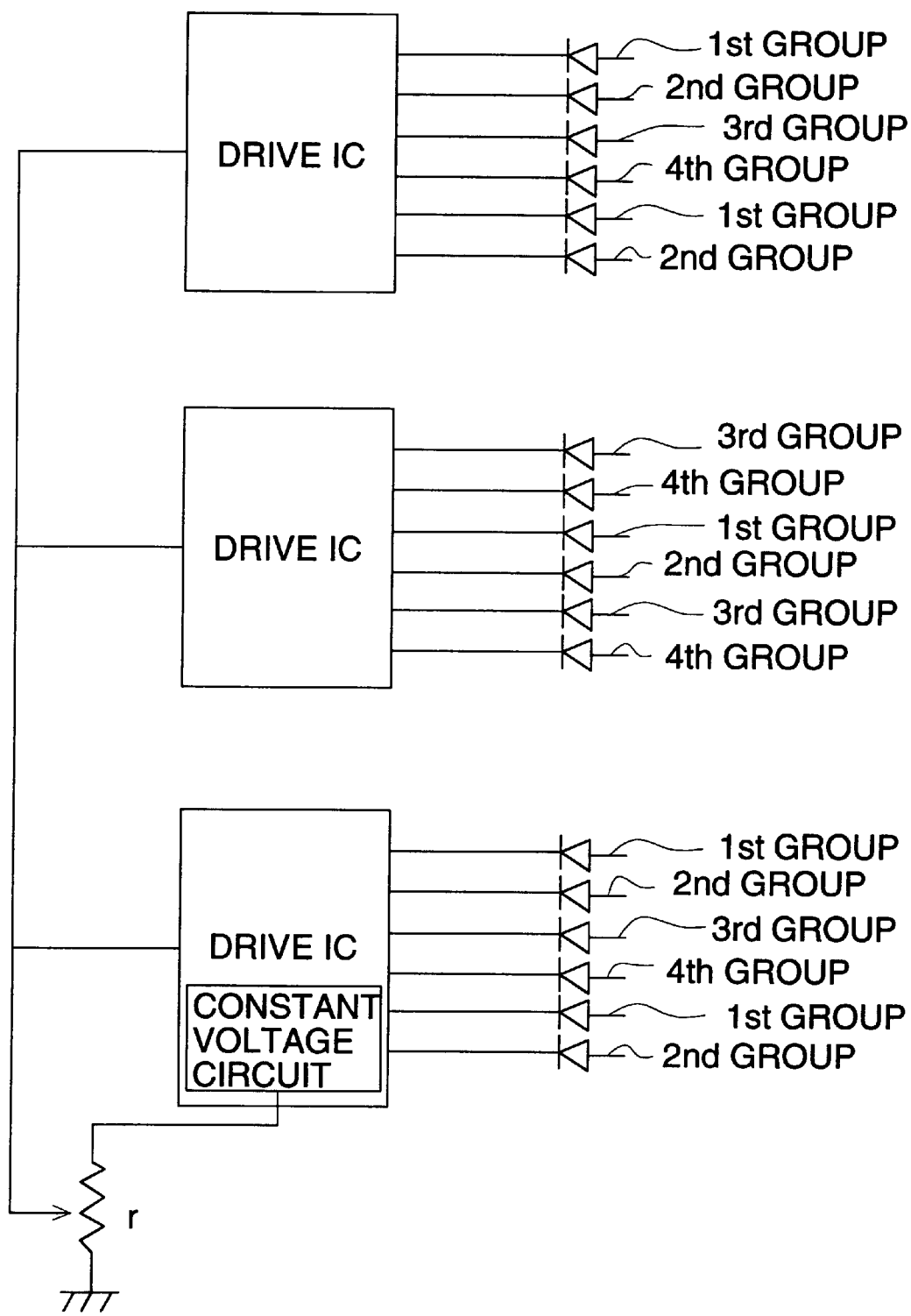
FIG. 21 is a drawing showing a part of the structure of the driver circiut of the apparatus.

As is shown in FIG. 21, in the case where, for example, a plurality of the drive IC's which can drive 6 LED's each are provided to make the control of recording, the LED's belonging to the same group are distributed to as many different drive IC's as possible to be drived. In this way, the dispersion of the drive IC's is equally given to each group, hence the inter-group dispersion can be suppressed as much as possible.

Figure 22:
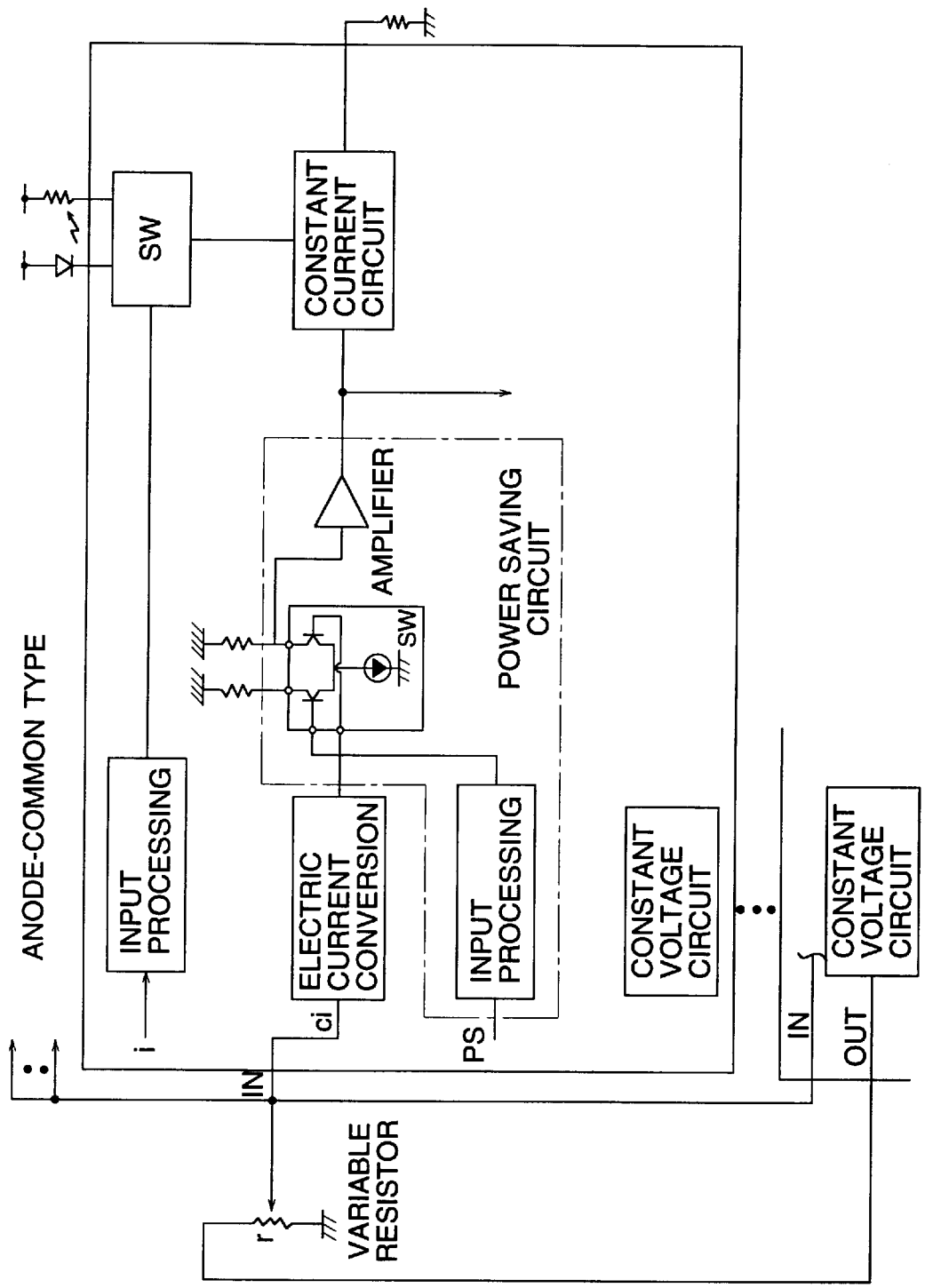
FIG. 22 is a drawing showing the inside structure of the driver circuit of the apparatus.

Further, as shown in FIG. 22, in each drive IC a constant current circuit is provided in order to control the amount of exposure by emission time, and there is provided outside the drive IC's a variable resistor r for generating a reference voltage to which a constant voltage is applied from a constant voltage circuit to operate said constant current circuit, whereby the power loss in the drive IC's is suppressed.

Moreover, the circuit has a structure such that the aforesaid variable resistor r and said constant voltage circuit are used in common by the plural drive IC's. In other words, each drive IC containing a plurality of driver circuits is provided with the constant voltage circuit and also contains a temperature drift compensating circuit. The voltage obtained by dividing the aforesaid output from the constant voltage circuit by said variable resistor is made a reference voltage, and on the basis of said reference voltage the drive current to be applied to the light emitting elements is established. Because the drive IC's usually contain inter-IC dispersion, if it is attempted to make the same current flow in all the light emitting elements, it is required to set an electric current for each IC. However, in the case where multiple recording is made as this invention, the fluctuation to some degree can be absorbed by equalization. Accordingly, as is mentioned above, without using an independent reference voltage provided for each IC, sufficiently good image quality can be secured even by using the common reference voltage, which is generated with a constant voltage circuit in any one of the IC's and the aforesaid one variable resistor r provided outside the IC's.

Further, as shown in FIG. 22, a power saving circuit is provided. Said power saving circuit switches output current so as to decrease the output to the constant current circuit during the period of no image recording. Due to this, it becomes possible that a lot of drive circuits are built in by reducing the generated heat amount of the drive IC's, and also the fogging by the leakage current during the non-recording period, particularly during the temporary stop, is suppressed to prevent the lowering of image quality.

Furthermore, the circuit is made up in a manner such that in the control of the aforesaid power saving circuit the timing to release the power saving at the re-start of recording is made to precede the timing of the re-start of recording. In the circuit shown in FIG. 22, the response of the SW for switching the power saving on or off is designed to be sufficiently fast, but the delay of the amplifier and others in the later stage is large. For this reason, the timing control as mentioned above should be made in order that the circuit having said large delay in driving may operate stably at the time of re-start of recording to make stable recording at the same time as the re-start of recording. To state concretely, the control is carried out in a manner such that the timing control circuit releases the power saving about 10 $\mu$sec before the timing of re-start of recording.

Next, the control of mechanism driving, in particular, the details of the sub-scanning control of the head carriage 16 at the time of the aforesaid temporary stop and the start of recording of the printer will be explained.

In the control at the temporary stop relating to the first embodiment of the invention, on the occasion of the issue of stop instruction, regarding the image data for the pixel on which the front head inputted the data most lately, the recording is stopped after the respective heads for R, G, and B finish the multiple recording of the image data of the same pixel completely (24 times for each pixel).

In this method, at the time of re-start of recording next, it is necessary that the head carriage 16 is returned back to the position at the time of issue of stop instruction from the stop position at the time of said completion of recording, and sub-scanning starts from the former position (precisely speaking, starts from the further retracting position by a predetermined length, taking the stability of the speed into consideration as will be described later) to re-start the multiple recording of the image data of the next pixel.

Further, in case of executing the power saving control as mentioned above, the power saving must be released at a predetermined time before the re-start of recording.

Figure 23:
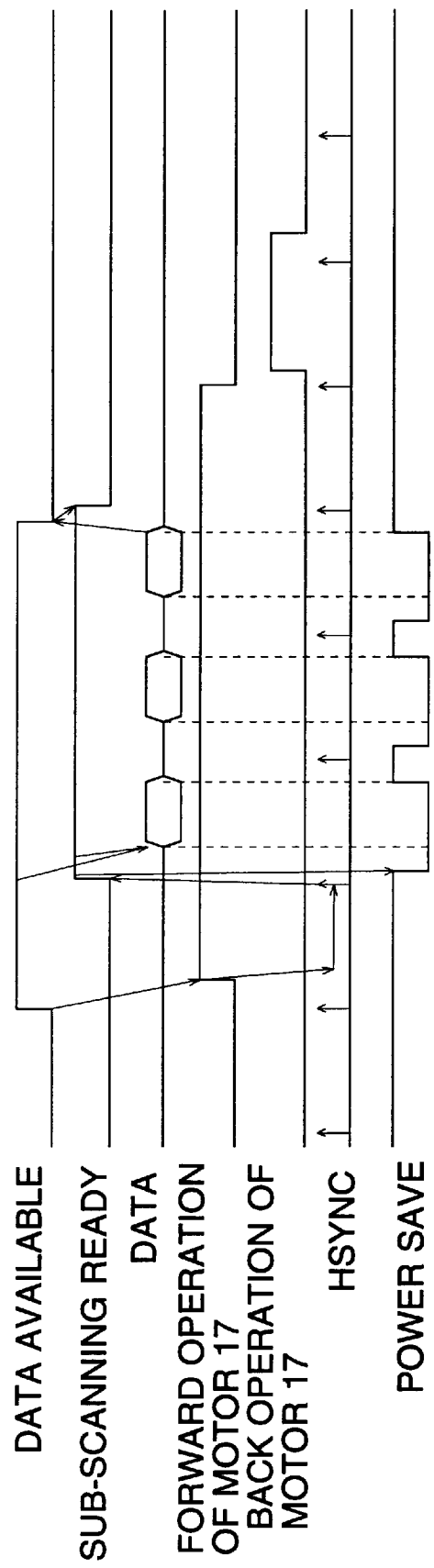
FIG. 23 is a time chart showing the control operation at the start of recording of the apparatus.

The control relating to this embodiment, with the above-mentioned points taken into consideration, will be explained referring to the time chart of FIG. 23.

At image data transmission side, the presence or absence of the image data in the aforesaid buffer memory B is judged, and if the image data are present, the data available flag is set.

When the data presence is detected from the value of said flag, the drive motor 17 for sub-scanning is made to run, and when the heads reach the predetermined position, the sub-scanning side (the mechanism driving control side) sets the sub-scanning ready flag.

When the image data transmission side detects setting of the aforesaid sub-scanning ready flag, the power saving is released and image data is transmitted in synchronism with the hsync (the horizontal synchronizing signal for the reference of main scanning start). When data becomes absent in the buffer memory B through transmission of image data, immediately the aforesaid data available flag is reset.

The sub-scanning control side starts recording, receiving the aforesaid transmitted image data. Further, when the resetting of the aforesaid data available flag, that is, the absence of data is detected, the position at that time is memorized in synchronism with the hsync, while the sub-scanning ready flag is reset. The motor is operated for one head (48 lines) length, and the aforesaid multiple recording of the latest image data at the aforesaid issue of stop instruction is completed.

After that, in provision for the re-start the heads are returned further to a position which locates at a distance required for the stable running from the aforesaid memorized stop position. In the case where the acceleration at the re-start of recording is carried out, the distance required for the stable running is corrected by the number of clock pulses corresponding to said acceleration time.

Then, when the presence of data is detected by the flag, the motor is actuated to rotate in synchronism with the hsync, and when the heads reach the aforesaid memorized stop position, the sub-scanning ready flag is set and recording is re-started.

In this embodiment, a 5-phased stepping motor of 720 pps is employed, and it is decelerated by the aforesaid 2-step decelerating pulley, running in a rate of about 1.5 μm per 1 step. The 4-pixel transport length in the sub-scanning direction per one hsync is approximately 280 μm, and one pixel width is 70 μm. In order to secure good image quality, the value of one step is desirably about 1/20 of the width of one pixel or smaller.

The speed is adjusted by specifying the transport length with pulse, due to the difference of the aforesaid pulley from one piece to another (manufacturing error). This adjustment is carried out in a manner such that the error should be not larger than the 1% or desirably 0.3% of the 280 μm (the size of 4 pixels).

Because it usually takes several hundred msec for the speed to become stable (the largest factor is vibration of the encasing member), in this apparatus, the head carriage is retracted from the position of the start of recording by a distance corresponding to 5–10 hsync (the distance equivalent to 5–10 rotations of the drum). Owing to this, good recording in a stable speed is carried out from the recording start position. Further, in the case that it is necessary in relationship with the motor torque, consuming electric current, and cost, it is possible to conduct acceleration or even deceleration control for the pulse motor.

Besides, it is desirable that the amount of retraction of the head carriage 16 is determined by taking the dipersion in the response times of the CPU against the interruptions. Usually, the time period from the issue of instruction for interruption to the time of reading the pulse count of the motor control section at the time of stop of recording and that from the interruption instruction to the actuation of the motor have some difference due to the difference in the path of execution in the software (the dispersion in the interruption response time may be several msec to 10 msec depending on the case). Hence, the correction for that is necessary.

If a CPU having a sufficient high speed is employed, and if the software is prepared in a manner such that the time difference in executing the instruction is made as small as possible, that is, the number of steps is made to be the same, the aforesaid correction becomes unnecessary, but in the case where the time difference is one step or more (100 μsec or longer in this example), it is required to alter the correction value in accordance with error amount of sub-scanning and main scanning speed, which requires considerable amount of correction time. That is, it is very advantageous to prepare the software in order that the time difference determined from the CPU speed and the step executing cycle may be within 1/20 pixel.

As the method to practice the above requirement, the following are cited:

1. some nop instructions are added to the faster one,
2. the timing is adjusted to the slower one by making the processing of the faster one executed after some other processing, and so forth.

Figure 24:
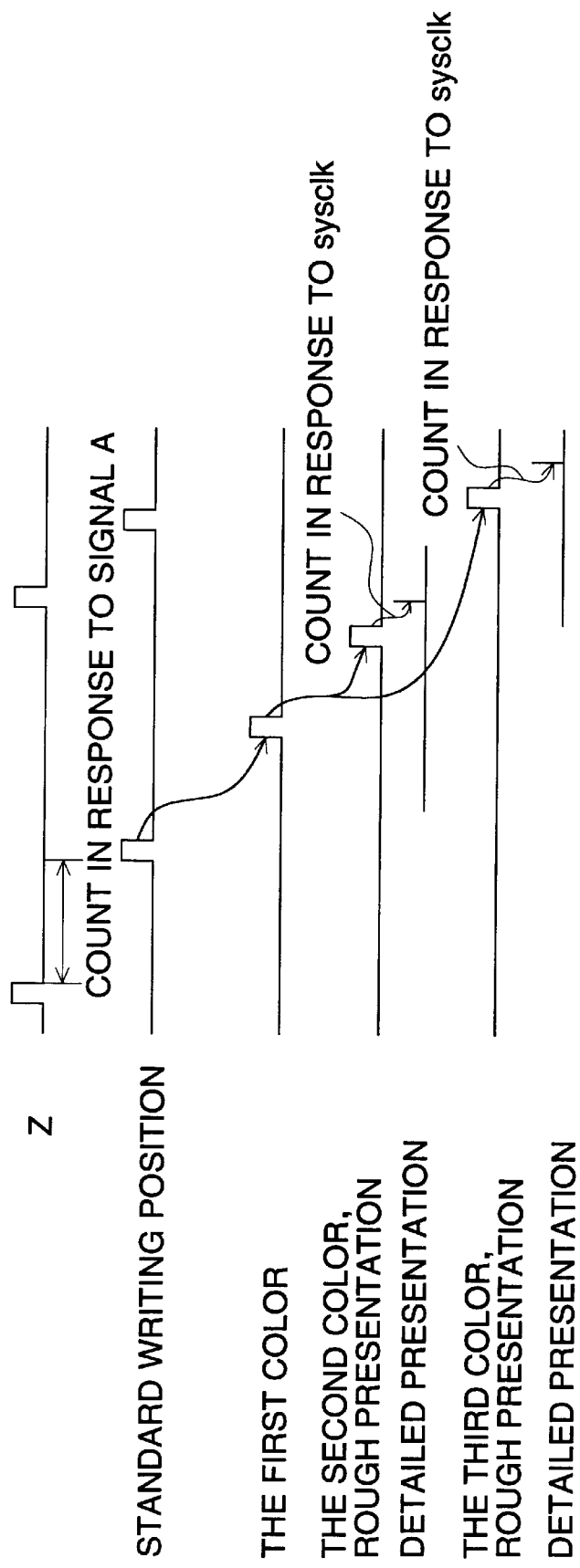
FIG. 24 is an illustration for the determination of the position of record starting for each of the colors R, G, and B.
Figure 25:
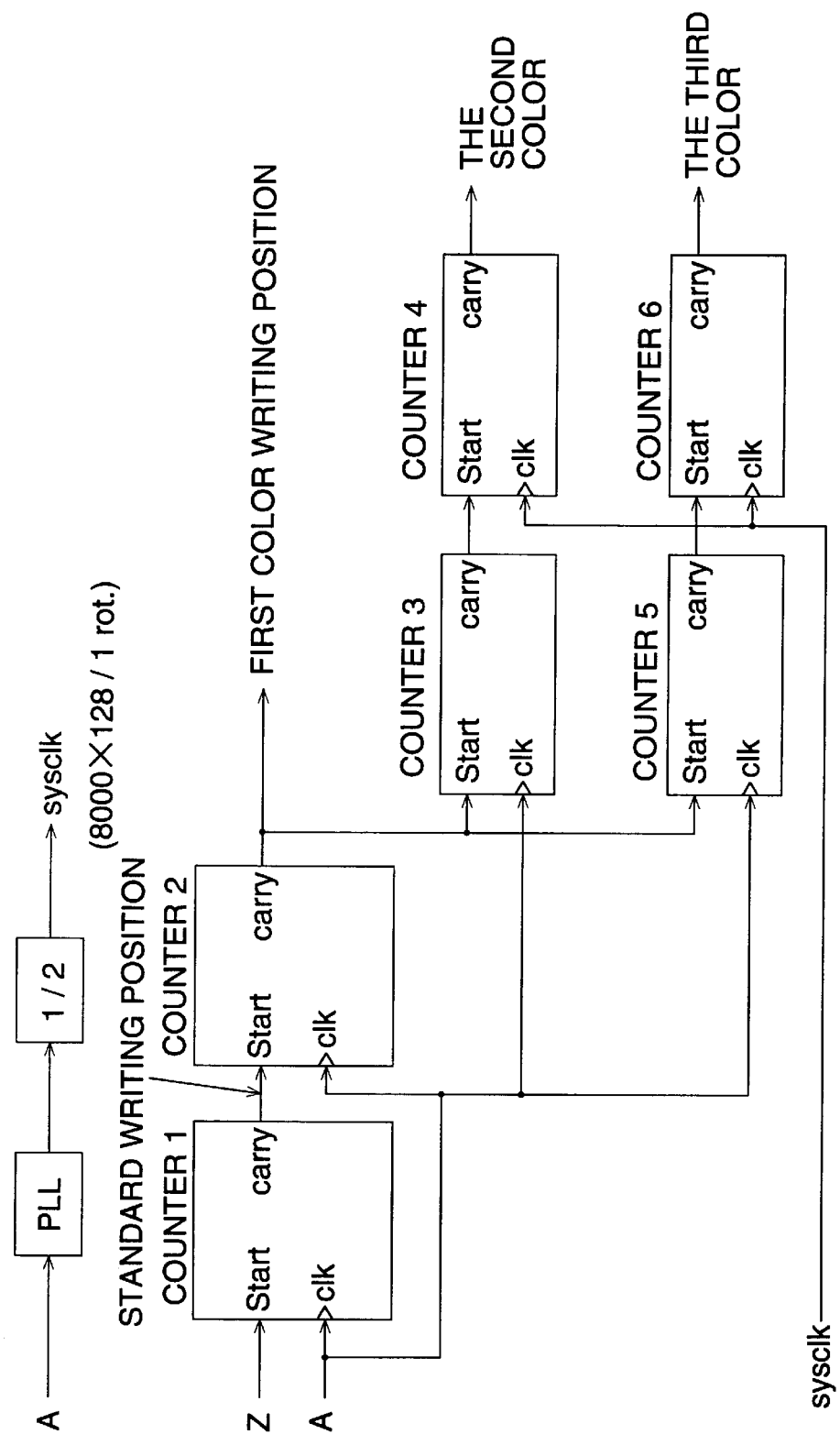
FIG. 25 is a circuit diagram for determining the position of record starting for the same as the above.

Next, the signal processing for the colors R, G, and B at the start of recording will be explained with reference to the time chart of FIG. 24 and the processing circuit of FIG. 25.

It is outputted the writing position reference signal which indicates the specified starting position of writing determined by the relationship in the mounting position between the drum 15 and the encoder by counting the signal Z generated in a rate of one pulse per one rotation of the drum 15 and the signal A generated in a rate of 2500 pulses per one rotation of it by the counter 1. The pulses are counted from this writing position reference signal to the actual start position of writing for the respective colors R, G, and B. In this case, regarding the first color for which the first writing is carried out for the image data of the same pixel, the start writing position is determined by counting the signal A by the counter 2. However, regarding the second and the third colors, for which the second and the third writing are carried out, counting the signal A only is not sufficient because it is required to carry out recording with the recording position made precisely to coincide with that of the first color.

Therefore, the start writing position is determined in synchronism with the signal SYSCLK which generates 8000 (the number of pixels)×128 (the number of gradation) pulses per one drum rotation by making the aforesaid signal A multiplied in PLL circuit and demultiplied by the ½ frequency demultiplier circuit. However if the aforesaid count from the writing position reference signal is done by the SYSCLK signal only, the count number becomes too large, causing the scale of the circuit to be large. Because of this, in this embodiment of the invention, the writing position is controlled in a manner such that the start writing positions of the second and third colors are first roughly determined by counting the aforesaid signal A by the counters 3 and 5 from the start writing position of the first color to the position immediately before the correct position and after that, by counting the SYSCLK, which generates pulses in a very minute time unit, by the counters 4 and 6, the precise start writing position is determined. In this way, good image quality without spreading can be obtained owing to the high-precision control of the recording position, with the scale of the counter circuit maintained as small as possible. Further, these predetermined value of counts is specified by the controlling CPU of course, and by employing such a construction as the above-mentioned the adjustment can be done by the CPU.

V. POSITION ADJUSTMENT BETWEEN THE PRINT HEADS

In the following, an example of practice of the invention concerning the position adjustment between the plural print heads will be explained.

Figure 26:
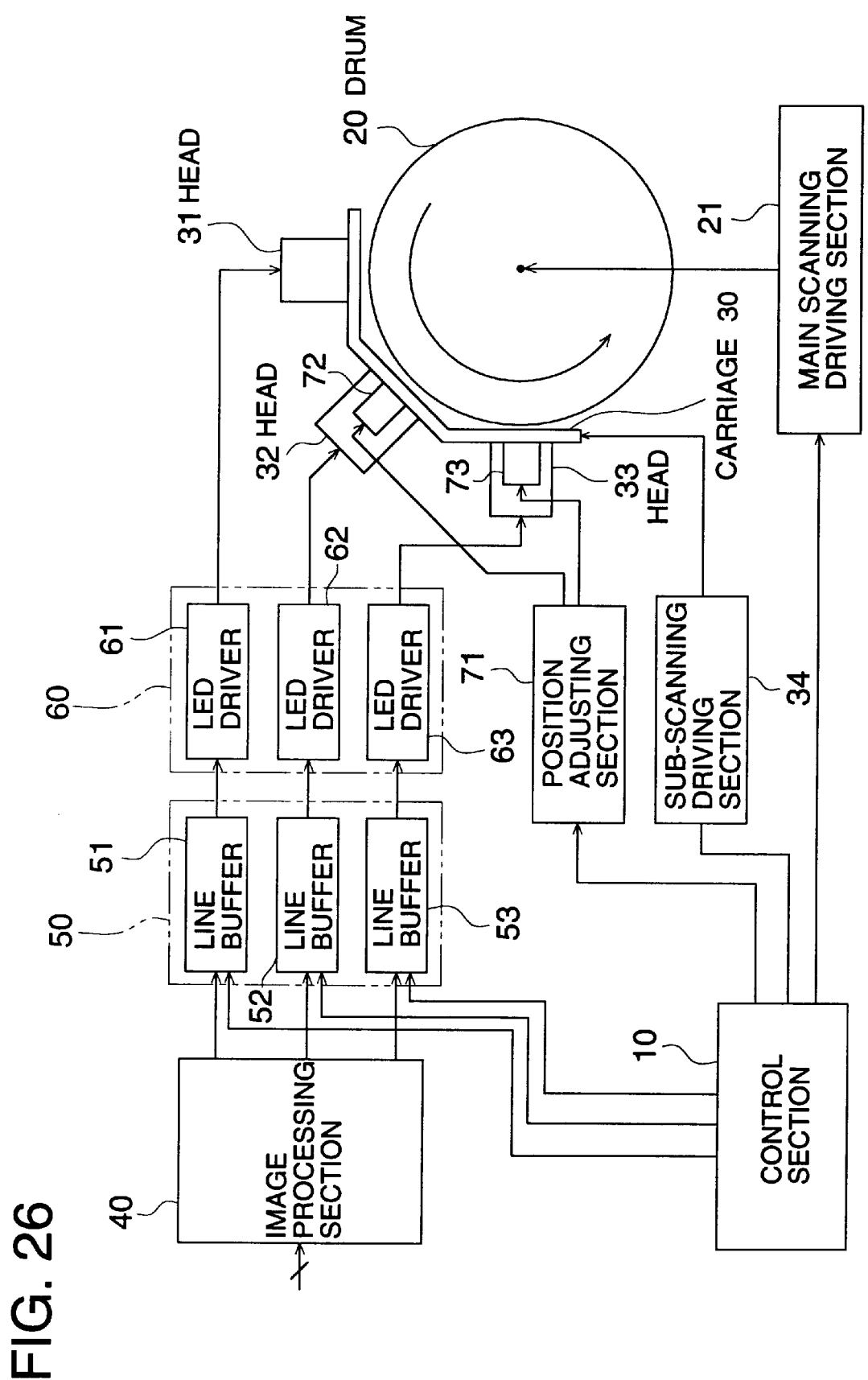
FIG. 26 is a drawing showing the structure of the image recording apparatus of this invention.

First, with reference to FIG. 26 and so forth the structure of the image forming apparatus of this example of embodiment is explained. In this FIG. 26, the control section 10 is a means for controlling the whole image forming apparatus, and in particular, executes the control in a manner such that the group of light emitting elements is precisely positioned in the case where the speed of any one of the main- or sub-scanning is altered when the image recording is made by moving the recording medium and the group of light emitting elements relatively to each other in the direction of sub-scanning, while the plural groups of light emitting elements and the recording medium disposed on the cylinder surface are moved relatively in the direction of main scanning.

The recording medium 22 such as a photosensitive material is put on the drum 20, which is rotated in a specified speed, and the rotating drive in the direction of main scanning is made by the main scanning drive section 21. The carriage 30 makes up the means for holding and driving the heads in the direction of sub-scanning, keeping the heads 31–33 at the specified positions.

In this figure, an example in which the first head 31, the second head 32, and the third head 33 are disposed on the carriage 30 is shown. On these heads 31 through 33 are disposed a plurality of light emitting elements (LED's or laser diodes etc.) respectively, and the respective light emitting elements are made capable of emitting independently modulated light.

Further, these first head 31 through third head 33 are provided for forming the image of different colors respectively on the recording medium 22, that is, for example, the heads respectively emitting light in R, G, and B for forming the image presenting the colors C, M, and Y, or the heads emitting light in far infrared, near infrared, and red for forming the image presenting the colors C, M, and Y, and so forth are applicable to this. In other words, they are the heads outputting the light having different wave lengths (including infrared ray) for making the image present the specified recording colors. Accordingly, "a plurality of groups of light emitting elements having different recording colors" in the claims means the heads 31 through 33 which are made up in such a manner. In addition, in this embodiment the explanation will be given taking the heads emitting light in R, G, and B for instance.

Figure 27:
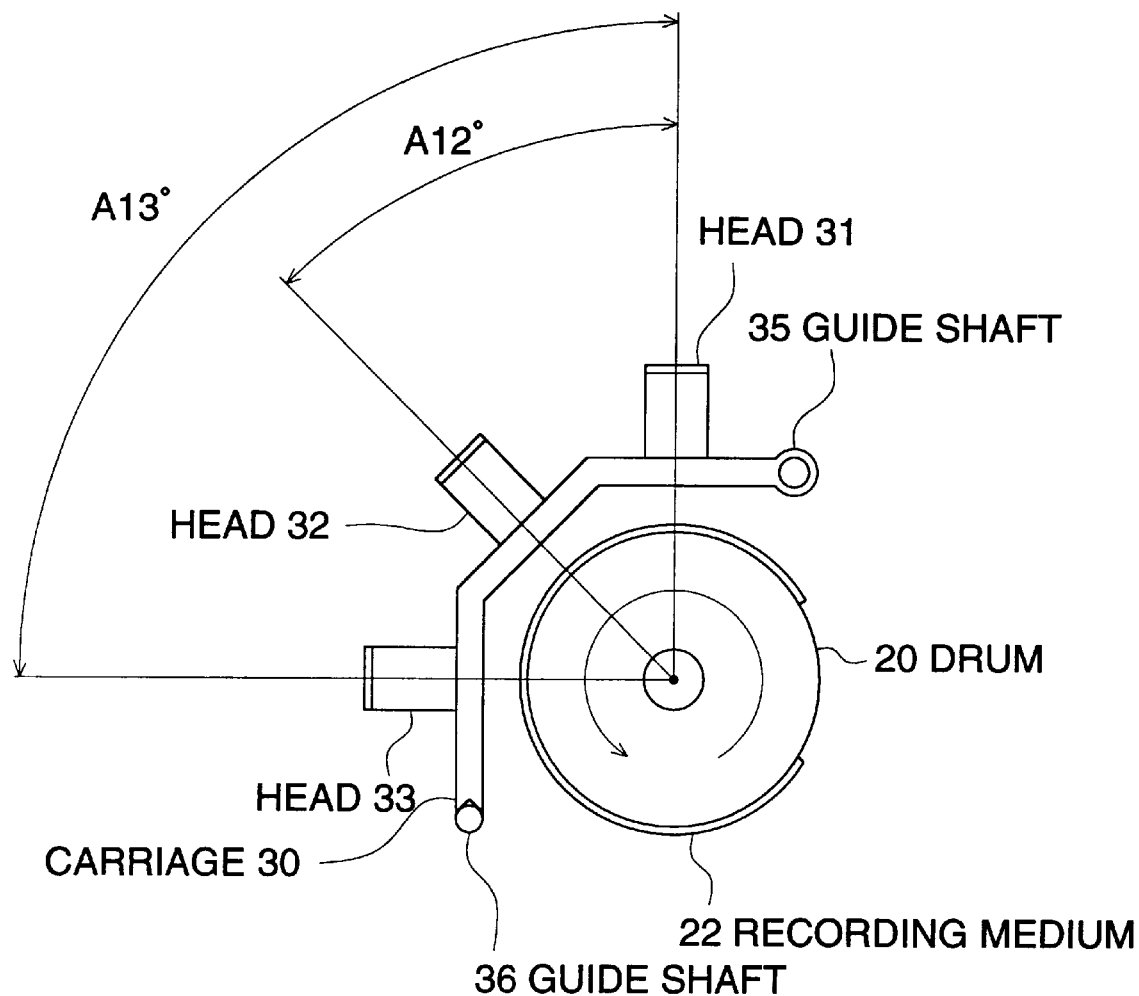
FIG. 27 is a drawing showing the structure of a principal section of the above-mentioned image recording apparatus.

Further, as shown in FIG. 27, in the case where the first head is taken as the reference, the second head 32 is disposed at A12° with regard to the center axis of rotation of the drum 20, and the third head 33 is disposed at A13° in the same way.

Furthermore, this carriage 30 moves in the sub-scanning direction, driven by the sub-scanning drive section 34 supported by the guide shafts 35 and 36. In the meantime, the direction of sub-scanning in which the carriage 30 is supposed to move is considered as the direction to this side perpendicular to the paper surface in FIG. 27, and as the direction to the right-hand side in FIG. 28.

The image processing section 40 in FIG. 26 receives the image data from the external apparatus (such as computer) to process them for developing them in the format of the image recording, and is provided with a frame memory etc.

The line buffer 50 is a timing adjusting means for outputting the image data received from the image processing section 40 at the suitable timings for the exposure timings of the respective heads, referring to the data such as the delay amount of the sub-scanning from the control section 10. Further, this line buffer 50 is composed of the line buffers 51 through 53 corresponding to the respective colors R, G, and B.

The LED driver 60 is an electrical drive means for generating the signal for driving the groups of the light emitting elements (LED's) built in the respective heads receiving the data from the line buffer 50, and is composed of the LED drivers 61 through 63, corresponding to the respective colors R, G, and B. Further, in this example of embodiment, the case where the LED's are employed for the group of light emitting elements is taken for instance, but in the case where the laser diodes are employed for the light emitting elements, it is appropriate to use the driver for the laser diodes.

Figure 28:
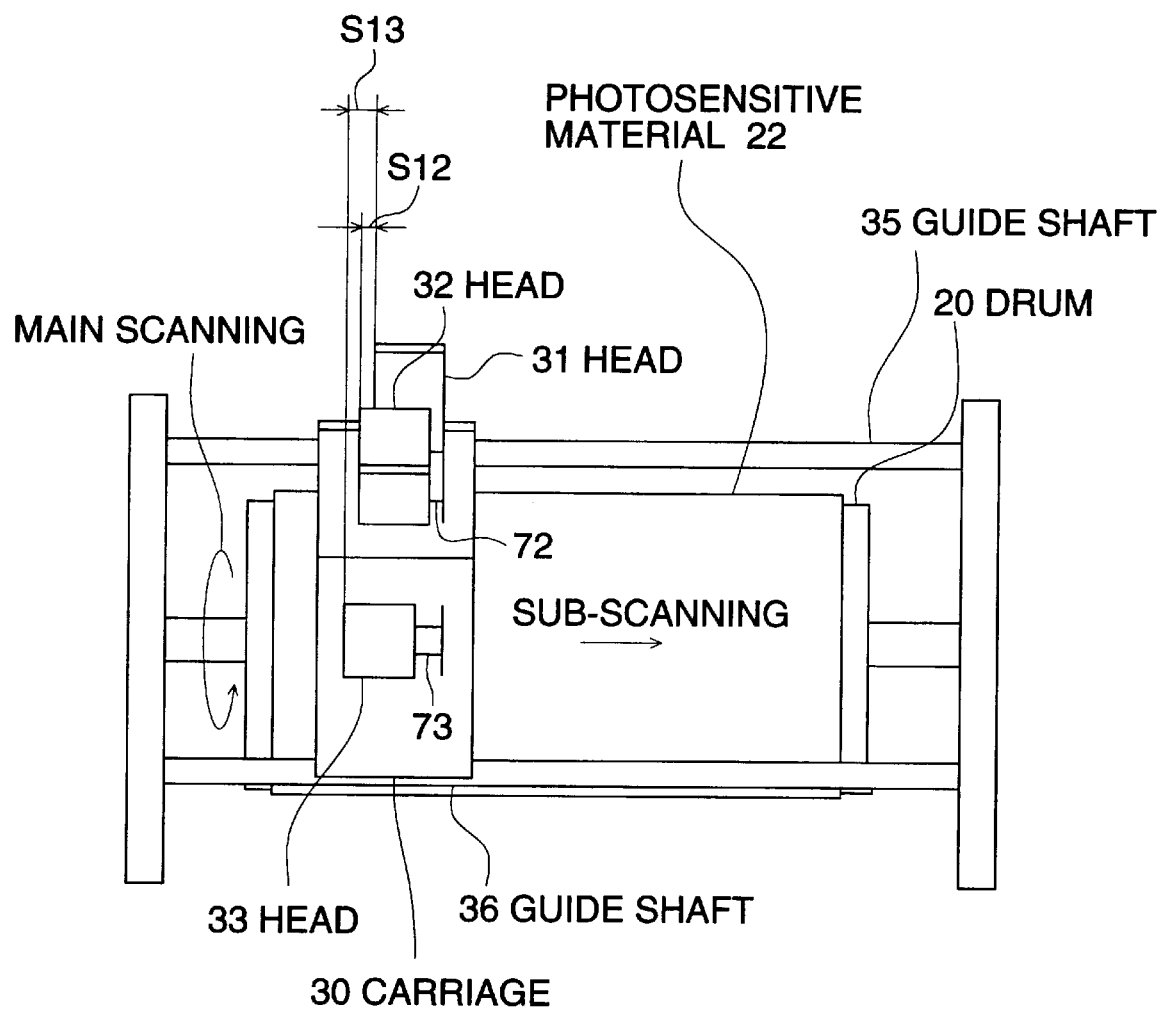
FIG. 28 is a drawing showing the structure of the same principal section of the above-mentioned image recording apparatus as shown in FIG. 27.

The position adjusting section 71 adjusts the position adjusting means 72 and 73 in order that the plural heads of different recording colors may be disposed at the positions shifted by predetermined amounts (S to be described later) to the reverse side of moving in the direction of sub-scanning from the position of the reference head as shown in FIG. 28.

In addition, the position adjusting means 72 and 73 include various kinds of means capable of adjusting position such as a cam controlled by a motor etc., an actuator, and a combination of a piezo-element and a feed-back sensor. Further, in the case where it is not required to make the position variable after the adjustment, a spacer or the like may be employed.

Furthermore, in this example of embodiment, the drum 20 which rotates for main scanning and the carriage 30 which moves for sub-scanning are taken for instance, however, for the main scanning and the sub-scanning any one of the both the relatively moving objects may be moved actually.

OPERATION 1.

Now, the positional relationship of the heads 31 through 33 will be explained. For now, the head 31 is taken as the reference, and the position of the head 32 and that of the head 33 are explained.

Figure 29:
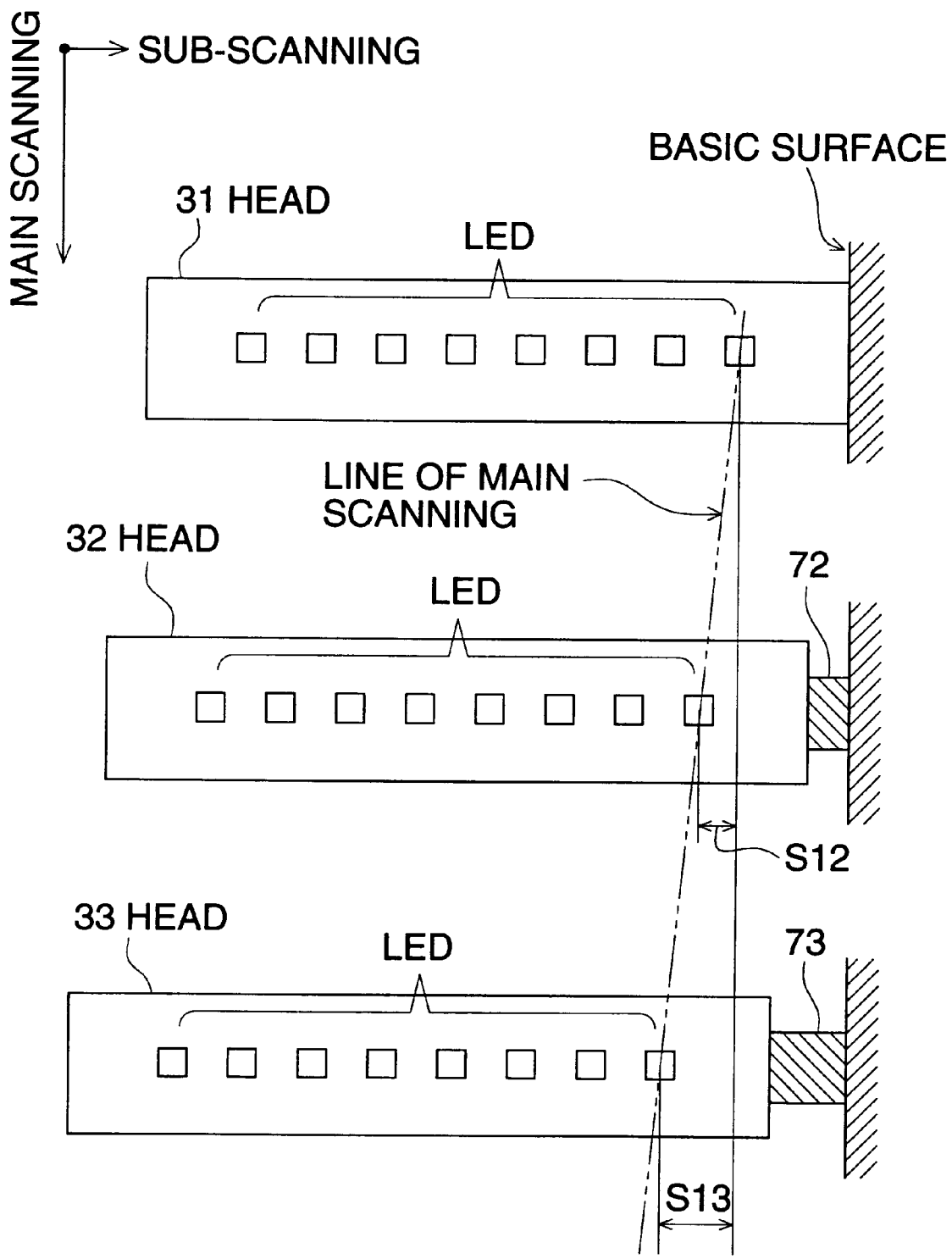
FIG. 29 is a drawing showing an aspect of scanning.

As shown in FIG. 28 and FIG. 29, the head 32 is disposed at a position shifted by S12 in the reverse direction of the sub-scanning against the head 31 with the position adjusting means 72. In the same manner, the head 33 is disposed at a position shifted by S13 in the reverse direction of the sub-scanning against the head 31 with the position adjusting means 73.

In addition, in this case an example of the group of the light emitting elements in which 8 pieces of LED's are disposed in a line in each of the head is shown, however, it is also appropriate to dispose more LED's in a line or a plurality of lines of LED's.

Now, let L be the transport length by sub-scanning for one rotation of the drum in the main scanning, and let A be the angle of the arrangement made by the pertinent group of light emitting elements against the reference group of light emitting elements with regard to the center axis of the cylinder, then $$S = L \times A / 360 \qquad (1).$$

That is, for the head 32 disposed at A12° against the head 31, the position is adjusted by the position adjusting means 72 by a shift amount S12 obtained from the following equation:

$$S12 = L \times A12 / 360.$$

In the same manner, for the head 33 disposed at A13° against the head 31, the position is adjusted by the position adjusting means 73 by a shift amount S13 obtained from the following equation:

$$S13 = L \times A13 / 360.$$

Figure 30:
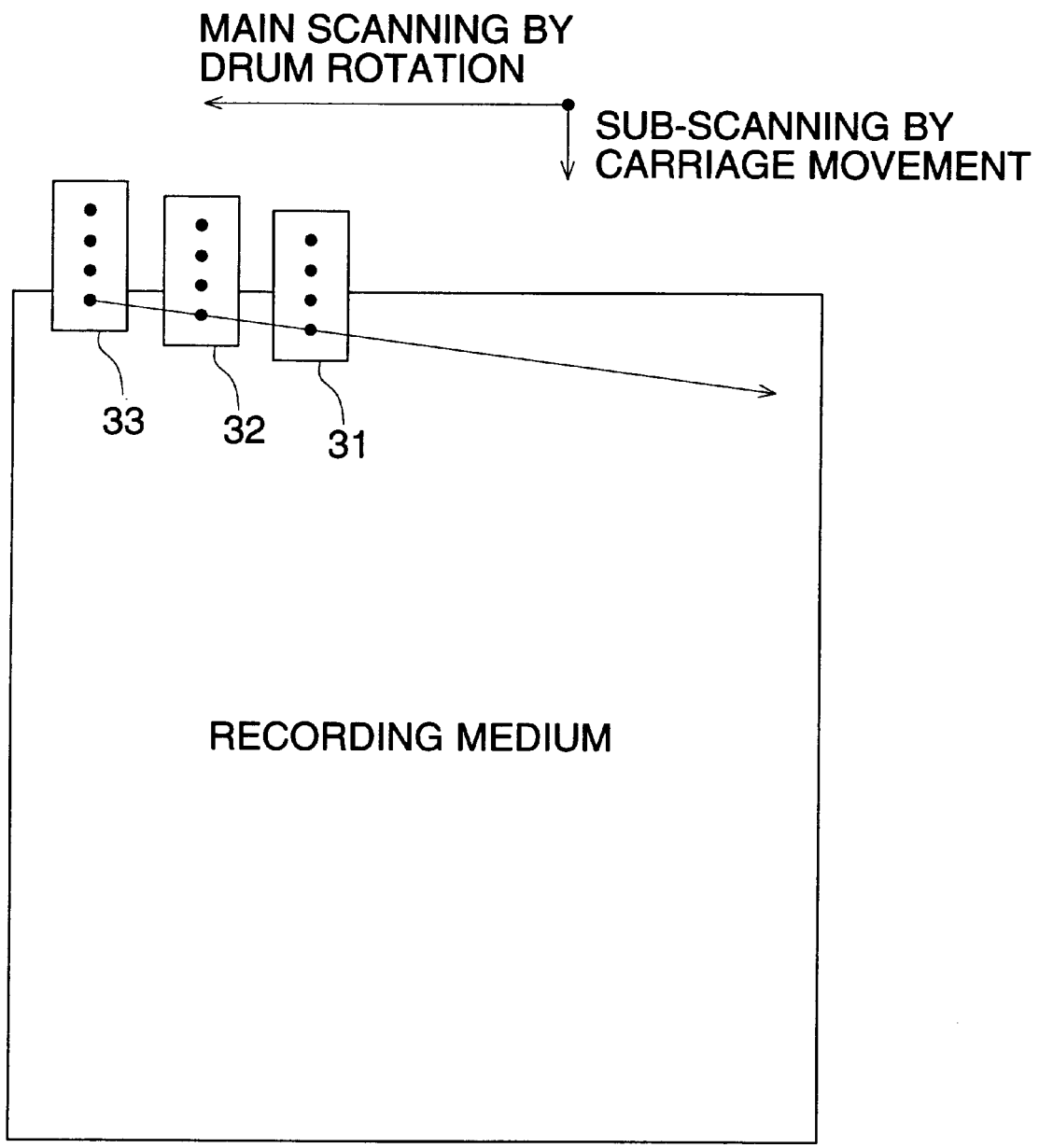
FIG. 30 is a schematic representation showing how scanning is carried out.

In such a case as the above, as shown in FIG. 30, the LED's corresponding to one another on each head can trace on the coincident locus on the main scanning line of exposure.

Further, even if the speed of sub-scanning is altered owing to the change of sensitivity of the recording medium, the LED's corresponding to one another on each head can trace on the coincident locus on the main scanning line of exposure by altering the amounts of shift S12 and S13 in accordance with the speed of sub-scanning, hence no color deviation will occur.

Moreover, because L is the transport length in sub-scanning per one rotation of main scanning, if the speed of main scanning is altered, not the speed of sub-scanning, or even if the speeds of both the main scanning and sub-scanning are altered, each head can be disposed at the specified position in order that no color deviation may occur.

As a result of this, when image recording is carried out on a recording medium by relatively moving the recording medium and a plurality of groups of light emitting elements in the sub-scanning direction, while the groups of light emitting elements and the recording medium disposed on the surface of a cylinder are rotated relatively, it can be actualized an image recording apparatus wherein the groups of light emitting elements can be disposed at appropriate positions even if either the speed of main scanning or the speed of sub-scanning is altered.

OPERATION 2.

Now, regarding the relationship in the arrangement of the heads 31 through 33, the second example of operation will be explained.

The explanation will be given on the basis of FIG. 31 corresponding to FIG. 29 mentioned above. As is shown in this FIG. 31, the head 32 is disposed at the position shifted by S12 against the head 31 in the reverse direction of sub-scanning by the position adjusting means 72. In the same manner, the head 33 is disposed at the position shifted by S13 against the head 31 in the reverse direction of sub-scanning by the position adjusting means 73.

Now, let L be the transport length by sub-scanning for one rotation of the drum in the main scanning, let A be the angle of the arrangement made by the pertinent group of light. emitting elements against the reference group of light emitting elements with regard to the center axis of the cylinder, let n be an integer, and let P be the interval of the dots formed on the image by the light emitting elements, then $$S = L \times A/360 + n \times P \qquad (2).$$

That is, for the head 32 disposed at A12° against the head 31, the position is adjusted mechanically by the position adjusting means 72 by a shift amount S12 obtained from the following equation:

$$S12 = L \times A12/360,$$

and in addition to it, it is shifted by the length n×P electrically. In the example of FIG. 31, n=3 because the shift is 3 lines for each.

As a result of this, by the following shift length $$S2 = L \times A12/360 + 3 \times P,$$

the minute adjustment within one line is made mechanically, and the rough adjustment for several lines is made by electrical timing.

In the same way, for the head 33 disposed at A13° against the head 31, by the following shift length $$S3 = L \times A13/360 + 6 \times P,$$

the minute adjustment within one line is made mechanically, and the rough adjustment for several lines is made by electrical timing.

Figure 31:
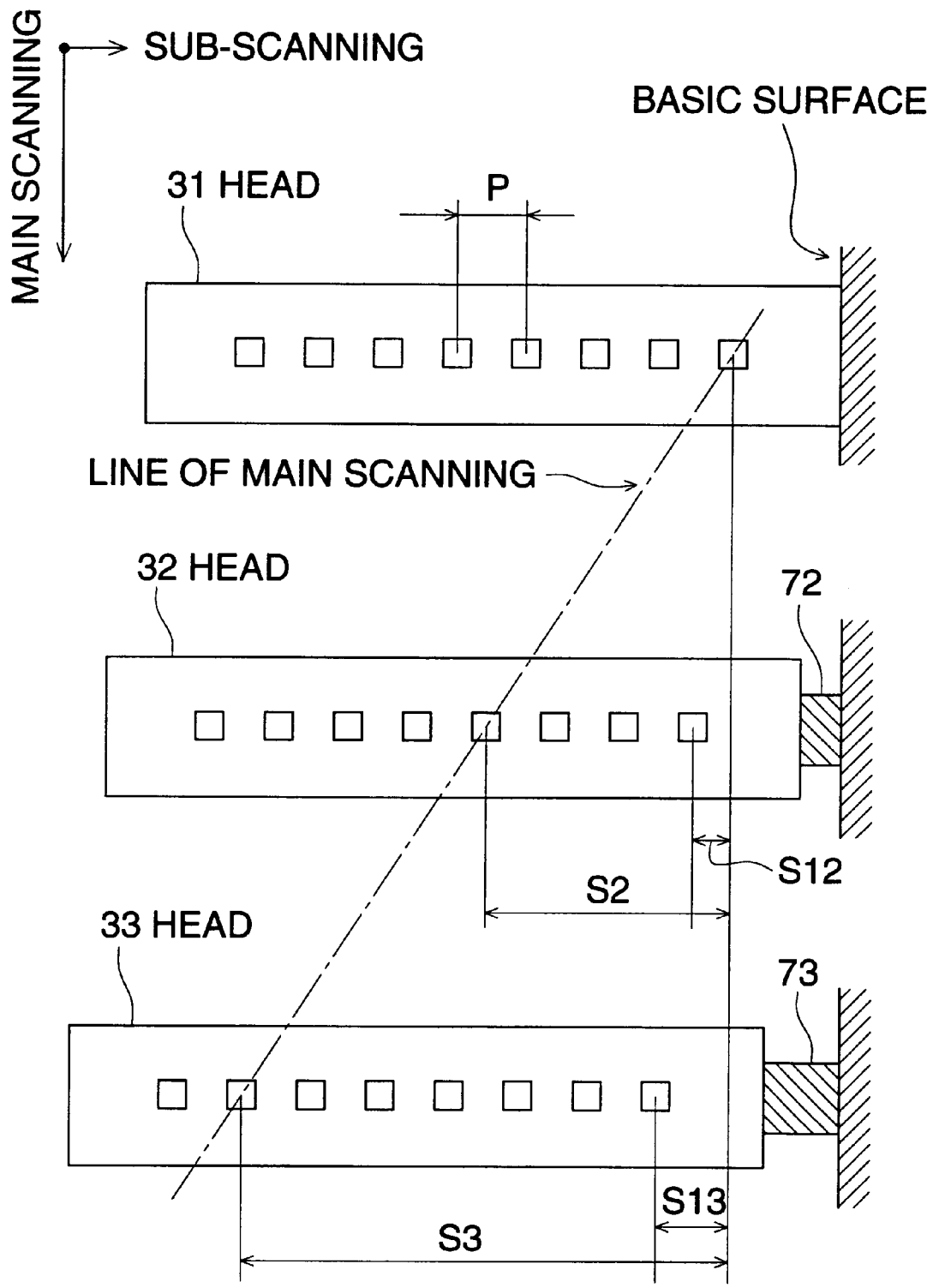
FIG. 31 is another drawing showing another aspect of scanning.

In such a case as the above, even if the scanning as shown in FIG. 31 is carried out, the LED's corresponding to one another on each head can trace on the coincident locus on the main scanning line of exposure. Moreover, in the case where the locus is to be made coincident, due to the employing of the electrical adjustment, it is not required to dispose the LED's actually on the same line in the scanning direction.

Further, even if the speed of sub-scanning is altered owing to the change of sensitivity of the recording medium, the LED's corresponding to one another on each head can trace on the coincident locus on the main scanning line of exposure by altering the amounts of shift S2 and S3 in accordance with the speed of sub-scanning, hence no color deviation will occur.

Moreover, because L is the transport length in sub-scanning per one rotation of main scanning, if the speed of main scanning is altered, not the speed of sub-scanning, or even if the speeds of both the main scanning and sub-scanning are altered, each head can be disposed at the specified position in order that no color deviation may occur.

Besides, by combining the electrical rough adjustment (adjustment for several lines of main scanning) and the mechanical minute adjustment (adjustment within one line), it can cope with the situation where a remarkable degree of change in the speed of main scanning or sub-scanning is caused, and the occurrence of color deviation can be effectively prevented.

As a result of this, when image recording is carried out on a recording medium by relatively moving the recording medium and a plurality of groups of light emitting elements in the sub-scanning direction, while the groups of light emitting elements and the recording medium disposed on the surface of a cylinder are rotated relatively, it can be actualized an image recording apparatus wherein the groups of light emitting elements can be disposed at appropriate positions even if either the speed of main scanning or the speed of sub-scanning is altered.

In addition, the structure of the line buffer 50 for adjusting the timing electrically as mentioned above is made in a manner shown in FIG. 32. Further, in this FIG. 32 only one of the circuit structures of the line buffers 51 through 53 is shown, and it can be understood that three sets of the equivalent circuit are provided in the case of the three colors R, G, and B.

The image data from the image processing section 40 are taken into the memory 50b through the controller 50a. On this occasion, the image data are written in the memory 50b in accordance with the address data which are in accordance with the data for the number of pixels per line and generated by the address generator for writing 50d.

Further, on the occasion of image recording, the address generator for reading out 50e generates the address data suitable for reading out the image data corresponding to the LED's of the respective heads, referring to the data corresponding to the above-mentioned sub-scanning delay value (n×P). In this case, the sub-scanning delay value may be altered by changing the initial value of the count value.

Thus, the image data read out from the memory 50b by such address data are supplied to the LED driver through the controller 50f. In addition, the sub-scanning position adjusting section and the sub-scanning counter included in the address generator for reading out 50e in this FIG. 32 can operate in the same way even if their order in the circuit is reversed.

Figure 32:
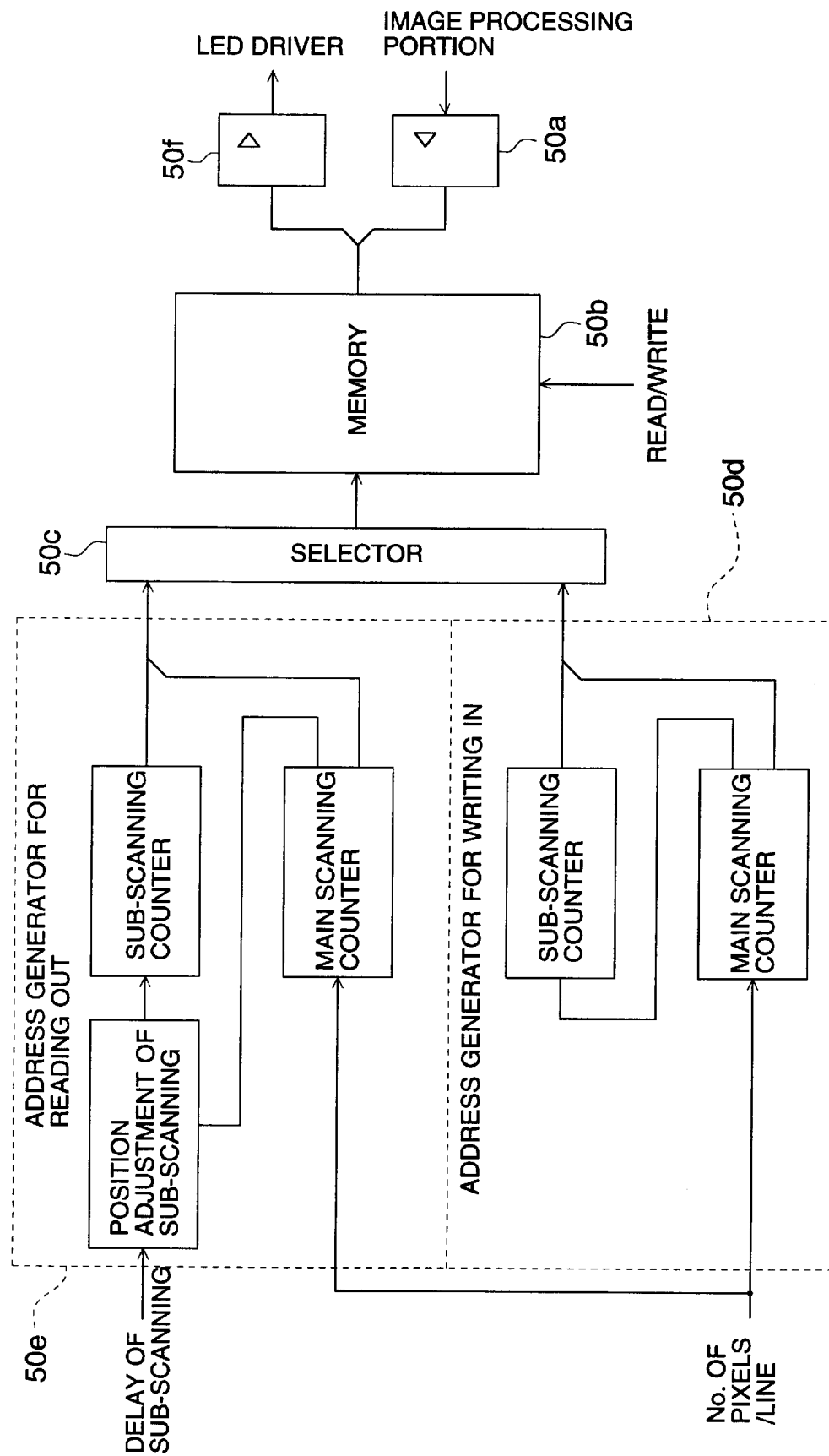
FIG. 32 is a structural diagram showing the structure of a line buffer shown in FIG. 26.

Further, in the example of this FIG. 32, a counter structure of the ring-shaped type as the memory 50b is employed, the equivalent operation can be carried out by using a decoder (look-up table) for adjusting the sub-scanning position.

Furthermore, as mentioned above, in the case where the mechanical adjustment within one line and the rough electrical adjustment for lines are combined, by substituting the mechanical adjustment for the shift amount more than 0.5 line by the electrical adjustment of one line, the mechanical adjustment can be made less than 0.5 line. In this case, it may be done by executing the calculation process for taking the shift amount more than 0.5 line into the electrical adjustment in the control section 10.

Thus, by doing this, the range of the mechanical adjustment is made narrow, hence the position adjusting means 72 and 73 can be made small-sized (thin type), and further, the precision can be enhanced.

Moreover, as mentioned above, in the case where the electrical adjustment and the mechanical adjustment are combined together, if the mechanical adjustment is done with a spacer or the like, the kinds and the number of the spacers required can be made small, and they are made up easily.

Further, as mentioned above, in the case where the adjustment is done by the spacers, regarding the transport length of sub-scanning L, using the average value $L_{AV}$ of the several different L values, S can be expressed as follows:

$$S = L_{AV} \times A/360 + n \times P. \tag{3}$$

In the case where the several different L values are comparatively not so different, sufficient effect can be obtained even by the adjustment using such an average value $L_{AV}$.

VI. SPATIAL FILTER

In the following, an desirable example of practice of the spatial filter described in FIG. 6 will be explained.

Figure 33:
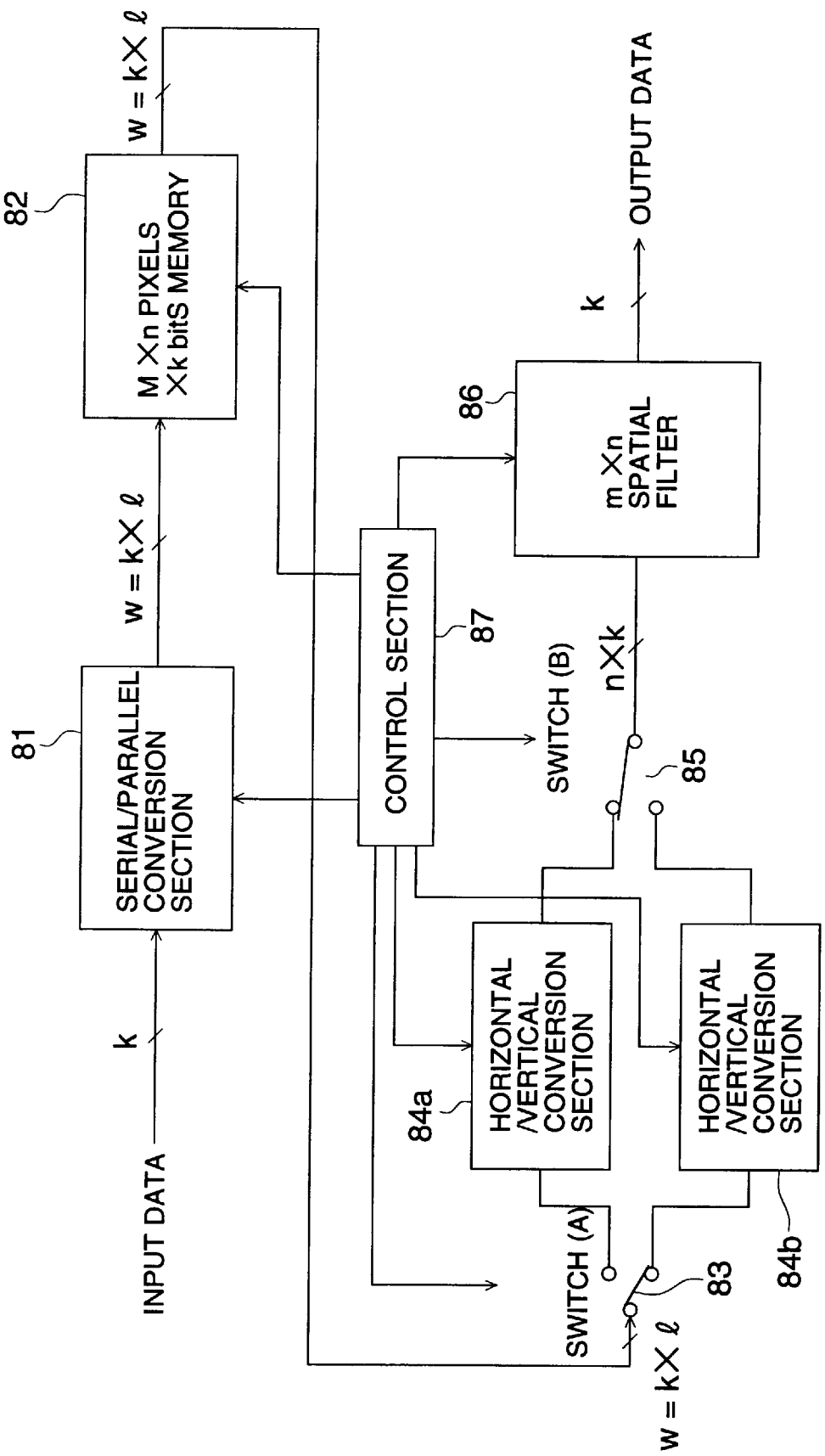
FIG. 33 is a circuit block diagram showing an embodiment of the image memory circuit relating to this invention.
Figure 34:
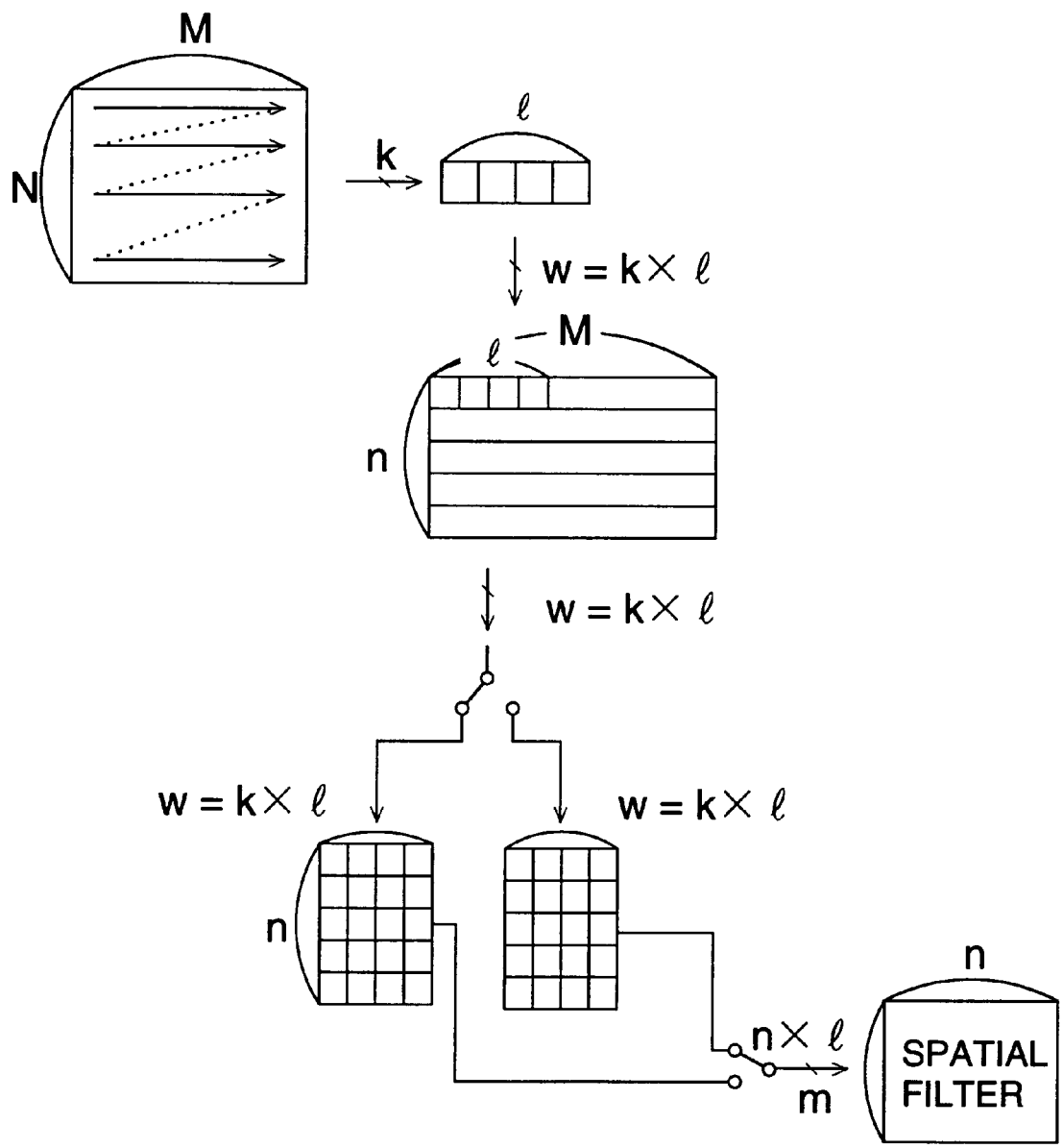
FIG. 34 is a diagram showing the data conversion and the memory characteristics in the image memory circuit shown in FIG. 23.

FIG. 33 is a circuit block diagram showing the detailed structure of the spatial filter, and FIG. 34 is a drawing showing the data characteristics in the aforesaid spatial filter shown in FIG. 33. In the following, the structure of the satial filter circuit of FIG. 33 will be explained referring to FIG. 34.

In this FIG. 33, the digital image data of k bits per pixel (input data) are inputted into the serial-parallel conversion section 81. In addition, as shown in FIG. 34, the image data is considered as composed of rows (horizontal)×columns (vertical)=N×M pixels, and in the spatial filter to be described later the spatial filtering processing is supposed to be carried out with a unit of m×n pixels.

In the aforesaid serial-parallel conversion section 81, the aforesaid image data is sequentially inputted with a quantity of 1 ($\leq$M) pixels each, and they are converted into the data of w=k×1 bits to be outputted.

Said image data of w=k×1 bits from the serial-parallel conversion section 81 are recorded in the memory section 82 which has at least a capacity to store the image data of the quantity for n ($\leq$N) lines of input image, that is, a capacity of M×n×k bits, and inputs and outputs the image data with a unit of said k bits each. In addition, said memory section 82 is made up of a RAM for general use.

The two sets of horizontal-vertical conversion section 84a and 84b has such a structure as to input the image data of the quantity of 1 pixels×n lines from the aforesaid memory section 82 with a unit of w bits and to output them with a unit of n×k bits, and the output from the aforesaid memory section 82 is inputted into any one of said two sets of horizontal-vertical conversion section 84a and 84b through the data switch (A) 83.

Further, it is made to be switched by the data switch (B) 85 which one of the output from the aforesaid two sets of horizontal-vertical conversion section 84a and 84b is inputted to the spatial filter 86. Here, said data switches 83, and 85 are controlled in a manner such that when the data are inputted into the horizontal-vertical conversion section 84a through the data switch 83, the output data from the horizontal-vertical conversion section 84b are outputted to the spatial filter 86 through the data switch 85, and when the data are inputted into the horizontal-vertical conversion section 84b through the data switch 83, the output data from the horizontal-vertical conversion section 84a are outputted to the spatial filter 86 through the data switch 85.

In the spatial filter 86, the image data is subjected to the spatial filtering processing with a unit of m×n pixels, and outputted as data for each pixel with k bits after the processing.

According to the structure as mentioned above, the image data are memorized with a unit of w bits in the memory section 82, and the data input to the horizontal-vertical conversion section 84a and 84b is carried out with a unit of w bits, hence the number of times of accessing to the memory section 82 can be reduced. Further, by switching the data input and output regarding the horizontal-vertical conversion section 84a and 84b through the data switch 83 and 85, the data input and output in the horizontal-vertical conversion section 84a and 84b can be carried out in parallel, hence a low-speed RAM for general use can be employed for the memory section 82.

In the case where the color image data are processed, by the circuit structure shown in FIG. 33, if the same process as the case of monochromatic image is repeated to the same number of times as the number of colors consisting the color image for the whole page of the image, it is possible to process the color image in a field sequential manner. In other way, with the capacity of the aforesaid memory section 82 supposed to be at least (n lines)×(the number of colors), by repeating the process to the number of colors for each line, the color image can be processed in a line interleave manner. In also such cases as the above where color image data are processed, a low-speed RAM for general use can be employed for the memory section 82 making up the circuit, which gives the effect of cost reduction.

Figure 35:
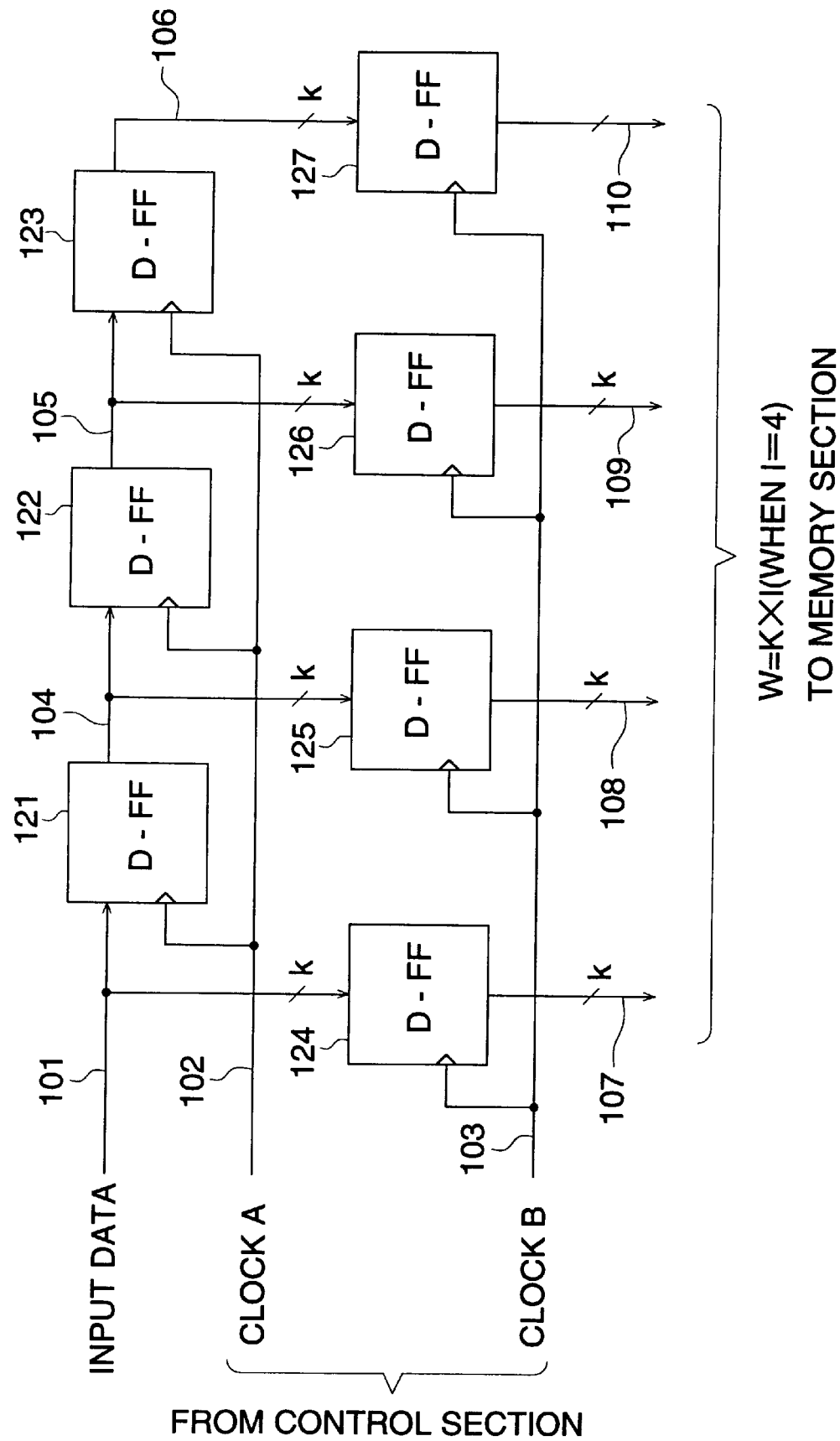
FIG. 35 is a circuit block diagram showing the serial-parallel conversion section in the above-mentioned embodiment.
Figure 36:
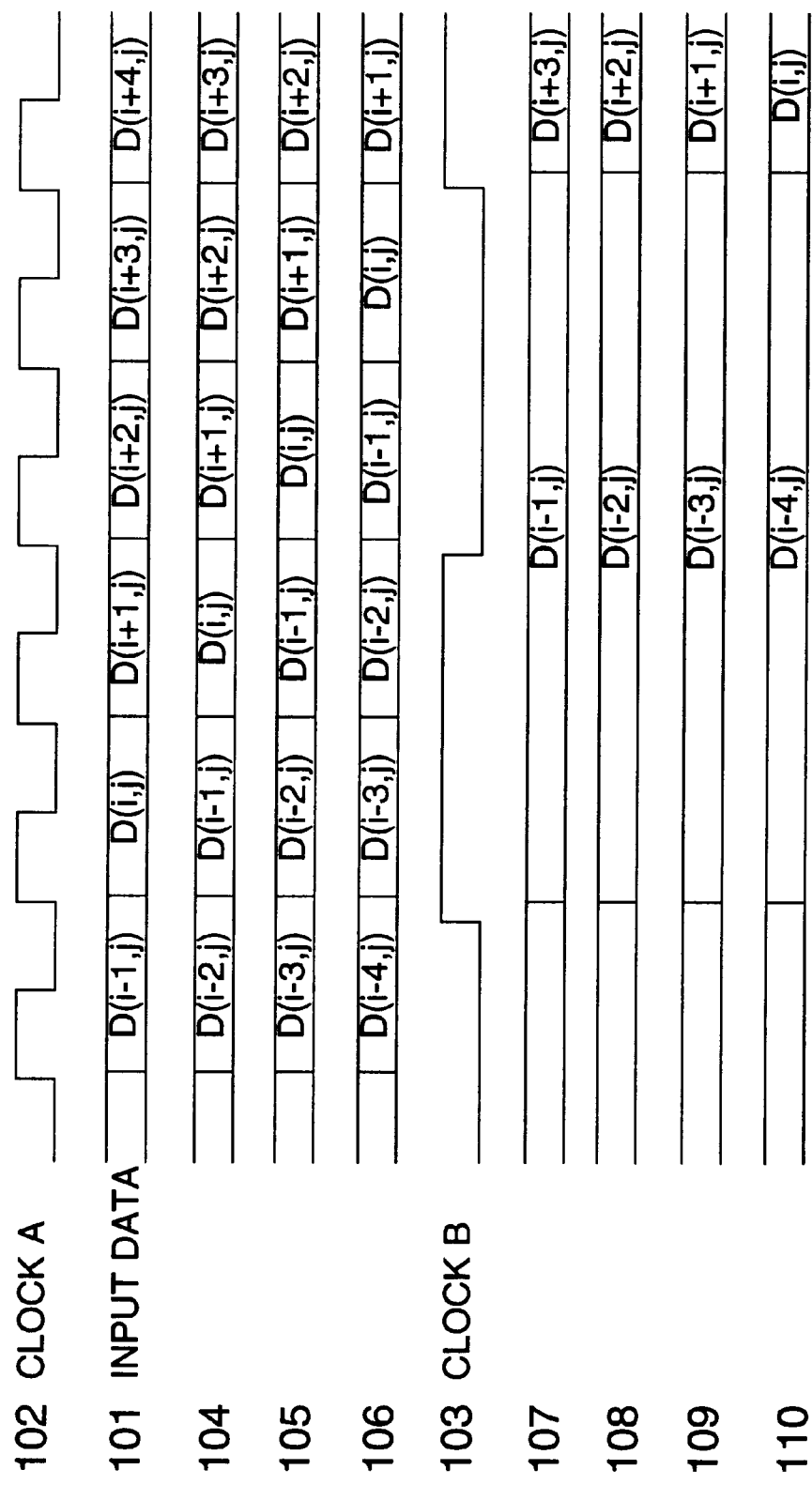
FIG. 36 is a timing chart showing the timing of data conversion in the above-mentioned serial-parallel conversion section.
Figure 37:
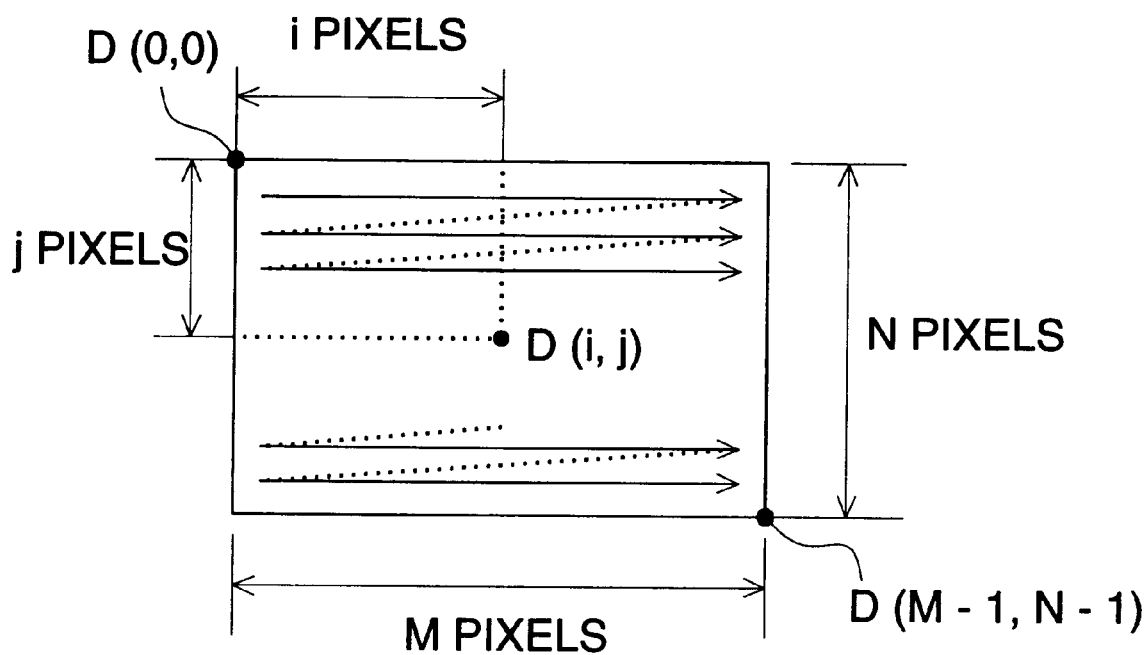
FIG. 37 is a diagram showing the input of image data in the above-mentioned embodiment.

FIG. 35 is a circuit block diagram showing the detail of the aforesaid serial-parallel conversion section 81, with an example wherein 1=4 shown, and FIG. 36 is a timing chart showing the data conversion characteristics in the aforesaid serial/parallel conversion section 81. Further, as shown in FIG. 37, the image data D(i, j) is one of the image data D(0,0) through D(M−1, N−1) for the M×N pixels.

In the aforesaid serial-parallel conversion section 81, by means of three D-flip-flops (D-FF) 121 through 123 of which the output is varied with the uprise of the clock from the aforesaid control section 87 (pixel clock) A102, the image data of the latest three pixels are latched, while the output is varied with the uprise of the clock B having a period of four times of said clock A, and the image data of four pixels as the data of w=k×4 bits are sequentially outputted as the output from the four D-flip-flops 124 through 127 to which the image data of said latest four pixels are inputted respectively. That is, in the aforesaid serial-parallel conversion section 81, for each input of the image data of 1 pixels, the data are converted to the output data of w bits consisting of the image data of the latest 1 pixels.

Figure 38:
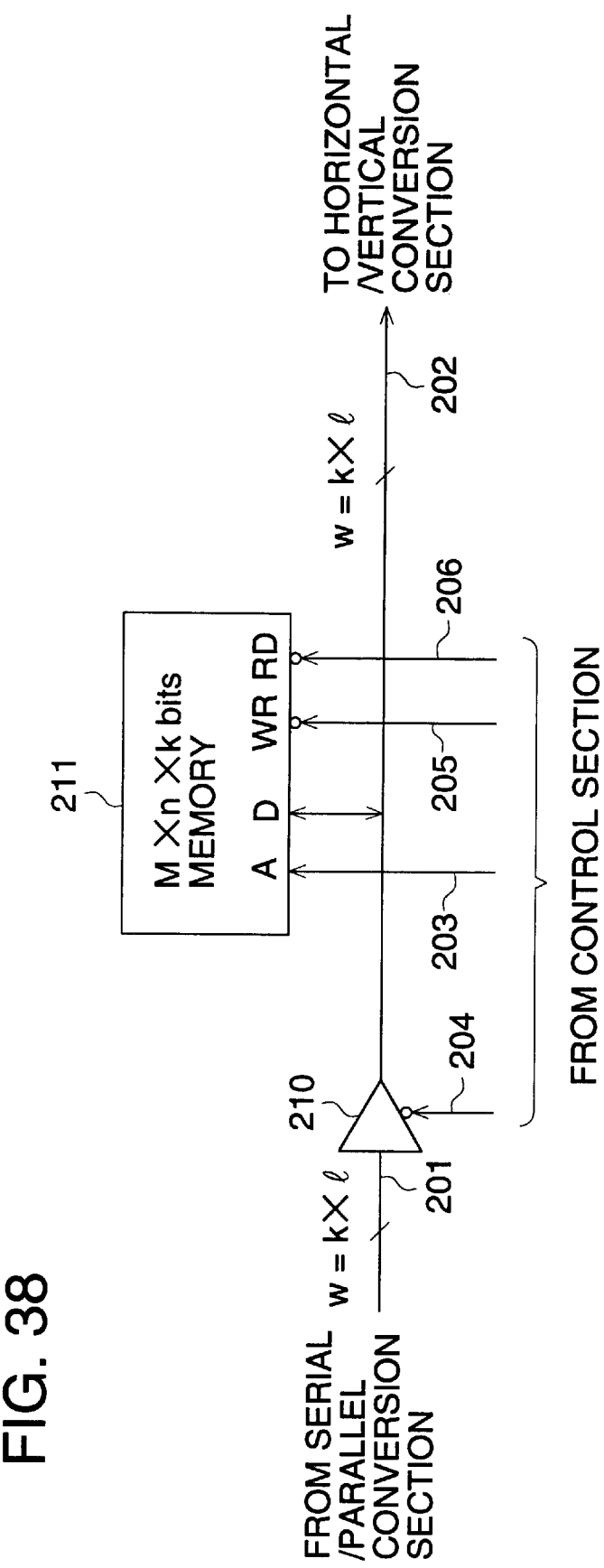
FIG. 38 is a circuit block diagram showing the memory section in the above-mentioned embodiment.
Figure 39:
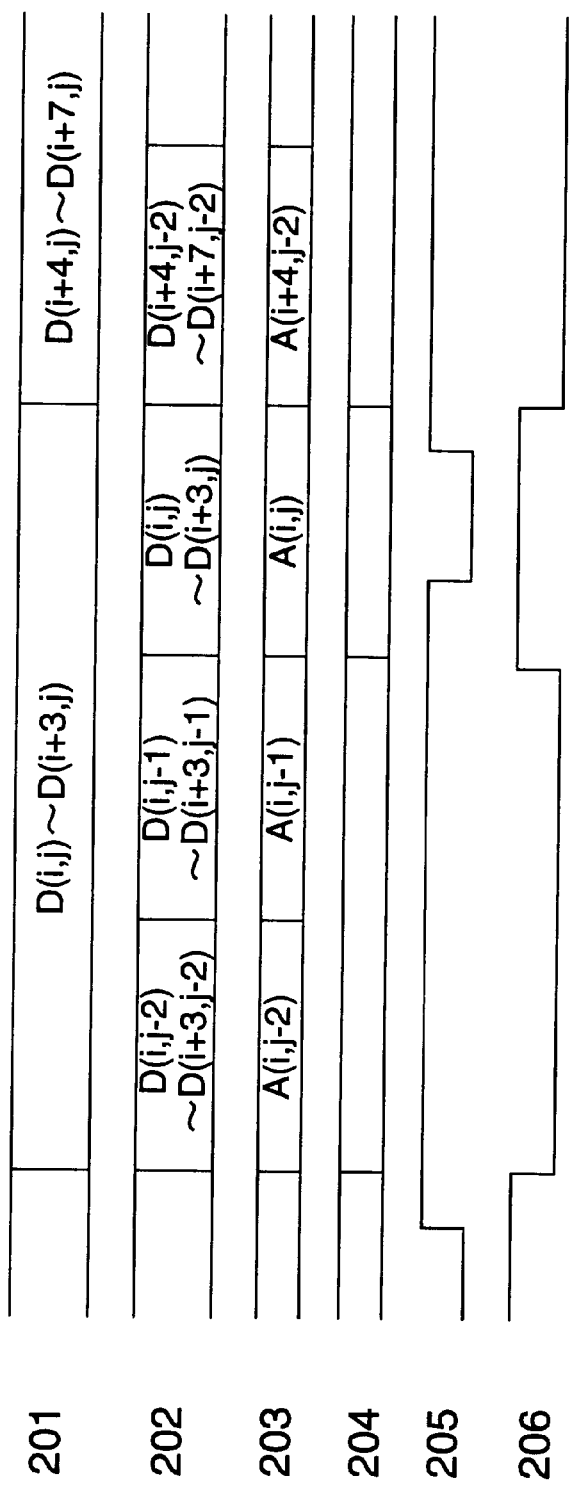
FIG. 39 is a timing chart showing the data input/output process in the above-mentioned memory section.

FIG. 38 is a circuit block diagram showing the detailed structure of the aforesaid memory section 82, wherein the write-in and read-out of the image data are executed at the timing as shown in the timing chart of FIG. 39.

Regarding the data with a unit of w=k×1 bits outputted from the aforesaid serial-parallel conversion section 81, the output onto the bus line 202 is controlled by the three-state buffer 210, and the write-in and read-out of said data of w bits are carried out in accordance with the address signal A 203, the write-in control signal WR 205, and the read-out control signal RD 206.

Now, in the case where n=3, and 1=4, the write-in and read-out of the image data of w bits are carried out in a manner shown in FIG. 39.

When the control input 204 of the aforesaid three-state buffer 210 is at low level, the latest data of w bits (the data of four pixels D(i, j) to D(i+3, j)) can get on the bus line 202, but when said control input 204 is at high level, the output becomes in the state of high impedance, and the input and the output are separated.

In the aforesaid control section 87 which outputs the aforesaid control input 204, the address signal A 203, the write-in control signal WR 205, and the read-out control signal RD 206, following control process is executed: the read-out control signal RD 206 is made to be at high level to stop the read-out from the memory 211 when said control signal 204 is made to be at low level to make the latest data of w bits get on the bus line, while said read-out control signal RD 206 is made to be at low level to read out the data of the two lines before and corresponding to the latest data of w bits (D(i, j−2) to D(i+3, j−2), D(i, j−1) to D(i+3, j−1)) from the memory 211 when said control input 204 is made to be at high level to separate the input and the output; further, while the aforesaid control input 204 is at low level, the write-in control signal WR 205 is made to be at low level to carry out the write-in of the latest data of w bits (D(i, j) to D(i+3, j)) to the memory 211.

The aforesaid memory 211 has a capacity of at least M×n×k bits.

In addition, the aforesaid address signal A 203 for making the data to be stored with a unit of w bits is calculated by A(i, j)=(M×(j % n)+i)/1. The above mentioned (j % n) indicates the residue when j is divided by n, and the address is defined by the quotient obtained by the calculation (M×(j % n)+i)/1. In this way, the image data of the latest n lines can be memorized with the data of 1 pixels made to correspond to one address.

Figure 40:
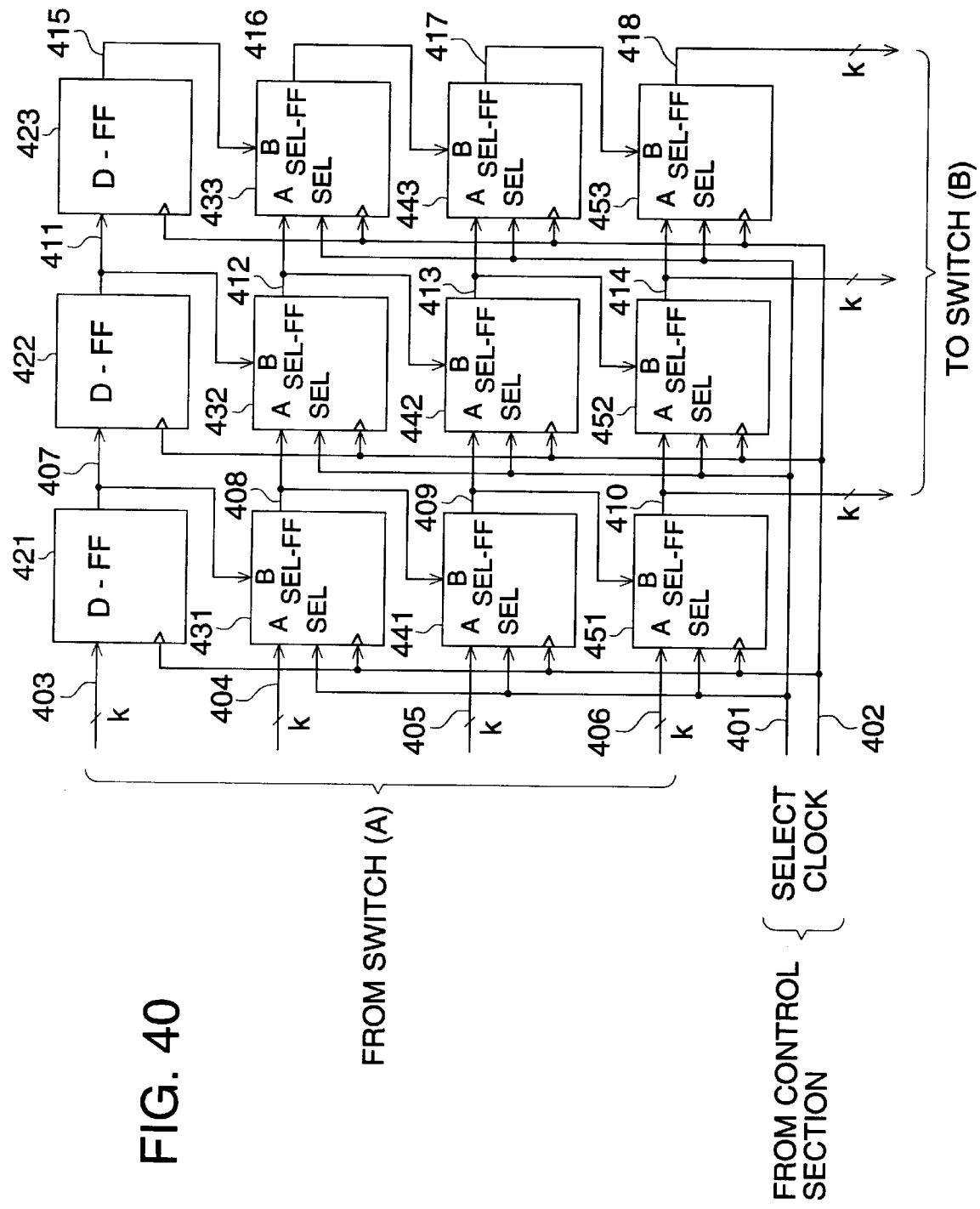
FIG. 40 is a circuit block diagram showing the horizontal-vertical conversion section in the above-mentioned embodiment.

FIG. 40 is a circuit block diagram showing the detail of the aforesaid horizontal-vertical conversion section 84a and 84b, and it is shown in the same manner as described in the foregoing the case where n=3, 1=4.

Figure 41:
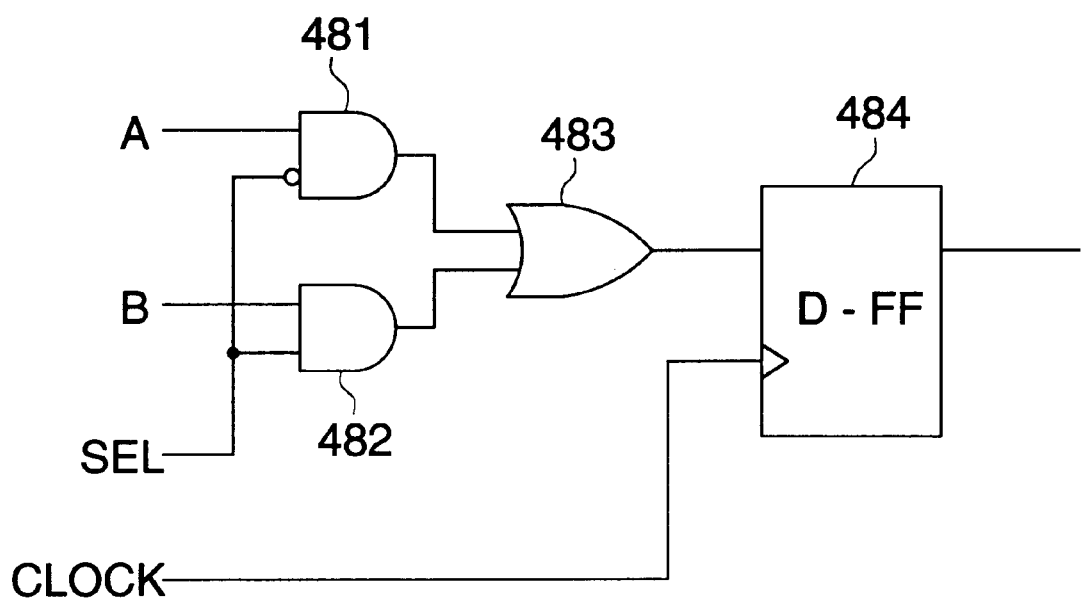
FIG. 41 is a circuit block diagram showing the structure of the D-flip-flop with a selector making up the above-mentioned horizontal-vertical conversion section.

The D-flip-flop with a selector (SEL-FF) in FIG. 40 is made up in a manner shown in FIG. 41, that is, the data A and the select signal SEL are inputted at the input side of the AND circuit 481, and the data B and the inverted signal of the select signal SEL are inputted at the input side of the AND circuit 482; the output of said AND circuits 481, and 482 are inputted to the OR circuit 483, the output of which is inputted to the D-flip-flop (D-FF) 484 as the input data. In other words, the circuit has a structure such that, in accordance with the high/low switching of said signal SEL, the input data to the D-flip-flop (D-FF) 484 can be switched to either A or B.

Figure 42:
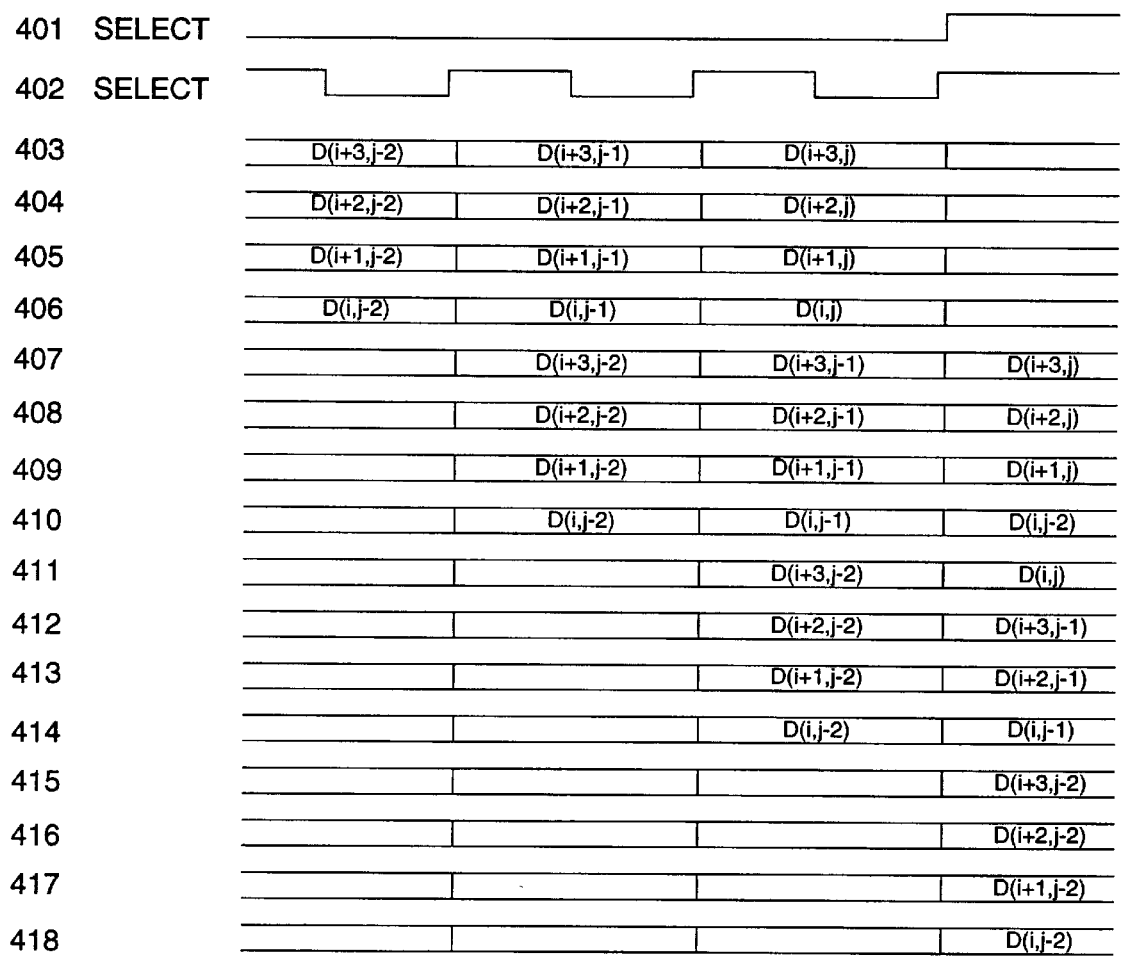
FIG. 42 is a timing chart showing the data input process in the above-mentioned horizontal-vertical conversion section.

When the data are inputted to the horizontal-vertical conversion section 84a and 84b, the aforesaid select signal SEL is made to be at low level to set a condition for the data A to be selected, and the image data for the pixels of three lines (three rows) in the same column (the same i-th) are latched by the D-flip-flops 421 through 423, the D-flip-flops with a selector 431 through 433, the D-flip-flops with a selector 441 through 443, and the D-flip-flops with a selector 451 through 453, the four groups of the flip-flops corresponding to the input data of four pixels 403 through 406 respectively (refer to FIG. 42).

Figure 43:
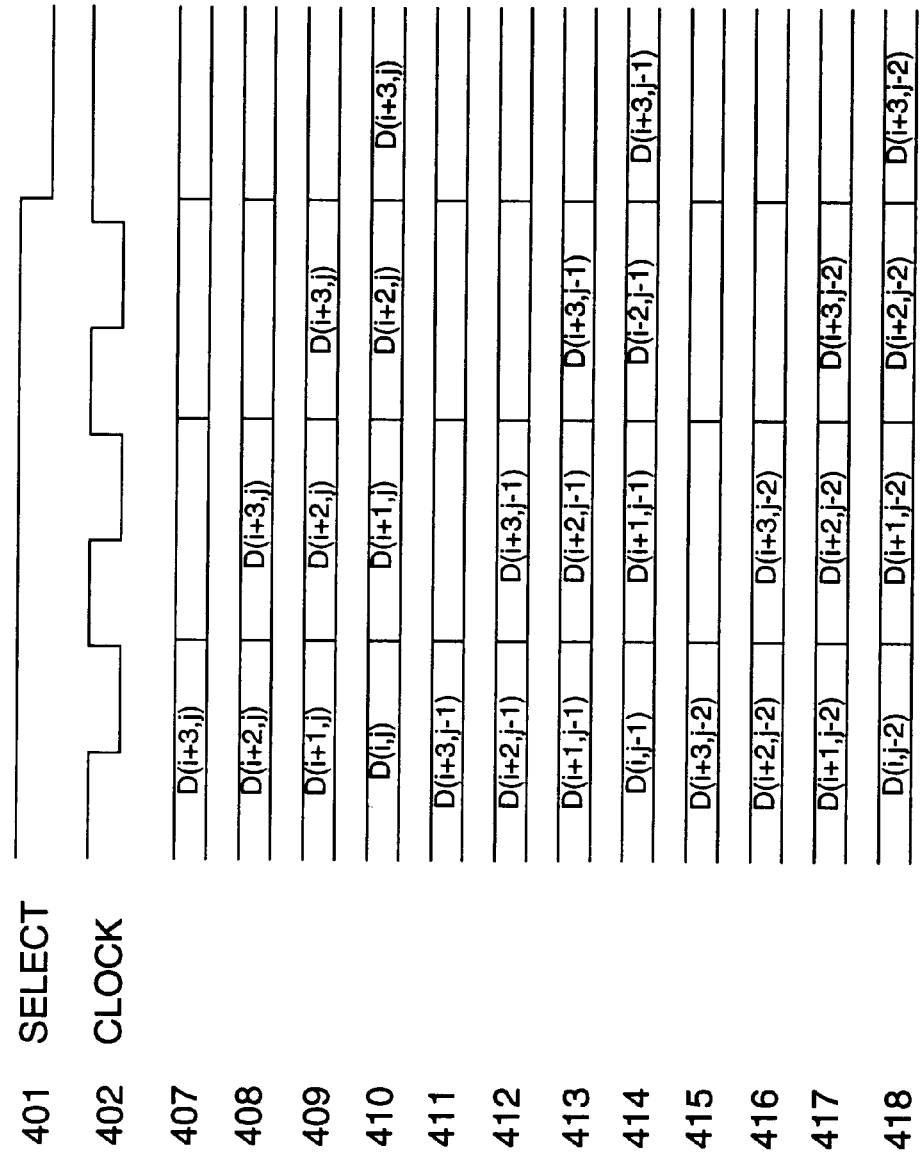
FIG. 43 is a timing chart showing the data output process the above-mentioned horizontal-vertical conversion section.

On the other hand, when the data are outputted from the horizontal-vertical conversion section 84a and 84b, the aforesaid select signal SEL is made to be at high level to set a condition for the data B to be selected. In this case, with the structure of the circuit, by making the select signal SEL be at high level, the output from the D-flip-flop 421 is inputted to the D-flip-flop with a selector 431 as the input data, the output of which is inputted to the D-flip-flop with a selector 441 as the input data, the output of which is further inputted to the D-flip-flop with a selector 451 as the input data, and delivery and receipt of the data between the D-flip-flops corresponding to the other columns is carried out in the same manner. Further, because the circuit is made up in such a manner that the output to the data switch 85 side is obtained as the outputs from the D-flip-flops with a selector 451 through 453, when the select signal SEL is switched to the high level, first, the image data for three lines which are latched by the D-flip-flops with a selector 451 through 453 are outputted, then on the basis of the uprise of the clock 402, the data latched by the D-flip-flop is transmitted successively to the lower D-flip-flops in FIG. 40, and consequently, the image data of the same column (the same i-th) for the three lines (data of n×k bits) are sequentially outputted (refer to FIG. 43).

Figure 44:
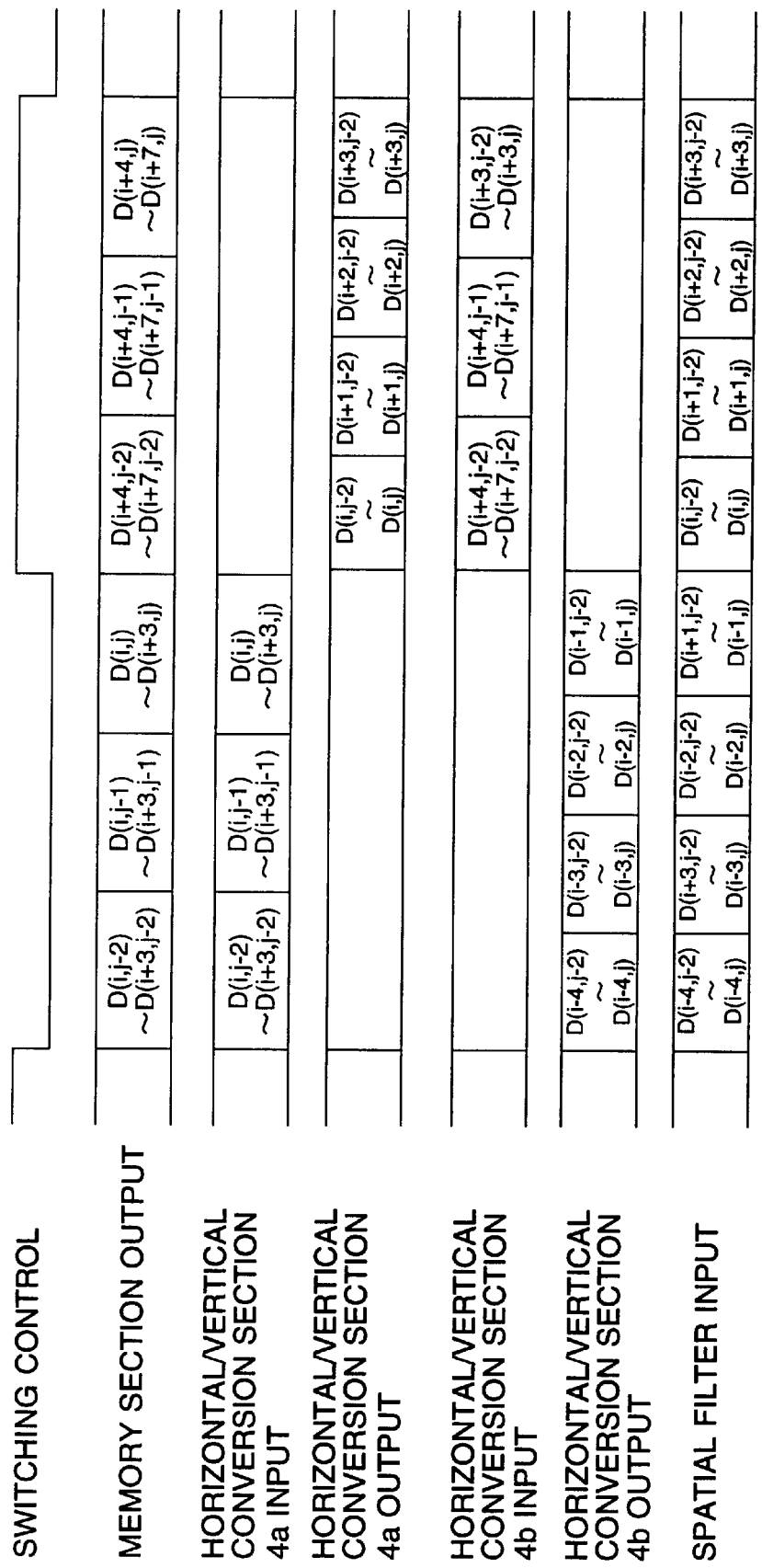
FIG. 44 is a timing chart showing the process of control of the data switch and the process of switching the input and the output in the two sets of horizontal-vertical conversion sections.

FIG. 44 is a timing chart showing the relationship between the switching of the data switch and the input-output of the image data, and when the switch control signal is at high level, the write-in to the horizontal-vertical conversion section 84a is carried out, while the read-out from the horizontal-vertical conversion section 84b is carried out.

Figure 45:
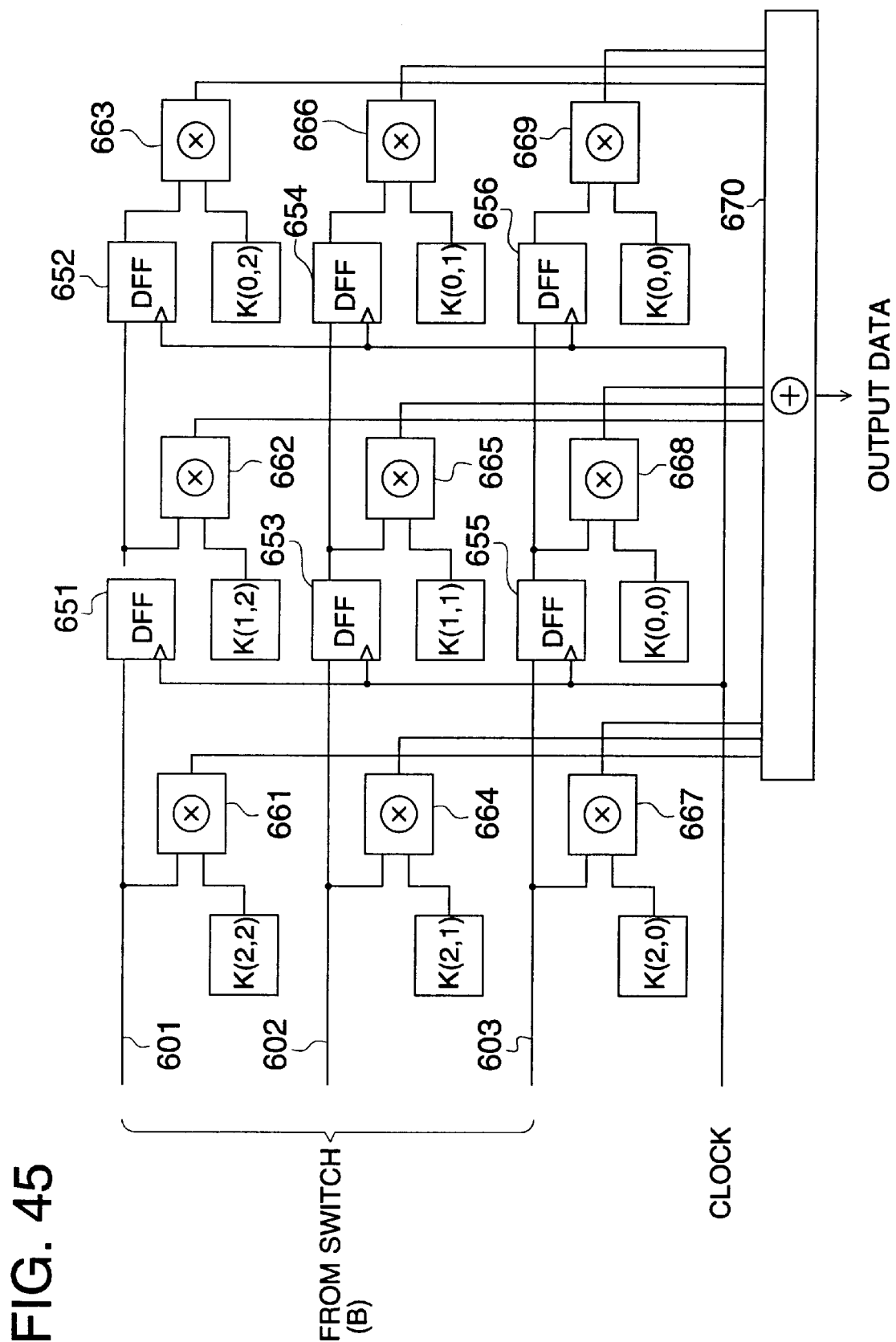
FIG. 45 is a circuit block diagram showing the spatial filter in the above-mentioned embodiment.

FIG. 45 is a circuit block diagram showing the detail of the spatial filter 86, and it is shown the case where the spatial filtering processing is carried out for m=n=3 with a unit of 3×3 pixels.

In FIG. 45, the image data of each line are inputted as the input data 601, 602, and 603 to each column, and by D-flip-flops 651 through 656 the data of the preceding column and further preceding column are latched to obtain the data of 3×3 pixels. Moreover, the image data of each pixel are multiplied by the coefficients K(0, 0) through K(2, 2) using the multipliers 661 through 669, and these multiplied results are added by the adder 670 to obtain the output data.

In addition, in the above-mentioned spatial filter, the circuit has a structure such that each of the image data of m×n pixels is multiplied by the coefficient K and the results of the multiplication are added to obtain the output data, however, the structure of the spatial filter is not limited to this.

What is claimed is:

1. An apparatus for forming an image by conveying an optical head in a main scanning direction and a sub-scanning direction relative to a photosensitive material, comprising:

said optical head having a first major group of light emitting elements including a plurality of light emitting elements aligned in the sub-scanning direction, each light emitting element of the first major group of light emitting elements emitting light having a peak emission wavelength that is substantially the same as that of other light emitting elements of the first major group of light emitting elements;

a conveyor which conveys the optical head in the sub-scanning direction relative to the photosensitive material and which conveys the optical head in the main-scanning direction substantially perpendicular to the sub-scanning direction relative to the photosensitive material; and a controller which controls the conveyor and the optical head such that a single pixel at a same position on the photosensitive material is exposed plural times by plural different light emitting elements of the plurality of light emitting elements aligned in the sub-scanning direction at plural different main scanning times.

2. The apparatus of claim 1, further comprising:

an input device for inputting image data; and an image processor for applying an image processing onto the image data;

wherein the controller controls two light emitting elements such that the two light emitting elements form the single pixel in accordance with the image data applied with the image processing by the image processor.

3. The apparatus of claim 2, further comprising:

a memory which records image processing parameters for each factor of density fluctuation of a formed image; and density fluctuation input device which inputs information regarding a factor of the fluctuation;

wherein the image processor applies the image processing in accordance with image processing parameters selected on the basis of the information.

4. The apparatus of claim 2, wherein for every item of calibration of density fluctuation, print densities obtained for each fluctuation causing factor by outputting predetermined image data on the basis of a predetermined conversion characteristics are measured, and characteristic correcting data for each fluctuation causing factor are calculated from density information, and the characteristic correcting data are memorized for each fluctuation causing factor in a memory, and at the same time, new conversion characteristics data are prepared from those characteristic correcting data to execute correction of output fluctuation.

5. The apparatus of claim 4, wherein the calibration items of density fluctuation are the calibration items due to the difference in development characteristics and photosensitive material.

6. The apparatus of claim 1, further comprising:

a light quantity detector which measures light quantity emitted from each of the plurality of light emitting elements aligned in the sub-scanning direction and which outputs light quantity data; and a light quantity corrector which obtains dispersion in light quantity among the Plurality of light emitting elements on the basis of the light quantity data and which corrects the dispersion among the plurality of light emitting elements.

7. The apparatus of claim 6, wherein the first major group of light emitting elements is divided into plural groups and wherein the light quantity detector measures light quantity for each of the plural groups and the light quantity corrector corrects light quantity errors among the plural groups.

8. The apparatus of claim 7, wherein the light quantity detector measures a sum or an average of emitted light intensity of light emitting elements of each group and the light quantity corrector corrects the quantity of light of each group so as to make the sum or the average of emitted light intensity of each group equal.

9. The apparatus of claim 8, wherein the controller controls such that the single pixel on the recording medium is formed by light emitted from at least two light emitting elements of the same group.

10. The apparatus of claim 1, wherein the plurality of light emitting elements aligned in the sub-scanning direction are aligned with a predetermined interval, the apparatus further comprising:

a light quantity detector which measures light quantity emitted from each of the plurality of light emitting elements and which outputs light quantity data; and a light quantity adjuster which adjusts light quantity of the plurality of light emitting elements on the basis of information regarding errors in the predetermined interval among the plurality of light emitting elements and the light quantity data.

11. The apparatus of claim 10, wherein the first major group of light emitting elements is divided into plural groups and wherein the light quantity adjuster obtains a total light quantity of each group based on the light quantity data output from the light quantity detector and adjusts the total light quantity of each group.

12. The apparatus of claim 11, wherein the light quantity detector measures a sum or an average of emitted light intensity of light emitting elements of each group and the light quantity corrector adjusts the quantity of light of each group so as to make the sum or the average of emitted light intensity of each group equal.

13. The apparatus of claim 12, wherein the controller controls such that the single pixel on the recording medium is formed by light emitted from at least two light emitting elements of the same group.

14. The apparatus of claim 1, wherein the first major group of light emitting elements is divided into plural groups and the controller controls such that the single pixel on the recording medium is formed by light emitted from at least two light emitting elements of the same group.

15. The apparatus of claim 14, further comprising:

a distributor for distributing light emission time in order to make a part of the plural light emitting elements belonging to the same group emit light for a different time period than the others of the same group, and to make the part of the plural light emitting elements belonging to the same group emit light for a different time period.

16. The apparatus of claim 1, further comprising:

stop order detector which detects a stop order to stop image formation for a time, wherein the controller controls the plurality of light emitting elements so as to stop image formation after the pixel which is being formed when the stop order is detected is formed completely.

17. The apparatus of claim 1, further comprising:

an exposure corrector which corrects light quantity irradiated for the single pixel in accordance with a time interval from a time that a pixel is formed by a light emitting element to a time that light emitted from a next light emitting element is superimposed on the same pixel.

18. The apparatus of claim 1, wherein a number of light emitting elements belonging to a same group N is defined to meet an inequality:

$$N \times M \times Pmin/Ps > C$$

wherein Pmin is a minimum exposure amount in the case where the exposure amount is reduced to its lowest due to various kinds of fluctuations and dispersions in the image forming apparatus, Ps is the exposure amount in the case of no fluctuation and dispersion, M is a specified value of the steps of modulation for the light emitting elements, and C is a lowest limit of the number of gradations corresponding to the sensitivity of human eyes.

19. The apparatus of claim 18, wherein the minimum exposure amount Pmin is obtained by an equation:

$$Pmin = Ps/(1+g)/(1+f)/\{1+\epsilon/(N)^{1/2}\}.$$

wherein g is a deviation from the optimum value of the developing machine to develop the exposed photosensitive recording medium, f is a dispersion of sensitivity of the photosensitive recording medium, $\epsilon$ is a dispersion of light quantity of the light emitting elements, and N is the number of the light emitting elements belonging to the same group.

20. The apparatus of claim 19, wherein the number of light emitting elements belonging to the same group N is defined such that the inequality N×M×Pmin/Ps>C is effected for the number of the lowest limit of gradations C specified as not less than 200 or desirably not less than 400.

21. The apparatus of claim 20, wherein the number of groups is defined in such a manner that a value obtained as the number of groups multiplied by the size of a recording pixel is smaller than a period in the higher frequency side than a frequency at the peak of spatial frequency response of the human vision.

22. The apparatus of claim 21, wherein the number of groups is set in such a way that the value obtained as the number of groups multiplied by the size of a recording pixel is made to be a value smaller than 300 micron.

23. The apparatus of claim 1, further comprising:
   a stop order detector which detects a stop order to stop image formation for a time;
   a sub-scanning detector which detects a stop position of sub-scanning when the stop order is detected by the stop order detector;
   a memory for recording the stop position of sub scanning;
   a restart order detector which detects a restart order indicating that image formation can be restarted;
   wherein the conveyor conveys the plurality of light emitting elements relative to the recording medium backward by a predetermined distance from the stop position of the sub-scanning when the stop order detector detects the stop order, and the controller controls the plurality of light emitting elements so as to restart image formation after the conveyor returns the plurality of light emitting elements to the stop position when the restart order detector means detects the restart order.

24. The apparatus of claim 1, wherein the first major group of light emitting elements further includes a plurality of light emitting elements arranged in the main scanning direction, wherein the controller controls the optical head such that the pixel at the same position on the photosensitive material is exposed a plurality of times by plural different light emitting elements of the plurality of light emitting elements arranged in the main scanning direction at the same main scanning time.

25. The apparatus of claim 1, wherein the optical head passes over the single pixel at the same position on the photosensitive material one time in the main scanning direction by one main scanning time.

26. The apparatus of claim 1, wherein the plurality of light emitting elements aligned in the sub-scanning direction emit light simultaneously so as to form a plurality of pixels at different positions on the photosensitive material.

27. The apparatus of claim 1, wherein the controller shifts a position of the print heading the sub-scanning direction for each main scanning time so that the same light emitting element exposes a different pixel for each main scanning time.

28. The apparatus of claim 1, wherein the conveyor comprises a head carriage which conveys the print head in the sub-scanning direction and a rotatable drum which conveys the photosensitive material in the main scanning direction.

29. The apparatus of claim 1, wherein the controller comprises a light emission controller for controlling light emission of each light emitting element in accordance with predetermined image data when each light emitting element scans the single pixel at the same position on the photosensitive material.

30. The apparatus of claim 1, the optical head further having a second major group of light emitting elements including a plurality of light emitting elements aligned in the sub-scanning direction, the second major group of light emitting elements being distal with respect to the first major group of light emitting elements in the main scanning direction, each light emitting element of the second major group of light emitting elements emits light having a peak emission wavelength different from that of the light emitting elements of the first major group of light emitting elements, and wherein the apparatus further comprises:
   a recording position controller which controls a light emitting timing of the second major group of light emitting elements so as to be different from a light emitting timing of the first major group of light emitting elements corresponding to a distance between the first major group of light emitting elements and the second major group of light emitting elements such that the single pixel at the same position on the photosensitive memory exposed the plurality of times by the first major group of light emitting elements is further exposed a plurality of times by plural different light emitting elements of the plurality of light emitting elements aligned in the sub-scanning direction in the second major group of light emitting elements at plural different main scanning times.

31. The apparatus of claim 30, wherein the recording position controller further comprises
   first signal generating means for generating a first signal with a first time interval;
   second signal generating means for generating a second signal with a second time interval shorter than the first time interval;
   a first counter to count the first signal;
   a second counter to count second signal; and the
   recording position determining means determines a recording position in the main scanning direction by the first major group of light emitting elements on the basis of a count value of the first counter and a recording position in the main scanning direction by the second major group of light emitting elements on the basis of a count value of the first counter and a count value of the second counter.

32. The apparatus of claim 30, further comprising a stop order detector which detects a stop order to stop recording, wherein when the stop order detector detects the stop order, the controller stops the recording after the pixel exposed by the first major group of light emitting elements is further exposed by the second major group of light emitting elements.

* * * * *